(12) United States Patent
Wan et al.

(10) Patent No.: US 12,066,798 B2
(45) Date of Patent: Aug. 20, 2024

(54) METHOD AND CONTROL SYSTEM FOR CONTROLLING BUILDING SERVICE SYSTEMS

(71) Applicant: NANYANG TECHNOLOGICAL UNIVERSITY, Singapore (SG)

(72) Inventors: Man Pun Wan, Singapore (SG); Shiyu Yang, Singapore (SG); Bing Feng Ng, Singapore (SG); Swapnil Dubey, Singapore (SG); Krishnamoorthy Baskaran, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 544 days.

(21) Appl. No.: 17/417,532

(22) PCT Filed: Jan. 13, 2020

(86) PCT No.: PCT/SG2020/050015
§ 371 (c)(1),
(2) Date: Jun. 23, 2021

(87) PCT Pub. No.: WO2020/145900
PCT Pub. Date: Jul. 16, 2020

(65) Prior Publication Data
US 2022/0113688 A1    Apr. 14, 2022

(30) Foreign Application Priority Data

Jan. 11, 2019  (SG) .......................... 10201900288S

(51) Int. Cl.
*G05B 13/04* (2006.01)
*F24F 11/46* (2018.01)

(52) U.S. Cl.
CPC ............ *G05B 13/048* (2013.01); *F24F 11/46* (2018.01)

(58) Field of Classification Search
CPC ............................. G05B 13/048; F24F 11/46
(Continued)

(56) References Cited

U.S. PATENT DOCUMENTS 8,600,561 B1   12/2013 Modi et al.
2015/0234369 A1*  8/2015 Wen .................. F24F 11/63
                                                      700/278

(Continued)

FOREIGN PATENT DOCUMENTS

CN         106295902           1/2017

OTHER PUBLICATIONS

Extended European Search Report for EP Application No. 20738419.9 dated Sep. 5, 2022 (8 pages).
(Continued)

*Primary Examiner* — Md Azad
(74) *Attorney, Agent, or Firm* — Alston & Bird LLP

(57) ABSTRACT

A method of controlling building service systems includes predicting, based on a shading and lighting prediction model, a visual comfort condition and a lighting condition with respect to a region of a building; optimizing, based on a first multi-component cost function including a plurality of components relating to a plurality of lighting or thermal performance parameters, one or more first control parameters for controlling the lighting system and the shading system based on the predicted visual comfort condition and the predicted lighting condition; predicting, based on a building dynamics model, a plurality of building response parameters based on the predicted visual comfort condition and the predicted lighting condition; and optimizing, based on a second multi-component cost function including a plurality of components relating to the plurality of building performance parameters, one or more second control parameters for controlling an air-conditioning/heating system (Continued)

based on the predicted plurality of building response parameters.

18 Claims, 35 Drawing Sheets

(58) Field of Classification Search
USPC .......................................................... 700/276
See application file for complete search history.

(56) References Cited

U.S. PATENT DOCUMENTS

| | | | |
|---|---|---|---|
| 2016/0091904 | A1 | 3/2016 | Horesh et al. |
| 2016/0195888 | A1* | 7/2016 | Wenzel .............. G06Q 30/0202 700/275 |
| 2016/0305678 | A1 | 10/2016 | Pavlovski et al. |
| 2016/0333638 | A1* | 11/2016 | Cascia ................... G05B 15/02 |
| 2017/0242413 | A1 | 8/2017 | Piaskowski et al. |
| 2017/0345208 | A1* | 11/2017 | Ashdown ............... H05B 47/11 |
| 2018/0004172 | A1 | 1/2018 | Patel et al. |
| 2018/0004173 | A1 | 1/2018 | Patel et al. |
| 2019/0377306 | A1* | 12/2019 | Harvey ................ G05B 13/027 |
| 2021/0277714 | A1* | 9/2021 | Hebeisen .................. E06B 9/68 |

OTHER PUBLICATIONS

Xu, Zhanbo et al., *Supply Demand Coordination for Building Energy Saving: Explore the Soft Comfort*, IEEE Transactions On Automation Science and Engineering, vol. 12, No. Apr. 2, 2015 (10 pages).
Cole, W. J., Powell, K. M., Hale, E. T., & Edgar, T. F. (2014). Reduced-order residential home modeling for model predictive control. Energy and Buildings, 74, 69-77.
Coleman, T. F., & Li, Y. (1996). An interior trust region approach for nonlinear minimization subject to bounds. SIAM Journal on optimization, 6(2), 418-445.
Henze, G. P. (2013). Model predictive control for buildings: A quantum leap? Journal of Building Performance Simulation, 6(3), 157-158.
Miller, S., & Wendlandt, J. (2010). Real-time simulation of physical systems using Simscape. MATLAB News and Notes, 1-13.
Park, H. (2013). Dynamic thermal modeling of electrical appliances for energy management of low energy buildings (Doctoral dissertation). Université de Cergy Pontoise.
Sturzenegger, D., Gyalistras, D., Morari, M., & Smith, R. S. (2012, November). Semiautomated modular modeling of buildings for model predictive control. In Proceedings of the Fourth ACM Workshop on Embedded Sensing Systems for Energy-Efficiency in Buildings (pp. 99-106).
Yang, S., Wan, M.P., Ng, B.F., Zhang, T., Babu, S., Zhang, Z., Chen, W. and Dubey, S. (2018). A state-space thermal model incorporating humidity and thermal comfort for model predictive control in buildings. Energy and Buildings, 170, 25-39.
A. Afram, F. Janabi-Sharifi, Theory and applications of HVAC control systems-A review of model predictive control (MPC), Build. Environ. 72 (2014) 343-355.
Y.I. Alamin, M.D.M. Castilla, J.D. Álvarez, A. Ruano, An economic model-based predictive control to manage the users' thermal comfort in a building, Energies 10 (3) (2017) 321.
F. Ascione, N. Bianco, C. De Stasio, G.M. Mauro, G.P. Vanoli, Simulation-based model predictive control by the multi-objective optimization of building energy performance and thermal comfort, Energy Build. 111 (2016) 131-144.
BCA, Building Energy Benchmarking Report (Rep.), Building and Construction Authority, Singapore, 2014.
M. Castilla, J.D. Álvarez, J.E. Normey-Rico, F. Rodríguez, Thermal comfort control using a nonlinear MPC strategy: a real case of study in a bioclimatic building, J. Process Control 24 (6) (2014) 703-713.

X. Chen, Q. Wang, J. Srebric, Model predictive control for indoor thermal comfort and energy optimization using occupant feedback, Energy Build. 102 (2015) 357-369.
V.R. Dehkordi, J.A. Candanedo, State-space modeling of thermal spaces in a multi-zone building, 4th High Performance Buildings Conference, 2016.
DoE (2016). EnergyPlus engineering reference. USA.
R.Z. Freire, G.H. Oliveira, N. Mendes, Predictive controllers for thermal comfort optimization and energy savings, Energy Build. 40 (7) (2008) 1353-1365.
M.M. Gouda, S. Danaher, C.P. Underwood, Building thermal model reduction using nonlinear constrained optimization, Build. Environ. 37 (12) (2002) 1255-1265.
I. Hazyuk, C. Ghiaus, D. Penhouet, Model predictive control of thermal comfort as a benchmark for controller performance, Autom. Constr. 43 (2014) 98-109.
L. He, B. Lei, H. Bi, T. Yu, Simplified building thermal model used for optimal control of radiant cooling system, Math. Problems Eng. (2016) 2016.
T. Hilliard, M. Kavgic, L. Swan, Model predictive control for commercial buildings: trends and opportunities, Adv. Build. Energy Res. 10 (2) (2016) 172-190.
J. Hu, P. Karava, A state-space modeling approach and multi-level optimization algorithm for predictive control of multi-zone buildings with mixed-mode cooling, Build. Environ. 80 (2014) 259-273.
M. Killian, M. Kozek, Ten questions concerning model predictive control for energy efficient buildings, Build. Environ. 105 (2016) 403-412.
D. Kim, J.E. Braun, Reduced-order building modeling for application to model-based predictive control, IBPSA-USA J. 5 (1) (2012) 554-561.
R. Kramer, J. van Schijndel, H. Schellen, Simplified thermal and hygric building models: a literature review, Front. Archit. Res. 1 (4) (2012) 318-325.
R. Kwadzogah, M. Zhou, S. Li, Model predictive control for HVAC systems—a review, in: 2013 IEEE International Conference on Automation Science and Engineering (CASE), IEEE, 2013, August, pp. 442-447.
A. Mirakhorli, B. Dong, Occupancy behavior based model predictive control for building indoor climate—a critical review, Energy Build. 129 (2016) 499-513.
T.R. Nielsen, Simple tool to evaluate energy demand and indoor environment in the early stages of building design, Sol. Energy 78 (1) (2005) 73-83.
J.A. Palyvos, A survey of wind convection coefficient correlations for building envelope energy systems' modeling, Appl. Therm. Eng. 28 (8) (2008) 801-808.
L. Pérez-Lombard, J. Ortiz, C. Pout, A review on buildings energy consumption information, Energy Build. 40 (3) (2008) 394-398, doi: 10.1016/j.enbuild.2007.03.007.
R. Qi, L. Lu, H. Yang, Investigation on air-conditioning load profile and energy consumption of desiccant cooling system for commercial buildings in Hong Kong, Energy Build. 49 (2012) 509-518.
J. Široký, F. Oldewurtel, J. Cigler, S. Prívara, Experimental analysis of model predictive control for an energy efficient building heating system, Appl. Energy 88 (9) (2011) 3079-3087.
G.N. Walton, Thermal analysis research program reference manual, NBSSIR 83-2655, National Bureau of Standards, Gaithersburg, MD, 1983.
S. Wang, Z. Ma, Supervisory and optimal control of building HVAC systems: a review, HVAC&R Res. 14 (1) (2008) 3-32.
F.C. Winkelmann, Modeling windows in EnergyPlus, in: Proceedings IBPSA Building Simulation, 2001.
BCA. (2016). Building Energy Benchmarking Report (Rep.). Singapore: Building and Construction Authority.
Royapoor, M., Antony, A., Roskilly, T. (2017). A review of building climate and plant controls, and a survey of industry perspectives. Energy and Buildings.
Shaikh, P. H., Nor, N. B. M., Nallagownden, P., Elamvazuthi, I., Ibrahim, T. (2014). A review on optimized control systems for building energy and comfort management of smart sustainable buildings. Renewable and Sustainable Energy Reviews, 34, 409-429.
Sturzenegger, D. (2014). Model predictive building climate control: Steps towards practice (Doctoral dissertation, ETH Zurich).

(56) References Cited

OTHER PUBLICATIONS

Zong, Y. (2016). Model Predictive Control (MPC)-based control algorithm for the smart buildings—PowerFlexHouses at PowerLabDK. EnergyLab Nordhavn Secretariat.

Nabil, A., & Mardaljevic, J. (2005). Useful daylight illuminance: a new paradigm for assessing daylight in buildings. Lighting Research & Technology, 37(1), 41-57.

Wienold, J., Christoffersen, J. (2006). Evaluation methods and development of a new glare prediction model for daylight environments with the use of CCD cameras. Energy and buildings, 38(7), 743-757.

Perez, R., Ineichen, P., Seals, R., Michalsky, J., Stewart, R. (1990). Modeling daylight availability and irradiance components from direct and global irradiance. Solar energy, 44(5), 271-289.

J. Zhou, T.C. Tan, C.P. Gao, S. Valliappan, A. Goh, A. Seoh, S. Babu, A. Lamano, Z. Zhang, J. Sarvaiya, M.P Wan, Y. Grynberg, N. Napahade, Development of a rotatable outdoor testbed and the testing of an integrated auto-dimming lighting and automated blind system in the tropics, in: Proceedings of the World Sustainable Built Environment Conference (WSBE 2017), Hong Kong, 2017.

Lamano A.S., Yang S, Wan M.P et al. (2018). Energy Performance of an Integrated Automated Blinds and Dimmable Lighting System with Model-Predictive Control (MPC). COBEE2018.

Yang, Shiyu, et al. "An adaptive robust model predictive control for indoor climate optimization and uncertainties handling in buildings." *Building and Environment* 163 (2019): 106326.

Xu, T. (2005). Best Practices for Energy Efficient Cleanrooms: Control of Chilled Water System (LBNL-58635). Ernest Orlando Lawrence Berkeley National Laboratory, Berkeley, CA (US).

HVAC factsheet—Chiller efficiency. (2013). [online] Canberra: Department of the Environment and Energy. Available at: https://www.energy.gov.au/sites/default/files/hvac-factsheet-chiller-efficiency.pdf.

Yang, Shiyu, et al. "Experimental study of model predictive control for an air-conditioning system with dedicated outdoor air system." Applied Energy.

Yang, Shiyu, et al. "Experimental study of a model predictive control system for active chilled beam (ACB) air-conditioning system." *Energy and Buildings* 203 (2019): 109451.

Huchuk B., "Model-Based Predictive Control of Window Shades" Master Thesis, Carleton University, Jul. 31, 2014.

Coffey B., "Integrated control of operable fenestration systems and thermally massive HVAC systems: Methods and simulation studies of energy savings potential" Technical Report. Oct. 4, 2012.

\* cited by examiner

Symbol WV, WP, $\dot{m}$, $T$ and $\psi$ refer to water valve, water pump, mass flow rate, temperature and humidity ratio; Subscripts fa, ma, sa, pa, ACB, cw, cws and z refer to fresh air, mixed air, supply air, pre cooled air, active chilled beam, chilled water, chilled water supply and thermal zone.

| Test | Cell | ACMV system | ACMV Control strategy | Glazing | Shading control | Lighting | Test period (days) |
|---|---|---|---|---|---|---|---|
| 1 | Test Cell | Conventional FCU | MPC | EC | 0.38 | Constant | 3 |
|   | Ref. Cell | Conventional FCU | BMS | Low-e | - | Constant |   |
| 2 | Test Cell | ACB | MPC | EC | 0.38 | Constant | 4 |
|   | Ref. Cell | Conventional FCU | BMS | Low-e | - | Constant |   |
| 3 | Test Cell | ACB | MPC | EC | MPC | Auto-dimming | 2 |
|   | Ref. Cell | Conventional FCU | BMS | Low-e | - | Auto-dimming |   |
| 4 | Test Cell | ACB | MPC | EC | MPC | Auto-dimming | 4 |
|   | Ref. Cell | Conventional FCU | BMS | Low-e | - | Constant |   |

FIG. 20

1. Temperature-Humidity-Pressure-Lux sensor, 2. Air velocity sensor, 3. Globe temperature sensor

FIG. 28

METHOD AND CONTROL SYSTEM FOR CONTROLLING BUILDING SERVICE SYSTEMS

CROSS-REFERENCE TO RELATED APPLICATION

This application is a national phase entry of PCT/SG2020/050015, filed on 13 Jan. 2020, which claims the benefit of priority of Singapore Patent Application No. 10201900288S, filed on 11 Jan. 2019, the contents of which being hereby incorporated by reference in their entirety for all purposes.

TECHNICAL FIELD

The present invention generally relates to a method of controlling building service systems and a control system thereof, and more particularly, for optimizing a plurality of building performance parameters in providing an environment (e.g., a desired indoor environment) with respect to a region of the building.

BACKGROUND

According to previous studies, energy consumption in buildings may reach between 22% to 40% the rate of worldwide energy consumption and about 70% of the building final energy consumption may be used by air-conditioning system and artificial lighting. In Singapore, for example, the electrical energy consumed by the building sector has increased about 21% from the year 2008 to 2015 and has been found to take up more than 38% of the nation's electricity.

Previous studies have reported that most buildings are not operating as efficiently as they could be. Building automation and control (BAC) system with advanced control methods have been suggested to be a potential technology that may improve building energy efficiency. According to a recent market report in 2017, the demand for energy efficient BAC system is rapidly growing, especially in the Asian-Pacific region. The high demand was expected to drive the BAC market to develop rapidly, which was valued at USD 53.66 billion in 2016 and was expected to reach USD 99.11 billion by 2022, at a CAGR (Compound Annual Growth Rate) of 10.73% between 2017 and 2022. Major companies in the BAC system include, for example but are not limited to, Honeywell International Inc. (U.S.), Siemens AG (Germany), Johnson Controls International PLC (Ireland), Schneider Electric SE (France), United Technologies Corp. (U.S.), Robert Bosch GmbH (Germany), Legrand SA (France), Hubbell Inc. (U.S.), ABB Ltd. (Switzerland), Ingersoll-Rand Plc (Ireland), Lutron Electronics Co., Inc. (U.S.), Crestron Electronics, Inc. (U.S.), and BuildingIQ (U.S.).

Although BAC systems provided by various companies are already well-developed, the core control method in these BAC systems may still be based on reactive control, such as on/off and proportional-integral-derivative (PID) controllers, which has several major limitations. For instance, in an air-conditioning and mechanical ventilation (ACMV) system, a room temperature controller (thermostat) typically responds to an instantaneous room temperature measurement and then compare such a measurement against a pre-set room temperature set point to determine an appropriate control action. Due to the complexity of a building and its ACMV system, it may not be possible for reactive control to achieve the desired room condition based on past information (e.g., past measurements). In addition, reactive control is typically only configured for a single input system (e.g., a heating, ventilation and air-conditioning (HVAC) or ACMV system) and barely coordinates with other systems, which means that the controllers in conventional BAC systems may only be centralized but not integrated. For example, limitations in the conventional reactive BAC systems may cause various problems, such as over-cooling, resulting in low energy efficiency and unsatisfactory human comfort.

Methods have been previously disclosed for improving BAC systems for buildings using model predictive control (MPC), by attempting to address various limitations due to reactive control implementations. FIG. 1 depicts a schematic drawing illustrating a basic concept of MPC. In general, MPC employs a mathematical model of a controlled system to predict the future response of the controlled system with inputs including measurements at current time step k and target, and constraints in future time k–k+N, such as shown in FIG. 1. The future response of the controlled system may be optimized by solving the optimal control input in the prediction horizon 10 to track the pre-defined target 16. Subsequently, MPC may send the optimal input in the first control interval to implement and repeat the process at the next time step, k+1. As the mathematical model in MPC may be a multiple-inputs-multiple-outputs model, one MPC controller is capable of optimizing the control signals for multiple systems.

As an illustrative comparison, FIG. 2A depicts a schematic drawing of a conventional control system 200 based on a reactive controller 206, and more specifically, a PID controller, and FIG. 2B depicts a schematic drawing of a control system 250 based on MPC.

Several methods previously disclosed for improving BAC systems for buildings using MPC or other optimal control methods will now be briefly mentioned below.

U.S. Pat. No. 8,600,561 B1, by Modi et al. (2013), "Radiant Heating Controls and Methods for an Environmental Control System", discloses a system configured to use predictive control to condition an enclosure which may enhance the functionality of HVAC systems. The system employs a parameterized model, which is modeled based on historical data, to predict the ambient temperature of the enclosure responsive to a candidate radiant heating control strategy. The system also optimizes the control strategy to minimize the temperature difference between a set point and an ambient temperature of the enclosure.

U.S. Patent No. 2016/0091904 A1, by Horesh et al. (2016), "HVAC System Control Integrated with Demand Response, On-Site Energy Storage System and on-Site Energy Generation System", discloses a control system for ACMV system using MPC. MPC in the control system employs a thermal behavior model of buildings based on time series data to optimize building energy and room temperature with inputs of dynamic grid energy cost or energy storage cost.

U.S. Patent No. 2016/0305678 A1, by Pavlovski et al. (2016), "Predictive Building Control System and Method for Optimizing Energy Use and Thermal Comfort for a Building or Network of Buildings", discloses a system for controlling the temperature in a thermal zone within a building. The method uses MPC to minimize energy use by the building and maintain room temperature within a desired range with the inputs of forecasted ambient temperature. The predictive model of buildings is trained based on historical measured data.

U.S. Patent No. 2018/0004172 A1, by Patel et al. (2018), "HVAC System Using Model Predictive Control with Distributed Low-Level Airside Optimization", discloses a HVAC system using MPC for optimizing the load profile and temperature set point of the air side. The MPC control system aims at minimizing the HVAC system energy cost while building temperature is within constraints.

U.S. Patent No. 2018/0004173, by Patel et al. (2018), "Variable Refrigerant Flow System with Multi-Level Model Predictive Control" discloses a MPC system to optimize energy cost in a variable refrigerant flow system, which includes an outdoor subsystem and a plurality of indoor subsystems. MPC is used to generate an optimal indoor subsystem load profile and optimal indoor set points for the indoor subsystem. The control system seeks to minimize energy consumed by the variable refrigerant flow system.

The above-mentioned existing control systems based on MPC may optimize the energy consumption in HVAC or ACMV systems. However, the optimization of multiple performance objectives in addition to energy efficiency performance are not disclosed. These existing control systems also do not integrate MPC of HVAC or ACMV systems with other building service systems. Accordingly, these existing control systems based on MPC, although may result in an improved building performances in providing an environment in a region of the building over conventional control systems based on reactive controllers, may still only focus on controlling the HVAC or ACMV system to provide a desired environment with respect to one performance objective, in particular, an energy efficiency performance. Accordingly, these existing control systems may still fail to take into account other factors that may materially affect building performances in providing the environment in the region of the building, and thus may be prone to or may suffer from deterioration in building performances if or when such other factors materially affect the environment in the region, thereby affecting building performance reliability.

A need therefore exists to provide a method of controlling building service systems and a control system thereof, that seek to overcome, or at least ameliorate, one or more of the deficiencies in conventional methods or control systems for controlling building service system(s), such as but not limited to, enhancing building performances in providing an environment (e.g., a desired indoor environment) in a region of a building. It is against this background that the present invention has been developed.

SUMMARY

According to a first aspect of the present invention, there is provided a method of controlling building service systems associated with a building for optimizing a plurality of building performance parameters in providing an environment with respect to a region of the building, using at least one processor, the building service systems comprising an air-conditioning and/or heating system, a lighting system and a shading system, the method comprising:
predicting, based on a shading and lighting prediction model, a visual comfort condition and a lighting condition with respect to the region of the building;
optimizing, based on a first multi-component cost function including a plurality of components relating to a plurality of lighting or thermal performance parameters with respect to the region of the building, one or more first control parameters for controlling the lighting system and the shading system based on the predicted visual comfort condition and the predicted lighting condition;
predicting, based on a building dynamics model, a plurality of building response parameters based on the predicted visual comfort condition and the predicted lighting condition associated with the region of the building;
optimizing, based on a second multi-component cost function including a plurality of components relating to the plurality of building performance parameters, one or more second control parameters for controlling the air-conditioning and/or heating system based on the predicted plurality of building response parameters,
wherein the shading and lighting prediction model comprises:
a daylight penetration model configured to estimate a transmitted daylight illuminance associated with the shading system with respect to the region of the building;
a visual comfort model configured to predict the visual comfort condition based on the estimated transmitted daylight illuminance; and
a lighting power model configured to predict the lighting condition based on the estimated transmitted daylight illuminance.

According to a second aspect of the present invention, there is provided a control system for controlling building service systems associated with a building for optimizing a plurality of building performance parameters in providing an environment with respect to a region of the building, the building service systems comprising an air-conditioning and/or heating system, a lighting system and a shading system, the control system comprising:
a memory; and
at least one processor communicatively coupled to the memory and configured to:
predict, based on a shading and lighting prediction model, a visual comfort condition and a lighting condition with respect to the region of the building;
optimize, based on a first multi-component cost function including a plurality of components relating to a plurality of lighting or thermal performance parameters with respect to the region of the building, one or more first control parameters for controlling the lighting system and the shading system based on the predicted visual comfort condition and the predicted lighting condition;
predict, based on a building dynamics model, a plurality of building response parameters based on the predicted visual comfort condition and the predicted lighting condition associated with the region of the building; and
optimize, based on a second multi-component cost function including a plurality of components relating to the plurality of building performance parameters, one or more second control parameters for controlling the air-conditioning and/or heating system based on the predicted plurality of building response parameters,
wherein the shading and lighting prediction model comprises:
a daylight penetration model configured to estimate a transmitted daylight illuminance associated with the shading system with respect to the region of the building;

a visual comfort model configured to predict the visual comfort condition based on the estimated transmitted daylight illuminance; and a lighting power model configured to predict the lighting condition based on the estimated transmitted daylight illuminance.

According to a third aspect of the present invention, there is provided a computer program product, embodied in one or more non-transitory computer-readable storage mediums, comprising instructions executable by at least one processor to perform a method of controlling building service systems associated with a building for optimizing a plurality of building performance parameters in providing an environment with respect to a region of the building, using at least one processor, the building service systems comprising an air-conditioning and/or heating system, a lighting system and a shading system, the method comprising:

predicting, based on a shading and lighting prediction model, a visual comfort condition and a lighting condition with respect to the region of the building;

optimizing, based on a first multi-component cost function including a plurality of components relating to a plurality of lighting or thermal performance parameters with respect to the region of the building, one or more first control parameters for controlling the lighting system and the shading system based on the predicted visual comfort condition and the predicted lighting condition;

predicting, based on a building dynamics model, a plurality of building response parameters based on the predicted visual comfort condition and the predicted lighting condition associated with the region of the building; and optimizing, based on a second multi-component cost function including a plurality of components relating to the plurality of building performance parameters, one or more second control parameters for controlling the air-conditioning and/or heating system based on the predicted plurality of building response parameters, wherein the shading and lighting prediction model comprises:

a daylight penetration model configured to estimate a transmitted daylight illuminance associated with the shading system with respect to the region of the building;

a visual comfort model configured to predict the visual comfort condition based on the estimated transmitted daylight illuminance; and a lighting power model configured to predict the lighting condition based on the estimated transmitted daylight illuminance.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 12A shows the location of supply diffuser and exhaust grille and FIG. 12B shows the location of lights, sensors and internal load simulators;

FIG. 20 depicts a table showing an example setup and schedule of four tests for the MPC system, according to various example embodiments of the present invention;

FIG. 28 depicts a table of an example weekly class schedule in the test room;

DETAILED DESCRIPTION

Figure 1:
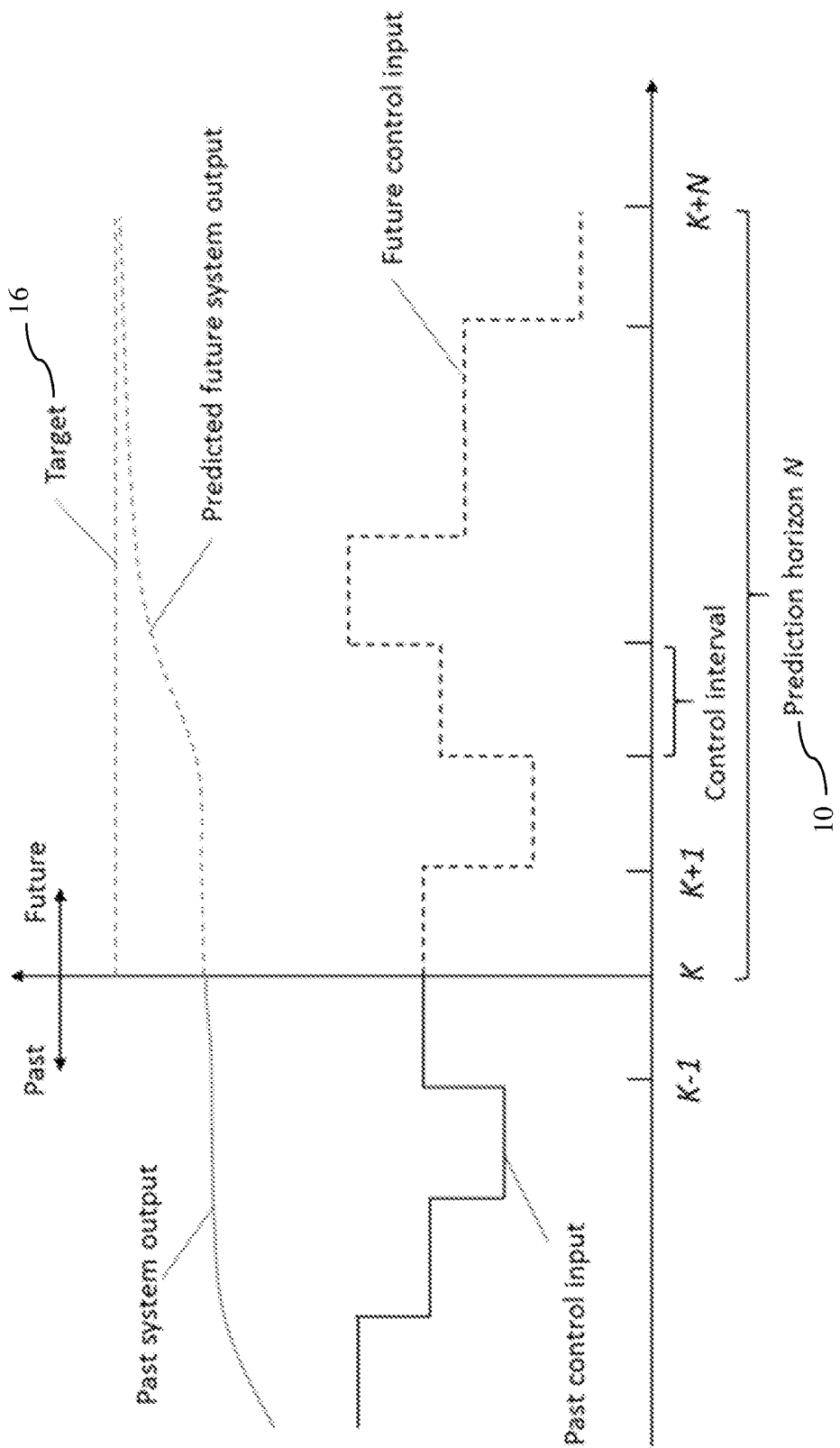
FIG. 1 depicts a schematic drawing illustrating a basic concept of model predictive control (MPC)
Figure 2A:
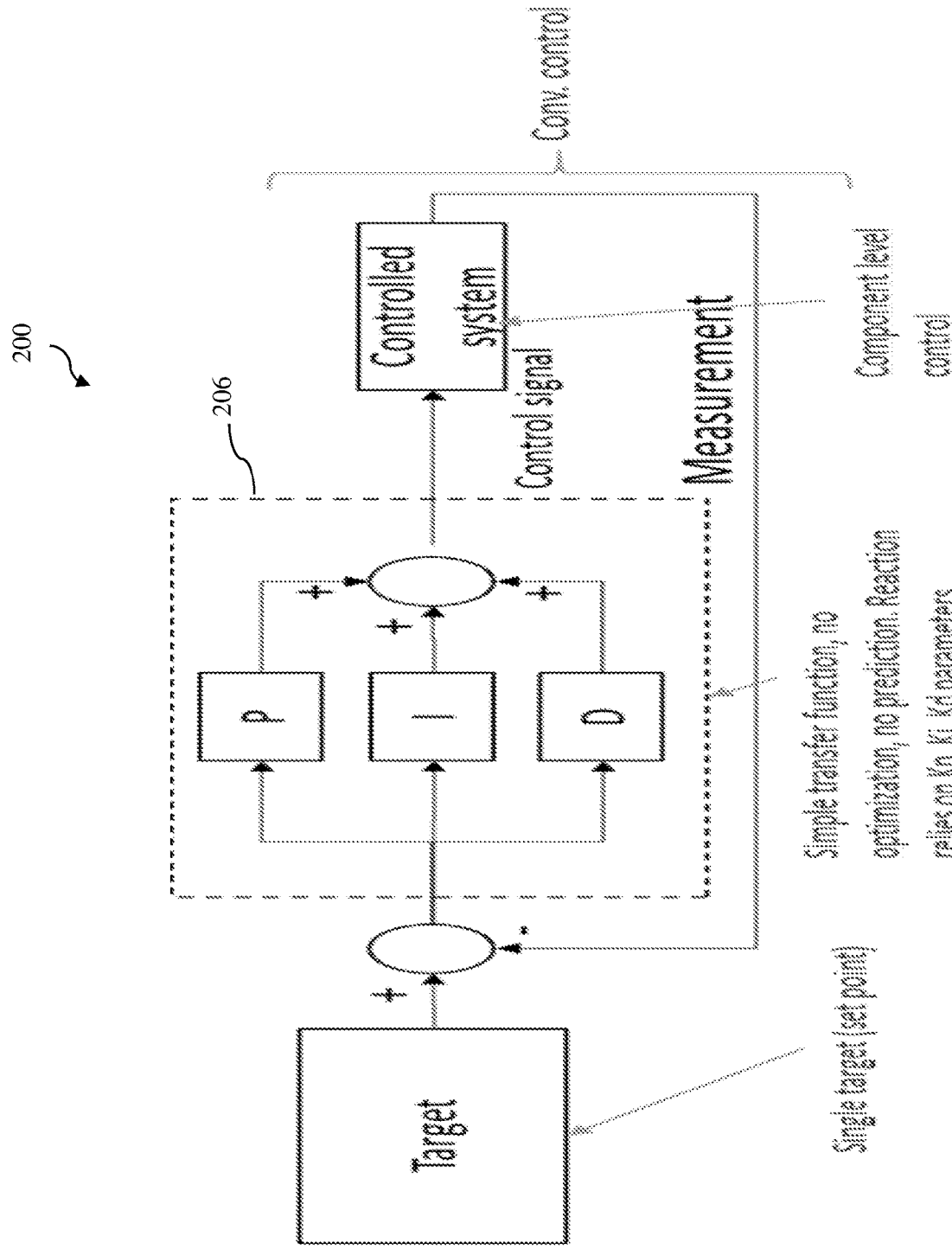
FIG. 2A depicts a schematic drawing of a conventional control system based on a reactive controller.
Figure 2B:
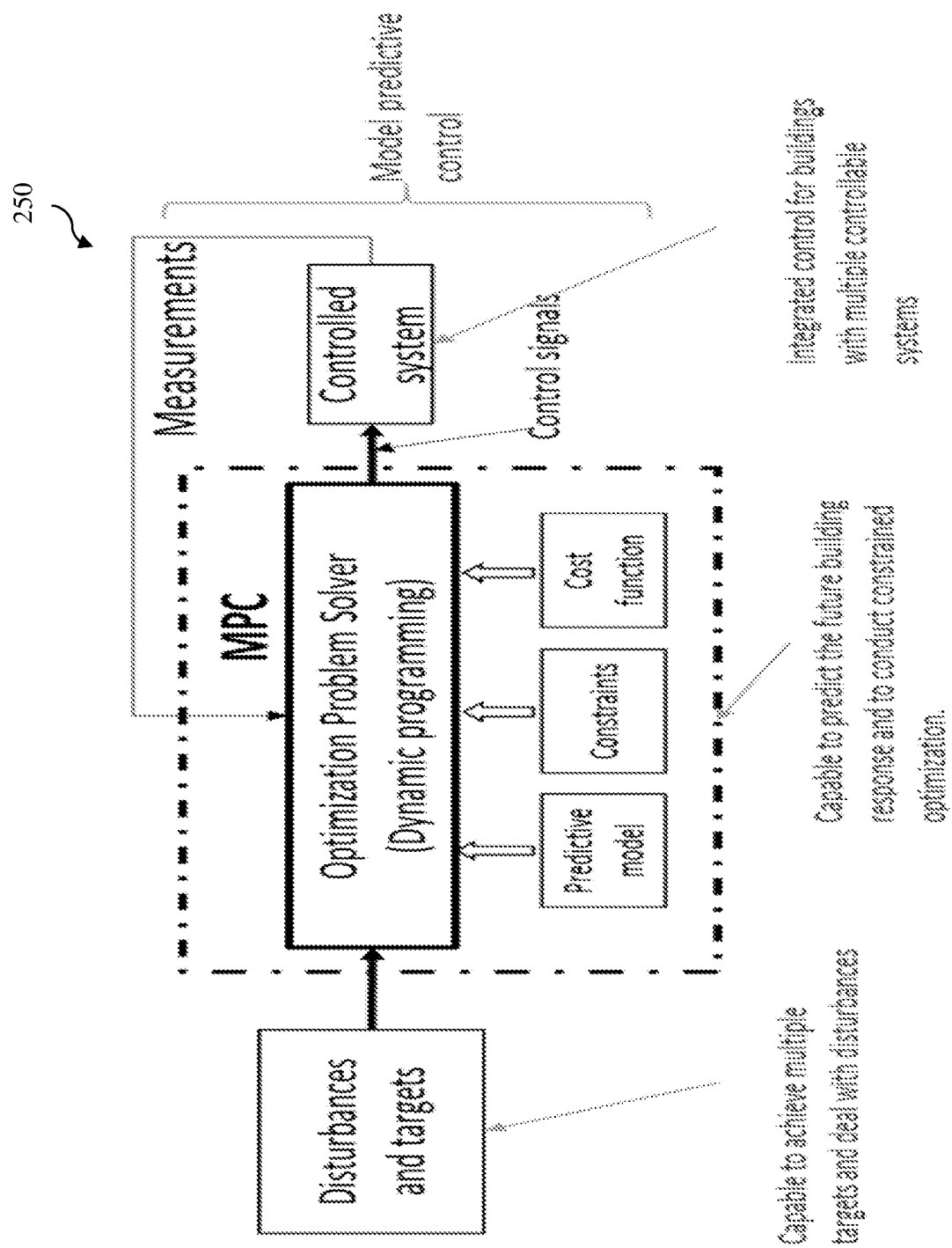
FIG. 2B depicts a schematic drawing of a control system based on MPC.

Various embodiments of the present invention provide a method of controlling building service systems and a control system thereof, and more particularly, for optimizing a plurality of building performance parameters in providing an environment (e.g., a desired indoor environment) with respect to a region of the building.

As mentioned in the background, energy consumption in buildings accounts for a significant portion of worldwide energy consumption, and of the energy consumption in a building, a majority may be attributed to a heating and/or air-conditioning system, such as a heating, ventilation, and air-conditioning (HVAC) system or an air-conditioning and mechanical ventilation (ACMV), in providing an environment within a building.

Conventionally, building automation and control (BAC) system with advanced control methods have been provided for improving building energy efficiency in providing an environment within a building. However, as mentioned in the background, in conventional BAC systems, the core control method may still be based on reactive control, such as on/off and proportional-integral-derivative (PID) controllers, which has several major limitations. For instance, in an ACMV system, a room temperature controller (thermostat) typically responds to an instantaneous room temperature measurement and then compare such a measurement against a pre-set room temperature set point to determine an appropriate control action. Due to the complexity of a building and its ACMV system, it may not be possible for reactive control to achieve the desired room condition based on past information (e.g., past measurements). In addition, reactive control is typically only configured for a single input system (e.g., a HVAC or ACMV system) and barely coordinates with other systems, which means that the controllers in conventional BAC systems may only be centralized but not integrated. In contrast, as will be described later, various embodiments of the present invention coordinate a HVAC or ACMV system with other building systems, including a lighting system and a shading system, thus advantageously integrating different controllers of building service systems. For example, various embodiments of the present invention identified that using room air temperature for room air conditioning control limits the system from achieving thermal comfort for occupants since thermal comfort is affected by a number of other parameters (e.g., air velocity, humidity, radiative heat exchanges, and so on). For example, limitations in the conventional reactive BAC systems may cause various problems, such as over-cooling, resulting in low energy efficiency and unsatisfactory human comfort.

As also mentioned in the background, methods have been previously disclosed for improving BAC systems for buildings using model predictive control (MPC), by attempting to address various limitations due to reactive control implementations. Various embodiments of the present invention identified that although existing control systems based on MPC, such as those mentioned in the background, may optimize the energy consumption in HVAC or ACMV systems, the optimization of multiple objectives in addition to energy efficiency performance are not disclosed. These existing control systems also do not integrate MPC of HVAC or ACMV systems with other building service systems. Accordingly, it is identified according to various embodiments that existing control systems based on MPC, although may result in an improved building performances in providing an environment in a region of the building over conventional control systems based on reactive controllers, may still only focus on controlling the HVAC or ACMV system to provide a desired environment with respect to one performance objective, in particular, an energy efficiency performance. Therefore, these existing control systems may still fail to take into account other factors that may materially affect building performances in providing the environment in the region of the building, and thus may be prone to or may suffer from deterioration in building performances if or when such other factors materially affect the environment in the region, thereby affecting building performance reliability.

In view of the above, various embodiments of the present invention provide a method of controlling building service systems and a control system thereof, that seek to overcome, or at least ameliorate, one or more of the deficiencies in conventional methods or control systems for controlling building service system(s), such as but not limited to, enhancing building performances in providing an environment (e.g., a desired indoor environment) in a region of a building. In particular, various embodiments of the present invention provide a method of controlling building service systems and a control system thereof, for optimizing a plurality of building performance parameters in providing an environment with respect to a region of the building. It will be appreciated by a person skilled in the art that the above-mentioned region may refer to any one or more enclosures or one or more enclosed areas within a building, such as but not limited to, a room (e.g., an office room, a meeting room, an apartment room, a hotel room and so on), an open-plan office space, a lecture hall, a theatre, so on. It will be appreciated by a person skilled in the art that the above-mentioned environment may refer an indoor environment within the region conditioned or regulated by the building service systems.

It will also be appreciated by a person skilled in the art that the method of controlling building service systems and a control system thereof, for optimizing a plurality of building performance parameters in providing an environment with respect to a region of the building, may also be applied or employed with respect to each region (e.g., each predetermined or selected region) of the building. Accordingly, the building performance parameters with respect to each region of the building may be optimized.

Figure 3:
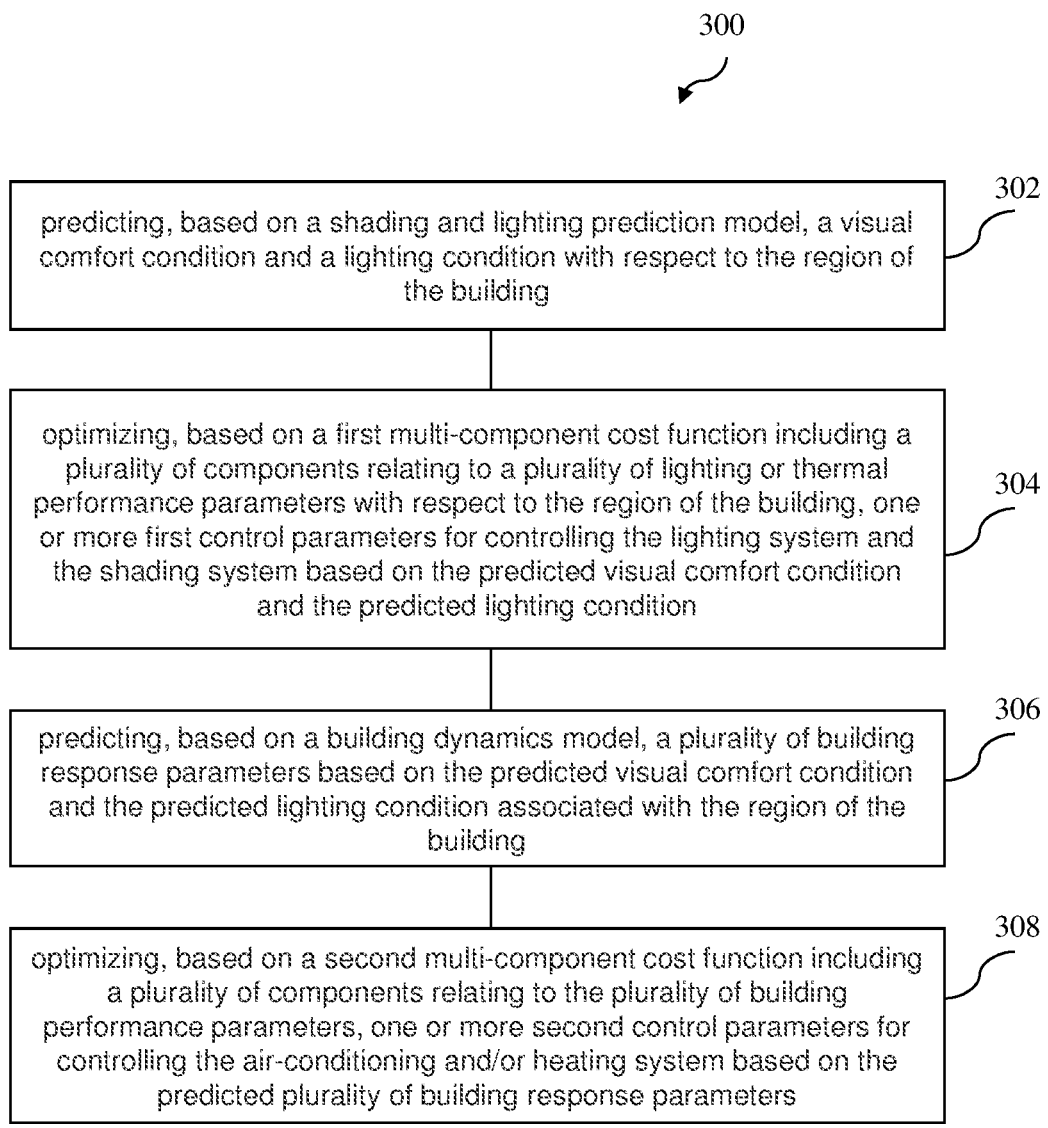
FIG. 3 depicts a flow diagram of a method of controlling building service systems associated with a building for optimizing a plurality of building performance parameters in providing an environment with respect to a region of the building, according to various embodiments of the present invention.

FIG. 3 depicts a flow diagram of a method 300 of controlling building service systems associated with a building for optimizing a plurality of building performance parameters in providing an environment with respect to a region of the building, using at least one processor, the building service systems comprising an air-conditioning and/or heating system, a lighting system and a shading system. The method 300 comprises: predicting (at 302), based on a shading and lighting prediction model, a visual comfort condition and a lighting condition with respect to the region of the building; optimizing (at 304), based on a first multi-component cost function including a plurality of components relating to a plurality of lighting or thermal performance parameters with respect to the region of the building, one or more first control parameters for controlling the lighting system and the shading system based on the predicted visual comfort condition and the predicted lighting condition; predicting (at 306), based on a building dynamics model, a plurality of building response parameters based on the predicted visual comfort condition and the predicted lighting condition associated with the region of the building; optimizing (at 308), based on a second multi-component cost function including a plurality of components relating to the plurality of building performance parameters, one or more second control parameters for controlling the air-conditioning and/or heating system based on the predicted plurality of building response parameters. In particular, the shading and lighting prediction model comprises: a daylight penetration model configured to estimate a transmitted daylight illuminance associated with the shading system with respect to the region of the building; a visual comfort model configured to predict the visual comfort condition based on the estimated transmitted daylight illuminance; and a lighting power model configured to predict the lighting condition based on the estimated transmitted daylight illuminance.

In various embodiments, the above-mentioned providing an environment with respect to a region of the building may refer to conditioning or regulating the environment in or within the region.

In various embodiments, the above-mentioned air-conditioning and/or heating system include, but not limited to, a HVAC or ACMV system. It will be appreciated that the present invention is not limited to any particular or specific air-conditioning and/or heating system, as long as it is capable of being controlled based on inputs to condition or regulate the environment in the region at least with respect to temperature.

In various embodiments, the above-mentioned lighting system may include one or more artificial light sources configured to emit light into the environment. Furthermore, the lighting system may be controllable based on one or more inputs to adjust one or more properties of the light generated by the artificial light sources, such as but not limited to, intensity.

In various embodiments, the above-mentioned shading system may include one or more shading members, each being controllable for blocking light (e.g., external natural light) from being transmitted through a corresponding opening (or window) associated with the region. In various embodiments, each shading member may be controllable for fully blocking light or partially blocking light from being transmitted through the corresponding opening. In various embodiments, each shading member may be controllable to block a desired or determined amount (e.g., percentage) of light from being transmit through the corresponding opening and into the region. A large variety of shading members are known in the art and it will be appreciated by a person skilled in the art that the present invention is not limited to any particular type or form of shading members, as long as the shading member is capable of being controlled for blocking light from being transmitted through a corresponding opening associated with the region of the building.

Accordingly, the method 300 of controlling building service systems according to various embodiments of the present invention not only advantageously uses model predictive control (MPC), the control of the air-conditioning and/or heating system is further advantageously integrated with the control of other building service systems, including the lighting system and the shading system. Furthermore, based on the integrated control of multiple building service systems, including the air-conditioning and/or heating system, the lighting system and the shading system, the method 300 advantageously controls such multiple building service systems for optimizing a plurality of building performance parameters in providing an environment (e.g., desired indoor environment) with respect to the region of the building, thus, advantageously enabling multiple performance objectives to be achieved. In various embodiments, the plurality of building performance parameters may include a building energy efficiency parameter, a human thermal comfort parameter and a human visual comfort parameter. Accordingly, the method 300 advantageously takes into account additional factors that may materially affect building performances in providing the environment in the region of the building, thereby improving building performance reliability.

In various embodiments, the visual comfort model and the lighting power model are each based on a data-driven model, and the daylight penetration model is based on a non-data-driven model. In various embodiments, a data-driven model may be a model that involves training (e.g., is produced by being trained) based on labelled data to make a prediction or estimation (output) for a given input, such as a machine learning model. In various embodiments, a non-data-driven model may be a model that does not involve training (e.g., is not produced by being trained) based on labelled data to make a determination or an estimate (output) for a given input. For example, the non-data-driven model may include a set of functions configured to determine an output directly based on measured data, instead of the measured data being used to train a machine learning model. Accordingly, the shading and lighting prediction model may be referred to as a hybrid model as it includes different types of models (data-driven model and non-data-driven model). In this regard, for performing integrated control of multiple building service systems, including the air-conditioning and/or heating system, the lighting system and the shading system, for optimizing a plurality of building performance parameters (e.g., a building energy efficiency parameter, a human thermal comfort parameter and a human visual comfort parameter) in providing an environment with respect to a region of the building, various embodiments advantageously provide a shading and lighting prediction model that is computationally efficient in real-time for predicting a visual comfort condition and a lighting condition with respect to the region of the building. In particular, by configuring the daylight penetration model to be a non-data-driven model, thereby resulting in the shading and lighting prediction model being a hybrid model, significantly less measured data are required, resulting in improvement in computational efficient.

In various embodiments, the daylight penetration model is configured to estimate the transmitted daylight based on an incident solar irradiance on one or more windows associated with the shading system.

In various embodiments, the incident solar irradiance comprises a diffuse irradiance component, a direct irradiance component and a ground-reflected irradiance component.

In various embodiments, the visual comfort condition comprises a maximum illuminance at a work plane in the region of the building, and the visual comfort model is trained based on measured data for predicting the maximum illuminance at the work plane based on the estimated transmitted daylight illuminance.

In various embodiments, the lighting condition comprises a lighting power in the region of the building, and the lighting power model is trained based on measured data for predicting the lighting power based on the estimated transmitted daylight illuminance.

In various embodiments, the plurality of components of the second multi-component cost function comprises a first component relating to a cooling energy, a second component relating to a thermal comfort, a third component relating to a cooling power change rate, and a fourth component relating to constraints.

In various embodiments, the above-mentioned optimizing, based on the second multi-component cost function, is based on a minimization function with respect to a consumption of the cooling energy, a predicted mean vote (PMV) variation from thermo-neutral, the cooling power change rate, and constraints violation.

In various embodiments, the plurality of components of the first multi-component cost function comprises a first component relating to a lighting power, a second component relating to a cooling power associated with heat flux gain from lighting associated with the lighting system, and a third component relating to a cool power associated with heat flux gain from one or more windows associated with the shading system.

In various embodiments, the above-mentioned optimizing, based on the first multi-component cost function, is based on minimizing electricity power of the lighting associated with the lighting system and the cooling power due to the heat flux gain from the lighting associated with the lighting system and the heat flux gain from the one or more windows associated with the shading system.

In various embodiments, the above-mentioned optimizing, based on the first multi-component cost function, and the above-mentioned optimizing, based on the second multi-component cost function, are based on model predictive control.

Figure 4:
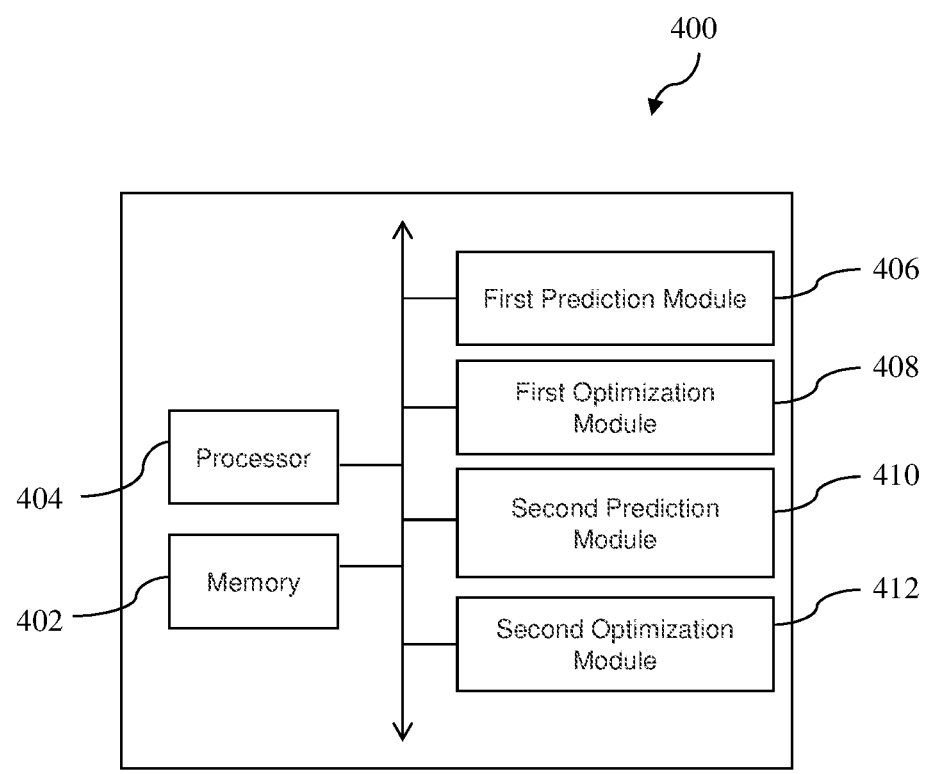
FIG. 4 depicts a schematic block diagram of a control system for controlling building service systems associated with a building for optimizing a plurality of building performance parameters with respect to a region of the building, according to various embodiments of the present invention, such as corresponding to the method shown in FIG. 3.

FIG. 4 depicts a schematic block diagram of a control system 400 for controlling building service systems associated with a building for optimizing a plurality of building performance parameters with respect to a region of the building, according to various embodiments of the present invention, such as corresponding to the method 300 of controlling building service systems as described hereinbefore according to various embodiments of the present invention. The building service systems comprising an air-conditioning and/or heating system, a lighting system and a shading system. The control system 400 comprises a memory 402, and at least one processor 404 communicatively coupled to the memory 402 and configured to: predict, based on a shading and lighting prediction model, a visual comfort condition and a lighting condition with respect to the region of the building; optimize, based on a first multi-component cost function including a plurality of components relating to a plurality of lighting or thermal performance parameters with respect to the region of the building, one or more first control parameters for controlling the lighting system and the shading system based on the predicted visual comfort condition and the predicted lighting condition; predict, based on a building dynamics model, a plurality of building response parameters based on the predicted visual comfort condition and the predicted lighting condition associated with the region of the building; and optimize, based on a second multi-component cost function including a plurality of components relating to the plurality of building performance parameters, one or more second control parameters for controlling the air-conditioning and/or heating system based on the predicted plurality of building response parameters. In particular, the shading and lighting prediction model comprises: a daylight penetration model configured to estimate a transmitted daylight illuminance associated with the shading system with respect to the region of the building; a visual comfort model configured to predict the visual comfort condition based on the estimated transmitted daylight illuminance; and a lighting power model configured to predict the lighting condition based on the estimated transmitted daylight illuminance.

It will be appreciated by a person skilled in the art that the at least one processor 404 may be configured to perform the required functions or operations through set(s) of instructions (e.g., software modules) executable by the at least one processor 404 to perform the required functions or operations. Accordingly, as shown in FIG. 4, the system 400 may comprise a first prediction module (or a first prediction circuit) 406 configured to predict, based on a shading and lighting prediction model, a visual comfort condition and a lighting condition with respect to the region of the building; a first optimization module (or a first optimization circuit) 408 configured to optimize, based on a first multi-component cost function including a plurality of components relating to a plurality of lighting or thermal performance parameters with respect to the region of the building, one or more first control parameters for controlling the lighting system and the shading system based on the predicted visual comfort condition and the predicted lighting condition; a second prediction module (or a second prediction circuit) 410 configured to predict, based on a building dynamics model, a plurality of building response parameters based on the predicted visual comfort condition and the predicted lighting condition associated with the region of the building; and a second optimization module (or a second optimization circuit) 412 configured to optimize, based on a second multi-component cost function including a plurality of components relating to the plurality of building performance parameters, one or more second control parameters for controlling the air-conditioning and/or heating system based on the predicted plurality of building response parameters. In particular, the shading and lighting prediction model comprises: a daylight penetration model configured to estimate a transmitted daylight illuminance associated with the shading system with respect to the region of the building; a visual comfort model configured to predict the visual comfort condition based on the estimated transmitted daylight illuminance; and a lighting power model configured to predict the lighting condition based on the estimated transmitted daylight illuminance.

It will be appreciated by a person skilled in the art that the above-mentioned modules are not necessarily separate modules, and one or more modules may be realized by or implemented as one functional module (e.g., a circuit or a software program) as desired or as appropriate without deviating from the scope of the present invention. For example, two or more of the first prediction module 406, the first optimization module 408, the second prediction module 410, and the second optimization module 412 may be realized (e.g., compiled together) as one executable software program (e.g., software application or simply referred to as an "app"), which for example may be stored in the memory 402 and executable by the at least one processor 404 to perform the functions/operations as described herein according to various embodiments.

In various embodiments, the system 400 corresponds to the method 300 as described hereinbefore with reference to FIG. 3, therefore, various functions or operations configured to be performed by the least one processor 404 may correspond to various steps of the method 300 described hereinbefore according to various embodiments, and thus need not be repeated with respect to the system 400 for clarity and conciseness. In other words, various embodiments described herein in context of the methods are analogously valid for the respective systems, and vice versa.

For example, in various embodiments, the memory 402 may have stored therein the first prediction module 406, the first optimization module 408, the second prediction module 410, and/or the second optimization module 412, which respectively correspond to various steps of the method 300 as described hereinbefore according to various embodiments, which are executable by the at least one processor 404 to perform the corresponding functions/operations as described herein.

A computing system, a controller, a microcontroller or any other system providing a processing capability may be provided according to various embodiments in the present disclosure. Such a system may be taken to include one or more processors and one or more computer-readable storage mediums. For example, the system 400 described hereinbefore may include a processor (or controller) 404 and a computer-readable storage medium (or memory) 402 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "predicting", "optimizing", "estimating", "minimizing", "controlling" or the like, refer to the actions and processes of a computer system, or similar electronic device, that manipulates and transforms data represented as physical quantities within the computer system into other data similarly represented as physical quantities within the computer system or other information storage, transmission or display devices.

The present specification also discloses a system (e.g., which may also be embodied as a device or an apparatus), such as the system 400, for performing the operations/functions of the methods described herein. Such a system may be specially constructed for the required purposes, or may comprise a general purpose computer or other device selectively activated or reconfigured by a computer program stored in the computer. The algorithms presented herein are not inherently related to any particular computer or other apparatus. Various general-purpose machines may be used with computer programs in accordance with the teachings herein. Alternatively, the construction of more specialized apparatus to perform the required method steps may be appropriate.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention. It will be appreciated by a person skilled in the art that various modules described herein (e.g., the first prediction module 406, the first optimization module 408, the second prediction module 410, and/or the second optimization module 412) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums (non-transitory computer-readable storage medium), comprising instructions (e.g., the first prediction module 406, the first optimization module 408, the second prediction module 410, and/or the second optimization module 412) executable by one or more computer processors to perform a method 300 of controlling building service systems as described hereinbefore with reference to FIG. 3. Accordingly, various computer programs or modules described herein may be stored in a computer program product receivable by a system therein, such as the system 400 as shown in FIG. 4, for execution by at least one processor 404 of the system 400 to perform the required or desired functions.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

Figure 5:
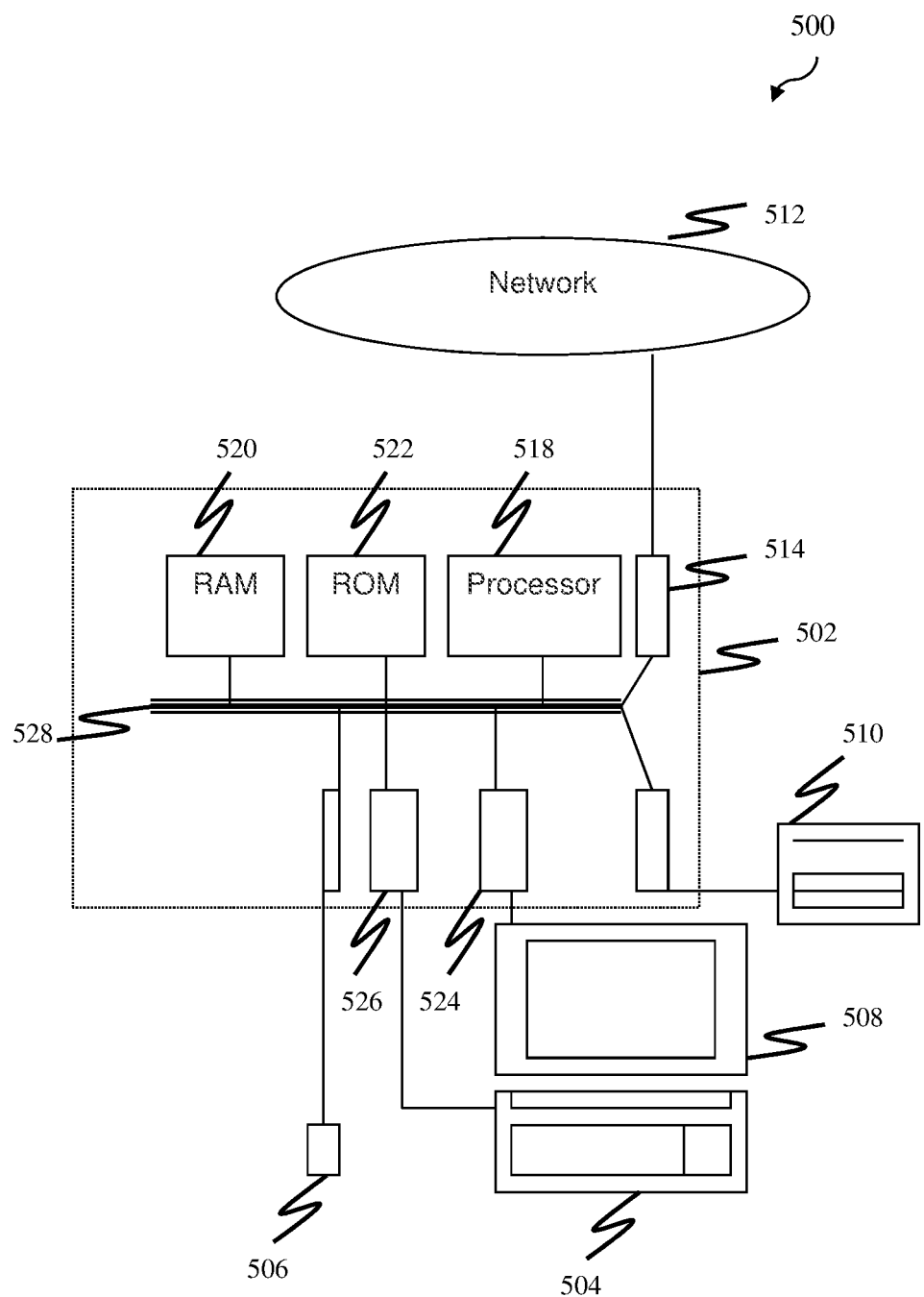
FIG. 5 depicts a schematic block diagram of an exemplary computer system in which a control system for controlling building service systems associated with a building, according to various embodiments of the present invention, may be realized or implemented.

In various embodiments, the system 400 may be realized by any computer system (e.g., desktop or portable computer system) including at least one processor and a memory, such as a computer system 500 as schematically shown in FIG. 5 as an example only and without limitation. Various methods/steps or functional modules (e.g., the first prediction module 406, the first optimization module 408, the second prediction module 410, and/or the second optimization module 412) may be implemented as software, such as a computer program being executed within the computer system 500, and instructing the computer system 500 (in particular, one or more processors therein) to conduct the methods/functions of various embodiments described herein. The computer system 500 may comprise a computer module 502, input modules, such as a keyboard 504 and a mouse 506, and a plurality of output devices such as a display 508, and a printer 510. The computer module 502 may be connected to a computer network 512 via a suitable transceiver device 514, to enable access to e.g., the Internet or other network systems such as Local Area Network (LAN) or Wide Area Network (WAN). The computer module 502 in the example may include a processor 518 for executing various instructions, a Random Access Memory (RAM) 520 and a Read Only Memory (ROM) 522. The computer module 502 may also include a number of Input/Output (I/O) interfaces, for example I/O interface 524 to the display 508, and I/O interface 526 to the keyboard 504. The components of the computer module 502 typically communicate via an interconnected bus 528 and in a manner known to the person skilled in the relevant art.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

Various example embodiments relate to building service systems including an air-conditioning and/or heating system, a lighting system, a shading system and a building management system (BMS). For the sake of simplicity and clarity and unless stated otherwise, various example embodiments will hereinafter be described with the air-conditioning and/or heating system being an ACMV system. However, it will be appreciated by a person skilled in the art that the present invention is not limited to an ACMV system and may be any other type of air-conditioning and/or heating system, as long as it is capable of being controlled based on inputs to condition or regulate the environment in a region of a building at least with respect to temperature. Furthermore, also for the sake of simplicity and clarity and unless stated otherwise, various example embodiments will hereinafter be described with the region being a single or an individual room. In particular, various example embodiments relate to integrated control of ACMV, lighting, and shading systems for multi-objective optimization for building energy and human comfort using MPC.

Various example embodiments provide an MPC system that allows integrated control of multiple building services including ACMV system, automated dimming system for lighting and automated window shading system for multi-objective optimization of building energy and indoor human comfort.

According to various example embodiments, there is provided a process control system configured for optimizing energy consumption and human comfort in a room of a building. The process control system may comprise:

i. a shading system including a shading member for providing shade, a shading model, a shading and lighting cost function and a shading and lighting constraint;
ii. a lighting system including an artificial light source for providing lighting, and a shading and lighting model which are based on a daylight penetration into the room;
iii. an ACMV system including an ACMV member for providing cooling and ventilation, a building dynamic model that comprises a linearized heating, ventilating, and air conditioning (HVAC) system model and a linearized predicted mean vote (PMV) thermal comfort model, an energy and thermal comfort cost function, and a building constraint; and
iv. optimizers configured to output an optimized shading set point for the shading means, an optimized lighting set point for the lighting means and an optimized set point for the HVAC by receiving the daylight penetration, cost functions and constraints from the shading model, lighting model and building dynamics model respectively to provide optimized energy consumption and human comfort, such as by solving the optimization problems described by Equations (1)-(8).

In various example embodiments, the process control system may further optimize additional parameters, such as air quality in a building.

In various example embodiments, the prediction model is based on Model Prediction Control (MPC).

Accordingly, various example embodiments provide an MPC system (e.g., corresponding to the "control system for controlling building service systems" as described hereinbefore according to various embodiments) for integrated services (ACMV system, automated dimming system for lighting and automated shading system) control in buildings that is able to optimize for multiple-objectives, and more particularly, building energy efficiency and human comfort (thermal comfort and visual comfort) (e.g., corresponding to the "plurality of building performance parameters" as described hereinbefore according to various embodiments) in real-time control. In this regard, various example embodiments provide an MPC scheme with multiple-objectives (optimize building energy efficiency, indoor thermal comfort and visual comfort) function to determine optimal control strategies for the ACMV system to optimize building energy efficiency and indoor human comfort. In addition, an integration scheme for controlling multiple building services (ACMV, shading and lighting) with MPC to achieve multiple targets (high-energy efficiency and good thermal and visual comfort) to improve building performance.

Figure 6:
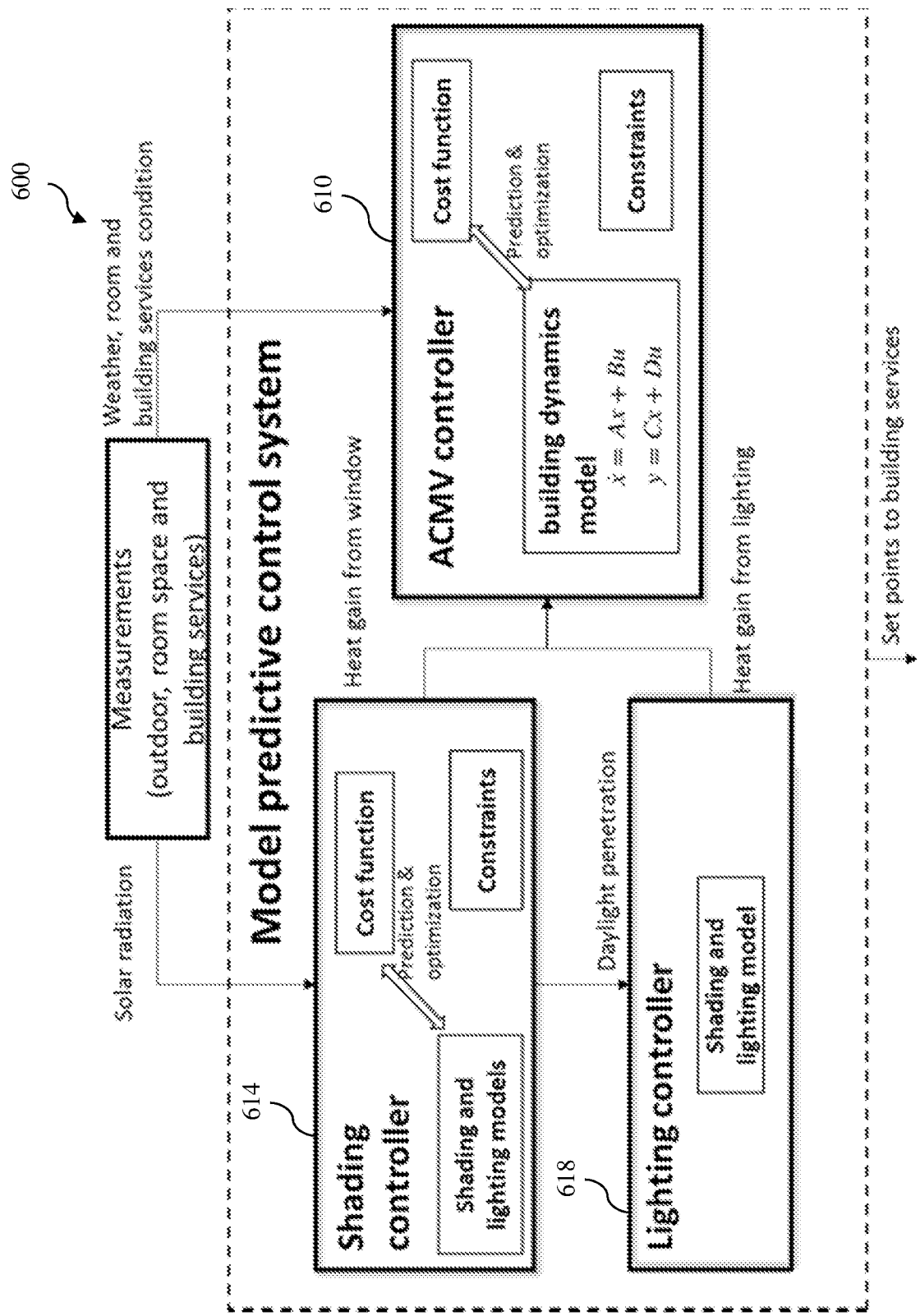
FIG. 6 depicts a schematic drawing showing an example configuration or architecture of an MPC system for integrated services control, according to various example embodiments of the present invention.

FIG. 6 depicts a schematic drawing showing an example configuration or architecture of an MPC system 600 for integrated services control (e.g., corresponding to the "control system for controlling building service systems" as described hereinbefore according to various embodiments, such as shown in FIG. 4), according to various example embodiments. The MPC system 600 comprises three controllers for three systems, respectively, namely, an ACMV controller 610 for the ACMV system, a shading controller 614 for the shading system and a lighting controller 618 for the lighting system. The ACMV controller with MPC may be considered as the main part of the integrated control system 600, which may manage indoor thermal environment and energy consumption by the ACMV system. With measurement inputs (e.g., weather, ACMV system and room condition), information (e.g., heat gain from window and heat gain from lighting) from the shading controller 614 and the lighting controller 618, and internal load (heat gain from occupants and equipment), the fast-response building dynamics model in MPC is able to predict building response (including air temperature, humidity and PMV (predicted mean vote) etc.) in future time. Based on the building response prediction, a multiple-objectives function (cost function) and constraints information, MPC determines the best or optimum control strategies for the ACMV system in prediction horizon for optimizing cooling energy consumption (e.g., corresponding to the "building energy efficiency parameter" described hereinbefore according to various embodiments) and indoor thermal comfort (in particular, human thermal comfort and human visual comfort, e.g., corresponding to the "human thermal comfort parameter" and the "human visual comfort parameter", described hereinbefore according to various embodiments).

With the shading and lighting model, the shading controller 614 may adjust the shading level to optimize indoor visual condition and energy transmitted/generated by windows/lighting according to a cost function. After the control decision of the shading is determined, the heat gain/daylight penetration from windows (e.g., calculated by the daylight penetration model shown in FIG. 9) are passed to ACMV control/lighting control 610. With the daylight penetration information, lighting controller 618 determines the lighting power (e.g., using the lighting power model shown in FIG. 9) and passes the lighting power information (heat gain from lighting) to ACMV controller 610 for ACMV energy efficiency and indoor thermal comfort optimization. In various example embodiments, the cost function for shading and lighting is the same. In various example embodiments, the constraint for shading and lighting is also the same. In various example embodiments, the heat gain from lighting is the same as the lighting power from the lighting power model shown in FIG. 9. In various example embodiments, the heat gain from window is calculated by the daylight penetration model shown in FIG. 9.

Therefore, according to various example embodiments, key features of the MPC system 600, multiple-objectives optimization and integrated control for ACMV, shading and lighting system in buildings, may be achieved based on the following modules/features:
(a) a fast-response building dynamics model (including sub-models for ACMV system, room space, thermal mass, and thermal comfort) which is able to predict room air temperature, mean radiant temperature, and PMV with inputs of designated control strategies, weather conditions and internal heat loads and a hybrid model (e.g., a combination of data-driven model and physics-based mathematical equations) for room visual condition and lighting power calculation; and
(b) a communication technique for real-time data exchange between the MPC system and buildings (building measurement system and building services).

Accordingly, the MPC system 600 according to various example embodiments of the present invention has the following advantages and improvements:
a fast predictive model with multiple-objectives function, which optimizes parameters such as building energy efficiency and indoor human thermal comfort and visual comfort;
integrates multiple building services control comprising ACMV system, shading system and automated lighting system, allowing the implementation of multiple-objectives optimization; and
saves up to 24% building electricity energy consumption compared to conventional BAC system. In parallel, improvement of human comfort is also achieved.

For better understanding of the present invention and without limitation or loss of generality, the MPC system (or control system) 600 will now be described in further details according to various example embodiments of the present invention.

According to various example embodiments, the MPC system 600 enhances building management with the ability to optimize multiple objectives in real-time (e.g., building energy efficiency, human thermal comfort and human visual comfort) without altering existing building services. To achieve the multiple targets, various example embodiments provide a multiple-objectives optimization method for energy and indoor environment management is required. To solve the multiple-objectives optimization problem, various example embodiments provide fast-response models to predict indoor conditions (e.g., temperature, humidity, thermal comfort, illuminance, cooling power, lighting power, and so on). The control strategies generated by the MPC system may be carried out by building service systems (which may simply be referred to as building services), which comprises an ACMV system, a shading system and a lighting system. In various example embodiments, an integrated control technique may be used to coordinate the operations of multiple building service systems. In addition, in various example embodiments, a communication technique may be implemented for data transfer between the MPC system and the multiple building service systems.

Control method or implementation, building models, building services integration and the communication between MPC system 600 and building services will now be described below according to various example embodiments. An experimental prototype study was also conducted in a real building to demonstrate and quantify the building performance improvement brought by the MPC system 600 according to various example embodiments.

1—Control Implementation

In various example embodiments, an objective of the ACMV controller 610 of the MPC system 600 in FIG. 6 is to minimize the total cooling energy consumed by the ACMV system, maintain good indoor thermal comfort and enhance the robustness (e.g., avoid bang-bang control) of the ACMV system control. In various example embodiments, the multiple-objectives optimization (e.g., corresponding to the "second multi-component cost function" described hereinbefore according to various embodiments) may be described by Equation (1) below.

$$J = \text{Min}(\Sigma_{i=0}^{M} \Sigma_{k=0}^{N} \hat{Q}_{i,t+k|t}^{2} + \Sigma_{k=0}^{N} (W_{PMV} \widehat{PMV}_{t+k|t})^{2} + \Sigma_{k=0}^{N} (W_{\Delta Q} \Delta \hat{Q}_{t+k|t})^{2} + \Sigma_{k=0}^{N} W_{\epsilon}(\epsilon_{t+k|t})^{2}), \quad (1)$$

which subjects to the building dynamics represented by a state-space model and constraints, $$\dot{x} = Ax + Bu, y = Cx + Du \quad (2)$$

$$u_{min} \leq u \leq u_{max}, y_{min} \leq y \leq y_{max} \quad (3)$$

In Equation (1), $\hat{Q}$, $\widehat{PMV}$, $W$ and $\epsilon$ refer to normalized cooling power, normalized thermal comfort index (predicted mean vote), weighting factor and slack variable. M and N refer to the number of cooling system and prediction horizon. The subscripts t, i, k and $\Delta$ refer to current time, index for cooling system, index for control interval and change rate, respectively.

The four components on the right-hand side in Equation (1) represent cooling energy, thermal comfort, cooling power change rate and soft constraints, respectively. In various example embodiments, the multiple-objectives may be achieved by minimizing cooling energy consumption, PMV variation from thermo-neutral, and cooling power change rate in a prediction horizon.

The model described by Equation (2) is a fast-response building model for real-time optimization. The fast-response is linear and may be represented by a state-space form. The model may include sub-models for ACMV system, room space, thermal mass, and thermal comfort. The detailed modeling methods are described later below under section "2—Modelling of Building Dynamics".

In Equation (2), matrices A, B, C, and D are state, input, output and feedthrough matrices, respectively. Vectors u, y, x and $\dot{x}$ are system input, output, state and derivative of state, respectively.

The constraints described by Equation (3) are the cooling capacity of ACMV system and room PMV limits (−0.5, 0.5).

In various example embodiments, to avoid non-solution of optimization, soft constraints may be adopted to allow the PMV to exceed the constraints within a certain tolerance range. The tolerance range may be defined by, as shown in Equation (4) below, ECR (Equal Concern for the Relaxation).

$$\widehat{PMV}_{ll} - \epsilon \cdot ECR_{ll} < \widehat{PMV} < \widehat{PMV}_{ul} + \epsilon \cdot ECR_{ul}. \quad (4)$$

In Equation (4), subscripts ll and ul are the lower limit and upper limit for the constraint of PMV index, respectively. The MPC controller compromises between the soft constraints and the objective function. If the optimal slack variable is 0, the MPC controller will not violate the constraints.

Normalized cooling power and PMV index may be defined by, $$\hat{Q} = Q/(Q_{max} - Q_{min}), \quad (5)$$

$$\widehat{PMV} = PMV/(PMV_{max} - PMV_{min}). \quad (6)$$

$PMV_{max}$ and $PMV_{min}$ are the upper and lower limits of PMV index; $Q_{max}$ and $Q_{min}$ are the upper and lower limits of the cooling capacity of ACMV system.

A nonlinear optimization procedure may be employed for shading control as shown in FIG. 6. In various example embodiments, the objective of shading and lighting control (e.g., corresponding to the "first multi-component cost function" described hereinbefore according to various embodiments), described by Equation (7), may be configured to minimize the electricity power of lighting and corresponding cooling power due to the heat flux gain from lighting and windows, while maintaining room visual condition within acceptable range. For office environment, the minimum illuminance level requirement at work plane may be 500. 2000 lux at work plane (e.g., see Nabil and Mardaljevic, "Useful daylight illuminance: a new paradigm for assessing daylight in buildings", Lighting Research & Technology, 37(1), 41-57, 2000) may be chosen as the upper threshold to prevent visual discomfort, which is based on surveys of occupant preferences and behavior in offices with user operated shading devices. The range of daylight glare probability (DGP) is less than 0.35, which means imperceptible glare according to Wienold et al., "Evaluation methods and development of a new glare prediction model for daylight environments with the use of CCD cameras", Energy and Buildings, 38(7), 743-757, 2006.

$$J = \text{Min}((EP_{lig} + EP_{lig}/COP + Q_{win}/COP) \quad (7)$$

where symbols EP, $Q$ and COP refer to electricity power, heat flux, coefficient of performance of a chiller. Subscripts lig and win refer lighting and window.

The three components in the right-hand side in Equation (7) are lighting power, corresponding cooling power to deal with the heat gain from lighting and corresponding cooling power to deal with the heat gain from windows.

The objective function subjects to the constraints:

$$500 \text{ lux} \leq E_{wp} \leq 2000 \text{ lux}; DGP \leq 0.35, \quad (8)$$

where symbols E and DGP refers to illuminance and daylight glare probability, subscript wp refers to work plane.

To obtain the solution of the optimization problem described in Equation (7), models for lighting power prediction and indoor visual condition may be employed. In various example embodiments, a hybrid modelling method (e.g., data-driven and physics-based mathematical equations) is employed for the modelling, which will be described under section "2—Modelling of Building Dynamics".

2—Modelling of Building Dynamics

Figure 7:
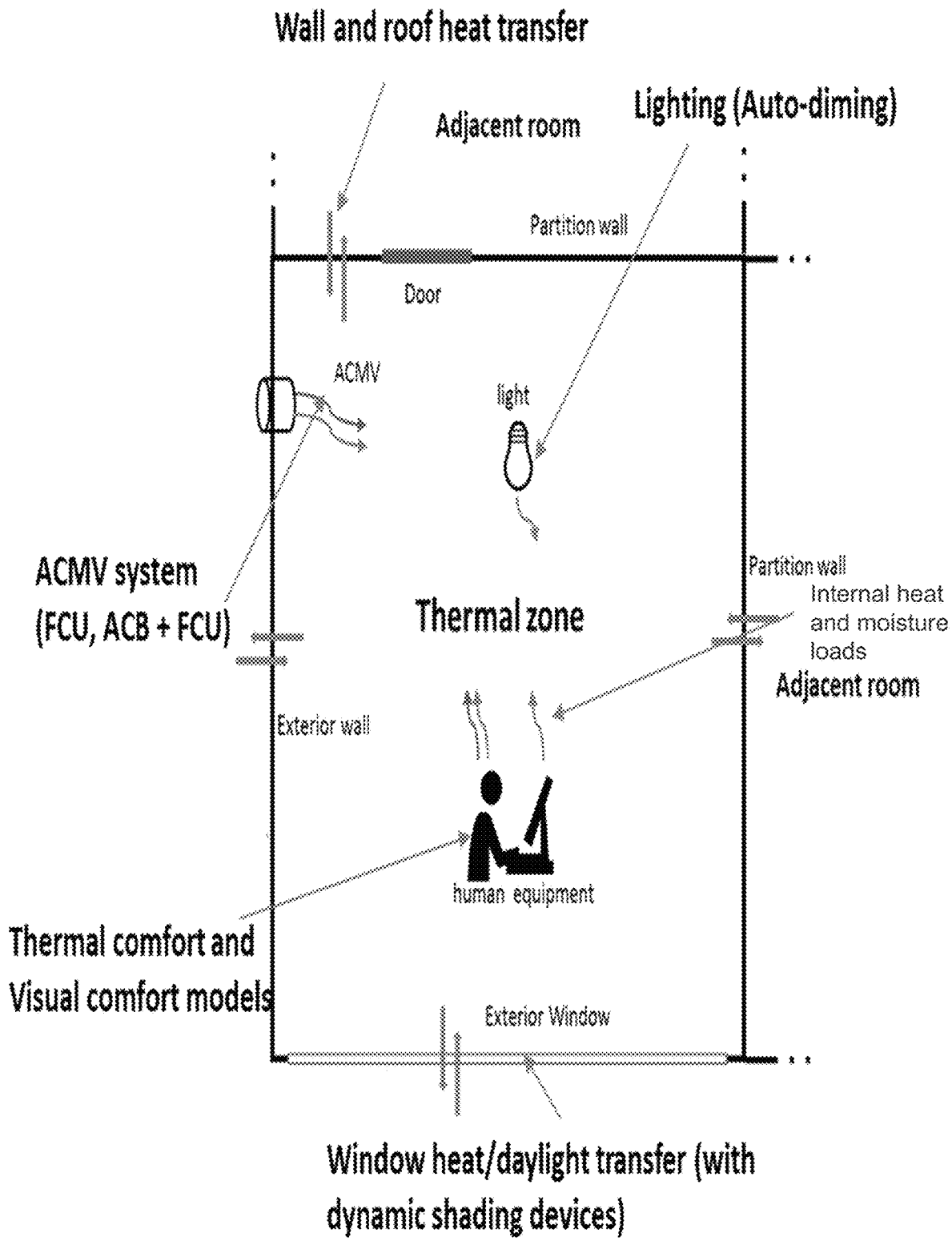
FIG. 7 depicts a schematic drawing illustrating heat and moisture balance inside a room space, according to various example embodiments of the present invention.

In developing a mathematical model, according to various example embodiments, the room space and the ACMV system may be considered as a complex open system with air-moisture mixture gas flow and vapor-water phase change. In the ACMV system, fresh air mixes with the return air before entering the cooling coil. Both the sensible and latent loads of the mixed air are dealt with by the cooling coil. Part of the moisture in the mixed air stream will leave the ACMV system at the cooling coil due to the condensation. The ACMV system supplies the conditioned air (supply air) to the room space. Inside the room space, there are internal heat and moisture sources including human, lighting, and equipment. The room space also exchanges heat with the surroundings through the building envelope, as illustrated in FIG. 7. FIG. 7 depicts a schematic drawing illustrating heat and moisture balance inside a room space.

For air-conditioned room spaces, the heat and moisture balance may be modeled by Equations (9) and (10) as follow, $$m_{air,z}\frac{d\psi_z}{dt} = \dot{m}_{occ} + \dot{m}_{ACMV}, \quad (9)$$

$$m_{air,z}C_{air}\frac{dT_z}{dt} = Q_{inte} + Q_{env} + Q_{ACMV}, \quad (10)$$

where $Q$ is heat flow rate (W), $\dot{m}$ is mass flow rate (kg/s), m is mass (kg), T is temperature (K) and $\psi$ is humidity ratio (kg/kg). The subscript inte refers to internal, z refers to thermal zone, and env refers to envelope.

2.1—Heat Gain Through Building Envelope

Figure 8:
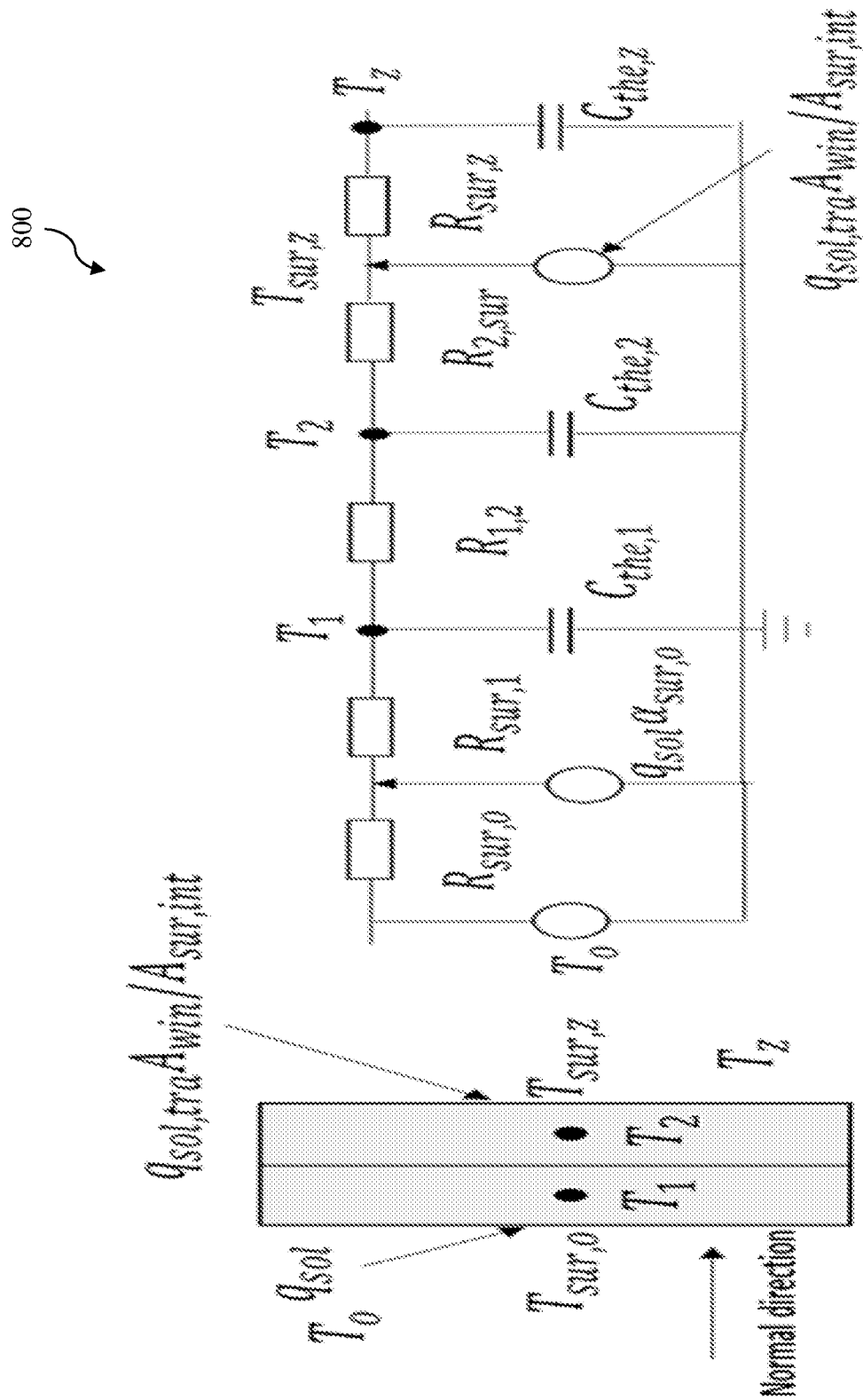
FIG. 8 shows the lumped parameter and RC representations of a building wall model, according to various example embodiments of the present invention.

According to various example embodiments of the present invention, RC model may be adopted to represent the building elements with various heat conduction and thermal storage which will results in a fast response time-invariant liner model. FIG. 8 depicts a model of building envelope. In FIG. 8, symbols T, q, A, C, and R refer to temperature, heat flux, surface area, thermal capacity, and absorptance and thermal resistance, respectively. Furthermore, subscripts sur, sol, the, z, win, int, tra and o refer to surface, solar radiation, thermal, thermal zone, window, interior, transmission and outside, respectively.

In particular, FIG. 8 shows the lumped parameter and RC representations of a building wall model. According to various example embodiments, the wall may be virtually split into two aggregates and only heat conduction in the normal direction is considered. In each of the aggregates, temperature is assumed uniform. The RC model is a 5R2C model, which includes two thermal capacitances of the two aggregates, three thermal conduction resistances of aggregates and two surface thermal resistances between surface and air (outer and inner surfaces). The surface thermal resistance is a combination of convective and radiative heat transfer, which may be expressed by Equations (13) and (14). The same model treatment may be applied to the roof and the floor.

Based on the RC network representation, the state parameter temperature of the two aggregates may be derived as follows, $$\frac{dT_1}{dt} = -\left[\frac{1}{C_{the,1}(R_{sur,o}+R_{sur,1})} + \frac{1}{C_{the,1}R_{1,2}}\right]T_1 + \frac{1}{C_{the,1}R_{1,2}}T_2 + \frac{1}{C_{the,1}(R_{sur,o}+R_{sur,1})}T_{sur,o} + \frac{R_{sur,o}R_{sur,1}}{C_{the,1}(R_{sur,o}+R_{sur,1})}q_{sol}\alpha_{sur,o}, \quad (11)$$

$$\frac{dT_2}{dt} = -\left[\frac{1}{C_{the,2}(R_{sur,z}+R_{2,sur})} + \frac{1}{C_{the,2}R_{1,2}}\right]T_2 + \frac{1}{C_{the,2}R_{1,2}}T_1 + \frac{1}{C_{the,2}(R_{sur,z}+R_{2,sur})}T_{sur,z} + \frac{\frac{R_{sur,z}R_{2,sur}}{C_{the,1}(R_{sur,o}+R_{sur,1})}q_{sol,tra}A_{win}}{A_{int}}, \quad (12)$$

where the symbols R, C, and q refer to thermal resistance (K-m/W), thermal capacity (J/K) and heat flux (W/m$^2$), respectively. Subscripts sur, o, 1, the, sol, z, tra, int and win refer to surface, outside, aggregate number, thermal, solar radiation, thermal zone, transmission, interior and window, respectively. The last term in Equation (11) and (12) represents the effect of the solar energy absorbed by exterior and interior surfaces.

The convection heat transfer may be described by a linear equation, $$q_{conv}=h_{conv}(T_{sur}-T_{air}), \quad (13)$$

where the convection heat transfer coefficient (W/K-m$^2$), $h_{conv}$, for outer surface may be estimated by average ambient velocity.

The long-wave radiation heat transfer may be calculated by a nonlinear equation, $$q_{rad}=\varepsilon\sigma(T_{sur}^4-T_{air}^4). \quad (14)$$

To get the constant parameter R, the radiation heat transfer equation needs to be linearized as, $$q_{rad}=\varepsilon\sigma(T_{sur}+T_{air})(T_{sur}^2+T_{air}^2)(T_{sur}-T_{air})=h_{rad}(T_{sur}-T_{air}), \quad (15)$$

where the symbols ε, σ and h refer to surface emittance, Stefan-Boltzmann constant and heat transfer coefficient, respectively. Subscripts air and rad refer to indoor or outdoor air and radiation, respectively. The radiation heat transfer coefficient $h_{rad}$ may be considered constant since its variation is usually very small compared to its absolute value in normal indoor conditions.

2.2—ACMV System

Due to condensation of moisture in the cooling coil, the heat and mass conservation process in an AMCV system may be strongly nonlinear. To apply an AMCV model for real-time optimization, various example embodiments uses a linear approximation method to linearize the nonlinear ACMV model based on the assumption that the supply air relative humidity (RH) is assumed 100% when the ACMV system is in operation. Then the heat/mass transfer between the mixed air and the cooling coil may be expressed as, $$Q_{cc}=\dot{m}_{ma}(C_{air}+C_{vap}\psi_{ma})(T_{ma}-T_{sa})+\dot{m}_{ma}L_{vap}(\psi_{ma}-\psi_{sa}), \quad (16)$$

$$\psi_{sa}=0.62198 p_{vap,sat}/(p_z-p_{vap,sat}), \tag{17}$$

$$p_{vap,sat}=e^{(77.345+0.0057T_z-7235/T_z)}/T_z^{8.2}, \tag{18}$$

where the subscripts ma, vap, sat and cc refer to the mixed air in FCU, water vapor, saturation and cooling coil, respectively. L refers to the specific latent heat (J/kg) of water condensation.

The mass flow rate, temperature and humidity ratio of the mixed air may be modelled by, $$\dot{m}_{ma}=\dot{m}_{ra}+\dot{m}_{fa}, \tag{19}$$

$$T_{ma}=(H_{fa}+H_{ra})/\dot{m}_{ma}(C_{air}+C_{vap}\psi_{ma}), \tag{20}$$

$$\psi_{ma}=(\dot{m}_{ra}\psi_{ra}+\dot{m}_{fa}\psi_{fa})/\dot{m}_{ma}. \tag{21}$$

Then the moisture gain from ACMV system may be modelled by, $$\dot{m}_{acmv}=\dot{m}_{sa}(\psi_{sa}-\psi_{ra}). \tag{22}$$

The heat gain from ACMV system may be modelled by, $$Q_{ACMV}=\dot{m}_{sa}(C_{air}+C_{vap}\psi_{sa})T_{sa}-\dot{m}_{sa}(C_{air}+C_{vap}\psi_{ra})T_{ra}. \tag{23}$$

The nonlinear equations (17) and (18) may be approximated by the linear regression method. For temperature between 283.15K-293.15K, equations (17) and (18) may be approximated by the linear equation, $$\psi_{sa}=7.014\times 10^{-4} T_{sa}-0.1913. \tag{24}$$

Since the mass flow rate of water vapor is very small compared to air, the sensible enthalpy of water vapor may be assumed negligible. With this assumption, according to various example embodiments, Equations (16)-(23) may be simplified to, $$\dot{m}_{ACMV}=2.578\times 10^{-4}\dot{m}_{fa}T_{fa}+2.578\times 10^{-4}\dot{m}_{ra}T_{ra}-2.565\times 10^7 Q_{cc}+0.6325\dot{m}_{fa}\psi_{fa}-(\dot{m}_{fa}+0.3675\dot{m}_{ra})\gamma_{ra}-0.07031\dot{m}_{fa}-0.07031\dot{m}_{ra}, \tag{25}$$

$$Q_{ACMV}=369.4\dot{m}_{fa}T_{fa}-(1005\dot{m}_{fa}+635.6\dot{m}_{ra})T_{ra}-0.3675Q_{cc}+9.062\times 10^5 \dot{m}_{fa}\psi_{fa}+1.734\times 10^5 \dot{m}_{fa}+1.734\times 10^5 \dot{m}_{ra}. \tag{26}$$

The equations are valid under the conditions of $RH_{sa}=100\%$, $283.15K<T_{sa}<293.15K$.

Equations (25) and (26) are bi-linear. However, the fresh air and supply air flow rate may be considered constant at one control interval, then the equations become linear.

2.3—Thermal Comfort

A conventional method to evaluate thermal comfort condition is the Predicted Mean Vote (PMV) index proposed by Fanger, "Thermal Comfort Analysis and Applications in Environmental Engineering", Thermal Comfort, Analysis and Applications in Environmental Engineering, 1970. However, the original PMV model is nonlinear which requires an integration method to solve which prohibits the application real-time optimization for MPC. To solve this problem, according to various example embodiments, a linear approximation method is employed to obtain a linear thermal comfort model while retaining high accuracy.

The PMV index may comprise six key parameters including metabolic rate, clothing insulation, air temperature, mean radiant temperature, air velocity and air relative humidity. The PMV index may be calculated according to Equation (27) below, $$PMV=(0.303e^{-0.036M}+0.028)Q_{diff}. \tag{27}$$

According to various example embodiments, the difference between the internal heat production and loss, $Q_{diff}$, that occurs in a human body may be calculated as follows, $$Q_{diff}=M-Q_{work}-Q_{res}-Q_{sens}-Q_{evap}, \tag{28}$$

$$Q_{res}=0.0014M(307.15-T_{air})+1.72\times 10^{-5}M(5867-p_{vap}), \tag{29}$$

$$Q_{sens}=39.6\times 10^{-9}f_{clo}(T_{clo}^4-T_{mr}^4)+f_{clo}h_{conv}(T_{clo}-T_{air}), \tag{30}$$

$$Q_{evap}=0.42(M-Q_{work}-58.15)+3\times 10^{-3}[5733-6.99(M-Q_{work})-p_{vap}]. \tag{31}$$

The cloth surface temperature may be estimated by, $$T_{clo}=T_{skin}-R_{clo}[f_{clo}h_{conv}(T_{clo}-T_{air})]-Ins_{clo}[39.6\times 10^{-9}f_{clo}(T_{clo}^4-T_{mr}^4)]. \tag{32}$$

In Equations (27)-(31), M is the metabolic rate of a human being (W), p is air pressure (Pa), $f_{clo}$ is clothing factor, and $Ins_{clo}$ is clothing insulation (1 clo=0.155 m²-K/W). The subscripts do, mr, vap, cony, sens, evap, res, skin and work refer to clothing, mean radiant, water vapour, convection, sensible, evaporation from occupant skin, respiration of occupant, skin surface, and external work.

There are two nonlinear items, radiative heat transfer $39.6\times 10^{-9}f_{clo}(T_{clo}^4-T_{mr}^4)$ and water vapour pressure, $p_{vap}$, in the PMV model. The radiative heat transfer term may be linearized as follows, $$\begin{aligned} Q_{rad} &= 39.6\times 10^{-9} f_{clo}[(T_{clo})^4-(T_{mr})^4] \\ &= 39.6\times 10^{-9} f_{clo}(T_{clo}+T_{mr})(T_{clo}^2+T_{mr}^2)(T_{clo}-T_{mr}) \\ &= h_{rad} f_{clo}(T_{clo}-T_{mr}). \end{aligned} \tag{33}$$

Then the cloth surface temperature and sensible heat loss may be simplified and re-written as, $$T_{clo}=[T_{skin}+R_{clo}f_{clo}(h_{conv}T_{air}+h_{rad}T_{mr})]/[1+Ins_{clo}f_{clo}(h_{conv}+h_{rad})], \tag{34}$$

$$Q_{sens}=f_{clo}h_{rad}(T_{clo}-T_{mr})+f_{clo}h_{conv}(T_{clo}-T_{air}). \tag{35}$$

The water vapour pressure may also be calculated by the following equation, for air temperatures within 293.15 K to 303.15 K covering the range of typical room temperatures, $$p_{vap}=\psi_z p_z(\psi_z+0.622)\approx 1.598\times 10^5 \psi_z. \tag{36}$$

Then the heat loss of respiratory heat and evaporation may be simplified and re-written as:

$$Q_{res}=0.0014M(307.15-T_{air})+1.72\times 10^{-5}M(5867-1.598\times 10^5\psi_z), \tag{37}$$

$$Q_{evap}=0.42(M-Q_{work}-58.15)+3\times 10^{-3}[5733-6.99(M-Q_{work})-1.598\times 10^5\psi_z]. \tag{38}$$

In a scenario that the cloth factor, metabolic rate of the occupants, external work of the occupants and room pressure can be assumed constant, likely so in a typical office environment, Equations (27) to (31) become linear. The PMV equation may be reduced to:

$$PMV = \begin{bmatrix} (0.6835h_{conv}+0.005136h_{rad}+0.06025)T_{air}+ \\ 0.6784h_{rad}T_{mr}+(35.71h_{conv}+35.71h_{rad}+ \\ 418.9)\psi_z+7.308-207.6h_{rad}-207.6h_{conv} \end{bmatrix} /(h_{conv}+h_{rad}+11.73). \tag{39}$$

The convective heat transfer coefficient may be assigned a constant value when there is no significant variation of air velocity and it may be determined by, $$h_{conv} = \begin{cases} 2.38(T_{clo} - T_{air})^{0.25}, & 2.38(T_{clo} - T_{air})^{0.25} > 12.1v_{air}^{0.5} \\ 12.1v_{air}^{0.5}, & 2.38(T_{clo} - T_{air})^{0.25} < 12.1v_{air}^{0.5} \end{cases} \quad (40)$$

2.4—Solar Radiation

According to various example embodiments, the calculation of heat gain from building envelopes requires the input of incident solar irradiance on the exterior surfaces of the envelopes, which takes up a major proportion of the external heat gain of a building. The solar radiation model does not participate in the optimization procedure but only provide the solar heat gain of exterior walls, roofs and windows for the state-space model described by Equation (2). The solar radiation model uses inputs of solar radiation measurement (global horizontal irradiance and diffuse horizontal irradiance).

For a tilted surface, the total incident solar irradiance comprises three items: incident solar diffuse irradiance, solar beam irradiance and incident irradiance reflected by ground, $$I_{sor,inc} = I_{dif,inc} + I_{beam,inc} + I_{gro,inc}, \quad (41)$$

where $I_{dif,inc}$, $I_{dif,inc}$ and $I_{gro,inc}$ are incident solar diffuse irradiance, solar beam irradiance and incident irradiance reflected by ground.

The incident solar beam irradiance may be calculated using the incident angle of solar beam to the tilted surface.

$$I_{beam,inc} = I_{beam} \cos \theta_{inc}. \quad (42)$$

The diffuse irradiance may be modelled by the following Equations:

$$I_{dif,inc} = I_{dif} c_{hb} \sin \theta_{tilt} + I_{dif}(1 - c_{cb})(1 + \cos \theta_{tilt})/2 + I_{dif} c_{cb} \max(0, \cos \theta_{inc})/\max(0.087, \cos \theta_{zen}), \quad (43)$$

where c refers to coefficient, subscripts hb, cb, tilt and zen refer to horizon brightening, circumsolar brightening, tilt of surface, and solar zenith.

2.5—Indoor Visual Condition and Lighting Model

In the MPC system 600 according to various example embodiments, the optimization problem described by Equation (7) requires indoor visual condition and lighting power prediction models. In various example embodiments, a hybrid modelling method based on measurements is employed to estimate horizontal illuminance at work plane and lighting power based on daylight information.

In various example embodiments, the predictors for indoor visual condition and lighting power prediction models training include transmitted illuminance through window (beam illuminance, diffuse illuminance and ground reflected illuminance) and solar beam incident angle. The response variables for indoor visual condition and lighting power prediction models training include illuminance at work plane and lighting power. The response variables may be measured by light sensor and power meter directly. The data-driven models may be trained by regression analysis method.

In various example embodiments, the predictors may be calculated based on solar irradiance (diffuse horizontal and global horizontal irradiance) measurement. The measured solar radiation data may be converted to daylight illuminance using luminous efficacy. Luminous efficacy describes the capacity of a light source to produce visible light. For daylight produced by solar radiation, luminous efficacy may be expressed as the ratio of daylight illuminance to solar irradiance as follows, $$LE = E_{dl}/I_{sor}, \quad (44)$$

Luminous efficacies for global, direct and diffuse illuminance may be evaluated by the following Equations:

$$LE_{glo} = c_{1,glo} + c_{2,glo} PWC + c_{3,glo} \cos \theta_{zen} + c_{4,glo} \text{Ln}^{fsb}, \quad (45)$$

$$LE_{dif} = c_{1,glo} + c_{2,dif} PWC + c_{3,dif} \cos \theta_{zen} + c_{4,dif} \text{Ln}^{fsb}, \quad (46)$$

$$LE_{dir} = \max[0, c_{1,dir} + c_{2,dir} PWC + c_{3,dir} \exp(5.370\theta_{zen} - 5) + c_{4,dir} f_{sb}], \quad (47)$$

The transmitted illuminance from the window façade may be calculated by the following Equation:

$$E_{tra} = VLT^* E_{inc}. \quad (48)$$

where VLT refer to visible light transmittance.

2.5.1—Introduction

To perform integrated control of shading, lighting and ACMV systems using MPC to optimize building energy efficiency, thermal comfort and visual comfort, various example embodiments provide a model that is computationally efficient to predict indoor visual and lighting conditions (such as lighting power and indoor visual comfort) in real-time is needed. Conventional approaches for determining indoor visual and lighting conditions include using daylighting and lighting simulation software such as VisualDOE, Daylight Visualizer, DAYSIM, RADIANCE and EnergyPlus. However, various example embodiments identified that such models in the software are not computationally trackable for real-time prediction and control due to the use of radiosity/raytracing methods, which requires numerical methods to solve. Another approach to predict indoor visual and lighting conditions is to use data-driven model, which is much more computationally trackable for real-time prediction and control than those daylighting and lighting simulation software. However, various example embodiments identified that the data-driven approach requires a large number of measured data (including weather conditions and building operation data) that may be difficult to obtain, especially for new buildings.

Figure 9:
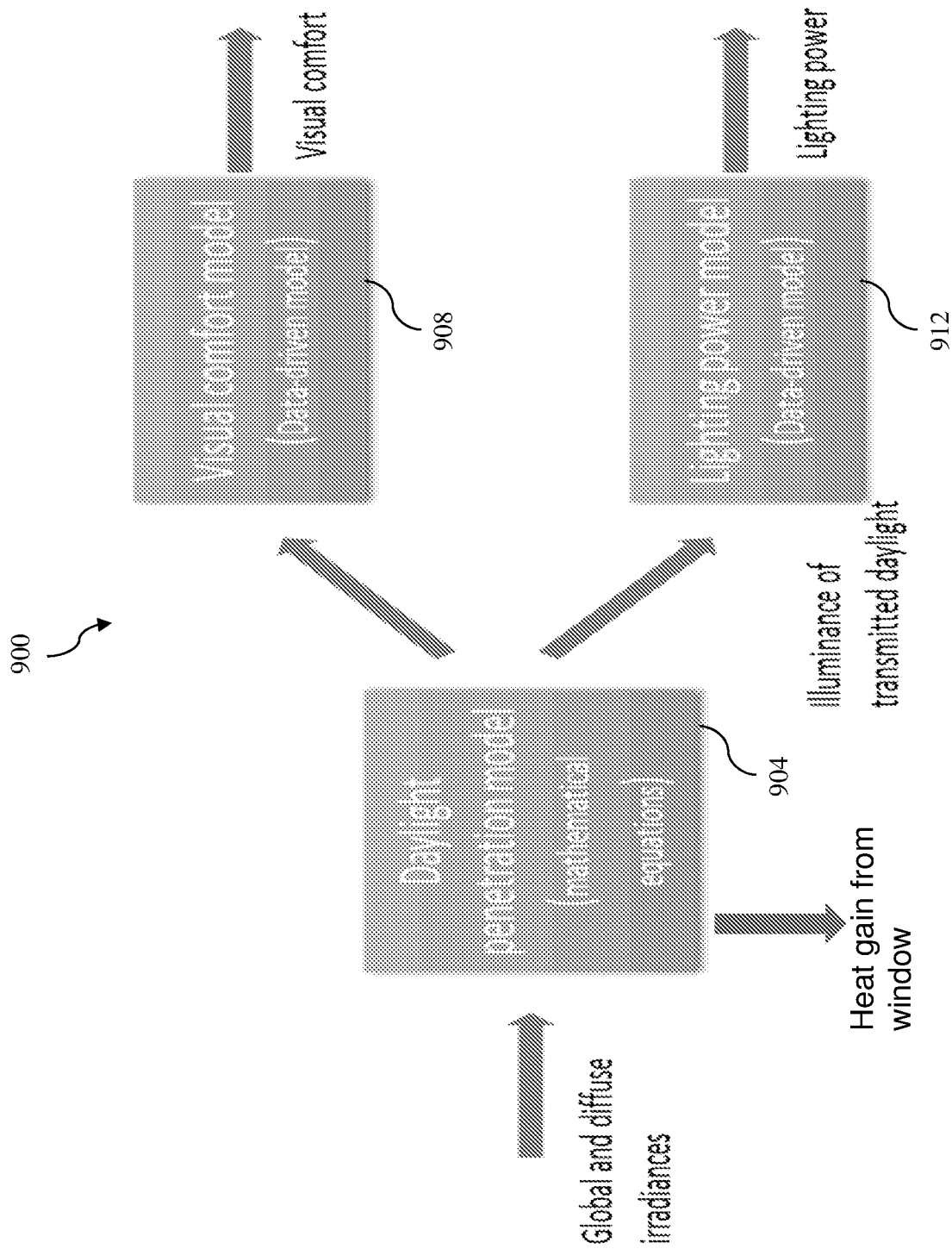
FIG. 9 depicts a schematic drawing of a hybrid shading and lighting prediction model, according to various example embodiments of the present invention.

Various example embodiments develop a hybrid model that is much more computationally efficient than above-mentioned conventional daylighting and lighting simulation software for real-time prediction and requires much less data for modelling as compared to the conventional pure data-driven approach. The hybrid model 900 comprises three sub-models including a daylight penetration model (or sub-model) 904, a visual comfort model (or sub-model) 908 and a lighting power model (or sub-model) 912, as shown in FIG. 9. The daylight penetration model 904 may include functions (mathematical equations) configured to calculate the illuminance of transmitted daylight by window-shading system with inputs of measured global and diffuse irradiances. In this regard, the daylight penetration model 904 is a non-data-driven model including a set of functions configured to determine an output directly based on measured data, instead of the measured data being used to train a machine learning model. The daylight penetration model 904 may be used for different buildings and different weather conditions. On the other hand, the visual comfort model 908 and the lighting power model 912 may be based on data-driven approach. Since the daylight penetration model 904 is configured to determine an output directly based on measured data, it was found that the hybrid model 900 requires much less measured data (e.g., only 10-day long) as compared to a pure data-driven model (e.g., a year long). In addition, since radiosity/raytracing methods are not used by the hybrid model 900, the hybrid model 900 is much more computationally efficient as compared to the above-mentioned daylighting and lighting simulation software.

2.5.2—Daylight Penetration Model

According to various example embodiments, indoor light conditions during daytime are mainly determined by daylight penetration from the windows. Thus, various example embodiments calculate the incident illuminance on windows based on solar radiation. A concept of luminous efficacy is used in various example embodiments, which describes the capacity of a light source to produce visible light, for calculating the incident illuminance on windows. According to various example embodiments, for daylight produced by solar radiation, luminous efficacy may be expressed as the ratio of daylight illuminance to solar irradiance, as shown in the Equation below.

$$LE = E_{dl}/I_{sol}, \tag{49}$$

where symbols LE, E and I refer to luminous efficacy (lm/W), illuminance (lux) and irradiance (W/m²). Subscripts dl and sol refer to daylight and solar radiation.

Thus, the incident illuminance on a surface may be calculated based on incident solar irradiance and corresponding luminous efficacy. For a surface exposed to outdoor space, such as the windows, the incident solar irradiance includes diffuse irradiance ($I_{dif,inc}$), direct irradiance ($I_{dir,inc}$) and irradiance reflected by ground ($I_{gro,inc}$).

The incident diffuse irradiance on the surface may be calculated by Equation (50) below, $$I_{dif,inc} = I_{dif} c_{hb} \sin \theta_{tilt} + I_{dif}(1-c_{cb})(1+\cos \theta_{tilt})/2 + I_{dif} c_{cb} \max(0, \cos \theta_{inc})/\max(0.087, \cos \theta_{zen}), \tag{50}$$

where symbols c and θ refer to coefficient and angle. Subscripts hb, cb, inc, dif, zen and tilt refer to horizon brightening, circumsolar brightening, incident, diffuse, solar zenith and tilt of the surface. For example, the circumsolar brightening coefficient $c_{cb}$ and horizon brightening coefficient $c_{hb}$ are defined in Perez et al., "Modeling daylight availability and irradiance components from direct and global irradiance", Solar energy, 44(5), 271-289, 1990, the content of which being hereby incorporated by reference in its entirety for all purposes.

The incident direct solar irradiance on the surface may be calculated using the incident angle of solar beam to the surface as follows, $$I_{dir,inc} = I_{dir} \cos \theta_{inc}. \tag{51}$$

where dir refers to direct.

The solar direct irradiance may be evaluated based on the measured $I_{glo}$ and $I_{dif}$, $$I_{dir} = (I_{glo} - I_{dif})/\sin \theta_{alti}, \tag{52}$$

where subscripts alti and glo refers to solar altitude, global.

In various example embodiments, the heat gain from a window due to the incident irradiance (direct irradiance, incident diffuse irradiance and ground reflected irradiance) may be calculated using solar heat gain coefficient (SHGC), which is the ratio of transmitted to incident irradiance, of the window.

Thus, illuminances produced by the incident direct irradiance, incident diffuse irradiance and illuminance produced by ground reflected irradiance on the surface may be calculated using the following Equations, $$E_{dir,inc} = LE_{dir} I_{dir,inc}, \tag{53}$$

$$E_{dif,inc} = LE_{dif} I_{dif,inc}, \tag{54}$$

$$E_{gro,inc} = r_{gro} LE_{glo} I_{glo}(1-\cos \theta_{tilt})/2, \tag{55}$$

where symbol r refers to reflectivity of visual light, subscript gro refers to ground.

Luminous efficacies for global, direct and diffuse irradiance may be calculated using the following Equations (e.g., see Perez et al., "Modeling daylight availability and irradiance components from direct and global irradiance", Solar energy, 44(5), 271-289, 1990), $$LE_{glo} = c_{1,glo} + c_{2,glo} PWC + c_{3,glo} \cos \theta_{zen} + c_{4,glo} Ln^{f_{sb}} \tag{56}$$

$$LE_{dif} = c_{1,dif} + c_{2,dif} PWC + c_{3,dif} \cos \theta_{zen} + c_{4,dif} Ln^{f_{sb}}, \tag{57}$$

$$LE_{dir} = \max[0, c_{1,dir} + c_{2,dir} PWC + c_{3,dir} \exp(5.37\theta_{zen} - 5) + c_{4,dif} f_{sb}], \tag{58}$$

where PWC and f refer to atmospheric perceptible water content and factor. Subscript sb refers to sky brightness. For example, coefficients $c_1$, $c_2$, $c_3$ and $c_4$ and factor $f_{sb}$ are defined in the above-mentioned Perez reference.

The transmitted daylight illuminance by a window-shading system may be calculated by the following Equation, $$E_{tra} = VLT \cdot E_{dir,inc} + VLT \cdot E_{dif,inc} + VLT \cdot E_{gro,inc}, \tag{59}$$

where VLT refers to visible light transmittance of the window-shading system.

2.5.3—Visual Comfort

According to various example embodiments, one major target of shading optimization in the MPC system is to prevent visual discomfort caused by excessive daylight penetration. The lower and upper threshold of illuminance at work plane may be 500 lux and 3000 lux, respectively. The upper threshold of indoor DGP may be 0.35, which means imperceptible glare when the upper threshold is fulfilled according to Wienold and Christofferson, "Evaluation methods and development of a new glare prediction model for daylight environments with the use of CCD cameras", Energy and buildings, 38(7), 743-757, 2006. However, it was found that when the horizontal illuminance at work plane was lower than 3000 lux, the indoor DGP also was under 0.35 (Zhou et al., "Development of a rotatable outdoor testbed and the testing of an integrated auto-dimming lighting and automated blind system in the tropics", Proceedings of the World Sustainable Built Environment Conference 2017). Accordingly, in various example embodiments, the upper threshold illuminance at work plane of 3000 lux may be used as the constraint for indoor visual comfort optimization.

As data-driven modelling requires measured data of real buildings, the modelling of visual comfort according to various example embodiments is explained based on the Test Cell of BCA SkyLab. The Test Cell of SkyLab is fitted with an electrochromic (EC) window and the colour of the EC window is adjustable within fully clear (0% tint level) and fully dark (100% tint level) to modulate the heat gain and daylight penetration through the EC window. A long-day-long experiment was conducted in SkyLab Test Cell to generate measured data to train a data-driven model for predicting maximum illuminance at work plane. Maximum indoor illuminance at work plane and the transmitted illuminance of the EC window were measured by a horizontal illuminance sensor and a vertical illuminance sensor, respectively. The window façade was facing north during the first three days and west during the rest days to capture different solar incidence conditions.

Figure 10:
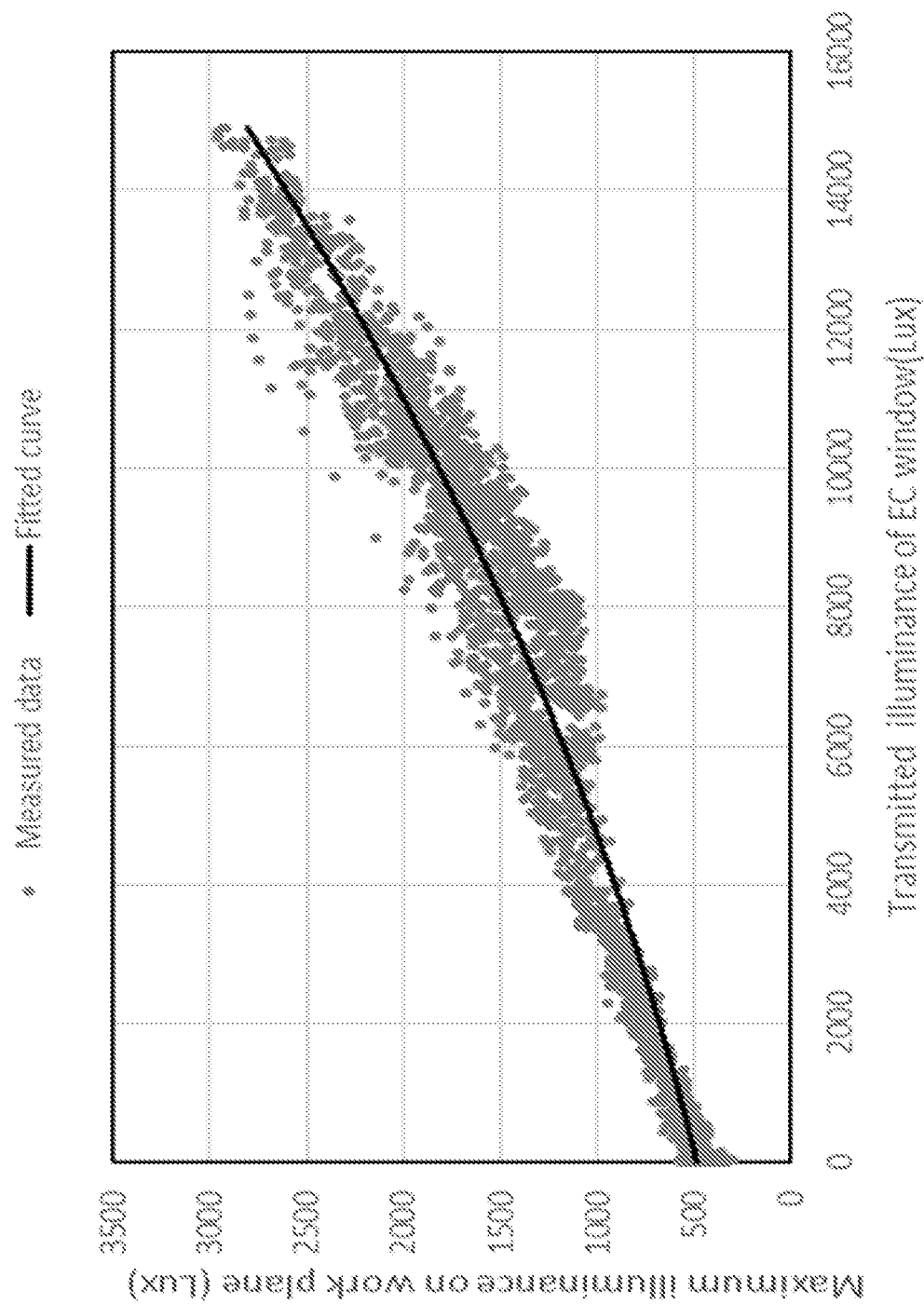
FIG. 10 depicts a plot showing the fitted correlation of maximum illuminance at work plane and transmitted illuminance from the EC window.

Based on the measured data, the correlation of the maximum illuminance at work plane and transmitted illuminance of the EC window was fitted using regression analysis, as shown in FIG. 10. In particular, FIG. 10 depicts a plot showing the fitted correlation of maximum illuminance at work plane and transmitted illuminance from the EC window. Thus, the maximum illuminance at work plane in Test Cell may be predicted based on measured solar radiation, tint level of the EC window, daylighting penetration model and FIG. 10.

2.5.4—Lighting Power

Figure 11:
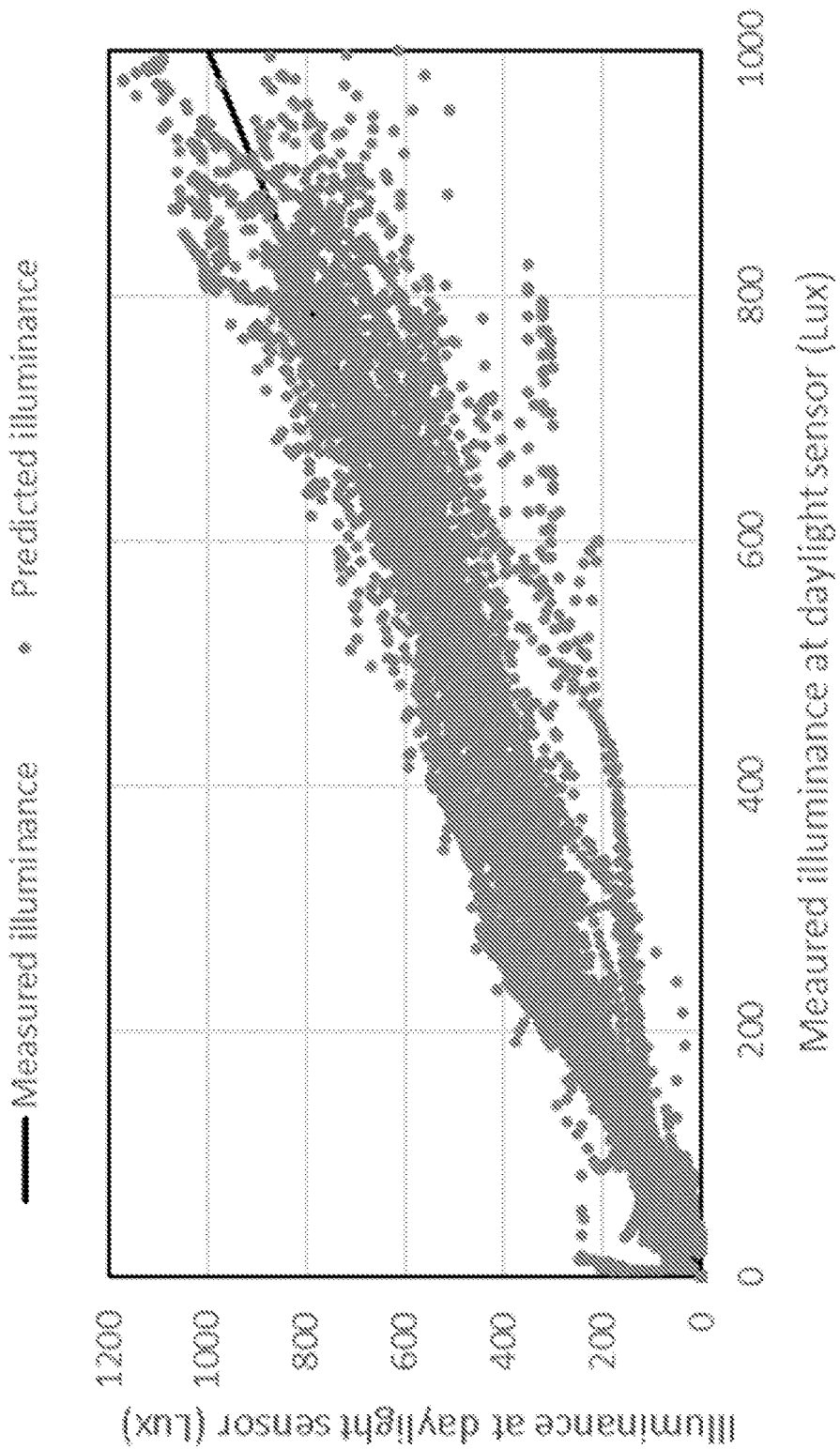
FIG. 11 depicts a plot showing a comparison of the measured illuminance and predicted illuminance at the daylight sensor.

According to various example embodiments, the lighting power in Test Cell of SkyLab is regulated by a lighting controller according to the reading of a daylight sensor, which is fitted at the ceiling and facing the EC window. The control logics in the lighting controller were identified and described by Lamano et al., "Energy Performance of an Integrated Automated Blinds and Dimmable Lighting System with Model-Predictive Control (MPC)", Proceeding of the 4$^{th}$ International Conference on Building Energy & Environment 2018, the content of which being hereby incorporated by reference in its entirety for all purposes. To predict lighting power, the correlation of illuminance sensed by the daylight sensor and the measured transmitted illuminance of the EC window may also be fitted, as described by Equation (60) below, based on the measured data described above. The comparison of the measured illuminance and predicted illuminance at the daylight sensor is shown in FIG. 11. FIG. 11 depicts a plot showing a comparison of the measured illuminance and predicted illuminance at the daylight sensor.

$$E_{dls} = -6.88 \times 10^{-6} E_{tra,dif} E_{tra,gro} - 0.135 \cos \theta_{inc} E_{tra,gro} + 0.474 \cos \theta_{inc} E_{tra,dif} + 0.113 \times E_{tra,gro} + 0.0467 \times E_{tra,dif} - 41.4 \times \cos \theta_{inc} + 9.5. \quad (60)$$

In Equation (60), dls refers to daylight sensor. Particularly, $E_{tra,dir}$, $E_{tra,dif}$ and $E_{tra,gro}$ refer to the three terms in the right-hand slide of Equation (59). Accordingly, in various example embodiments, the lighting powers of the four lighting zones in SkyLab Test Cell may be predicted based on measured solar radiation, tint level of the EC window, daylight penetration model, Equation (59) and automated dimming logics in the lighting controller (e.g., see the above-mentioned Lamano reference) (correlation between the measurement in daylight sensor and the lighting power).

3—Communication and Integration Scheme for Building Services Control

To achieve multiple targets (high-energy efficiency, and good human thermal and visual comfort) of indoor environment management, various example embodiments provide a communication technique for real-time data (measurements to MPC system and control signals to building services) exchange between MPC system and building services. In various embodiments, measurement data for building response prediction and control feedback includes conditions of weather, room space, ACMV system, shading system and lighting system as shown in Table 1 below.

TABLE 1

Communication between MPC and building services

| Location/system | Measurement | Control signals |
| --- | --- | --- |
| Outdoor | Temperature, humidity ratio, diffuse horizontal irradiance, global horizontal irradiance | None |
| Room space | Air and globe temperature, humidity, air velocity, illuminance at work plane | None |
| ACMV | Fresh air and supply air flow rate, cooling power (water side) | Cooling power set points |
| Shading | Shading level | Shading level set points |
| Lighting | Lighting power | None |

The time interval of data communication between the MPC system and building services is between 10 to 60 seconds. Industry communication protocol standards including BACnet®, LonWorks®, OPC®, Modbus™, and so on, which are supported by the leading building automation companies such as Honeywell International Inc. (U.S.), Siemens AG (Germany), Johnson Controls International PLC (Ireland), Schneider Electric SE (France), United Technologies Corp. (U.S.), and so on, may be used to link the seamless communication between the MPC system and building services.

For a building equipped with multiple systems, the control of different building systems may interfere with each other, which may cause excessive energy consumption and unsatisfactory indoor condition. For instance, when ACMV system is lowering room temperature, an uncoupled shading system may be raising daylight penetration, which adds more cooling load for the ACMV system. Thus, to achieve optimal building performance, various example embodiments provide an integrated control for multiple building services (ACMV, shading and lighting systems). With the integration scheme for buildings services control, the MPC system 600 according to various example embodiments is advantageously able to handle multiple targets (high-energy efficiency, thermal comfort and visual comfort) to improve building performance.

In various example embodiments, the integrated control method includes the developed optimization method and the communication between the MPC system and building services, and more particularly:

a. the fast-response building dynamics model (as described hereinbefore according to various example embodiments) considers the thermal interference (heat gain from windows and lights) of the shading and lighting systems as the internal heat gain inputs for building energy efficiency and thermal comfort optimization described by Equation (1). The inference of the lighting and shading systems on indoor thermal comfort and energy efficiency optimization is eliminated by the MPC system with the model-based prediction ability; and b. the optimization of shading control described by Equation (7) is able to solve the contradiction between the heat gains from windows and lighting by minimizing the electricity energy consumption due to lighting and heat loads from window and lights while maintaining room visual condition within required ranges.

4—Experimental Evaluation of the MPC System 4.1—Test Building

Figure 12A:
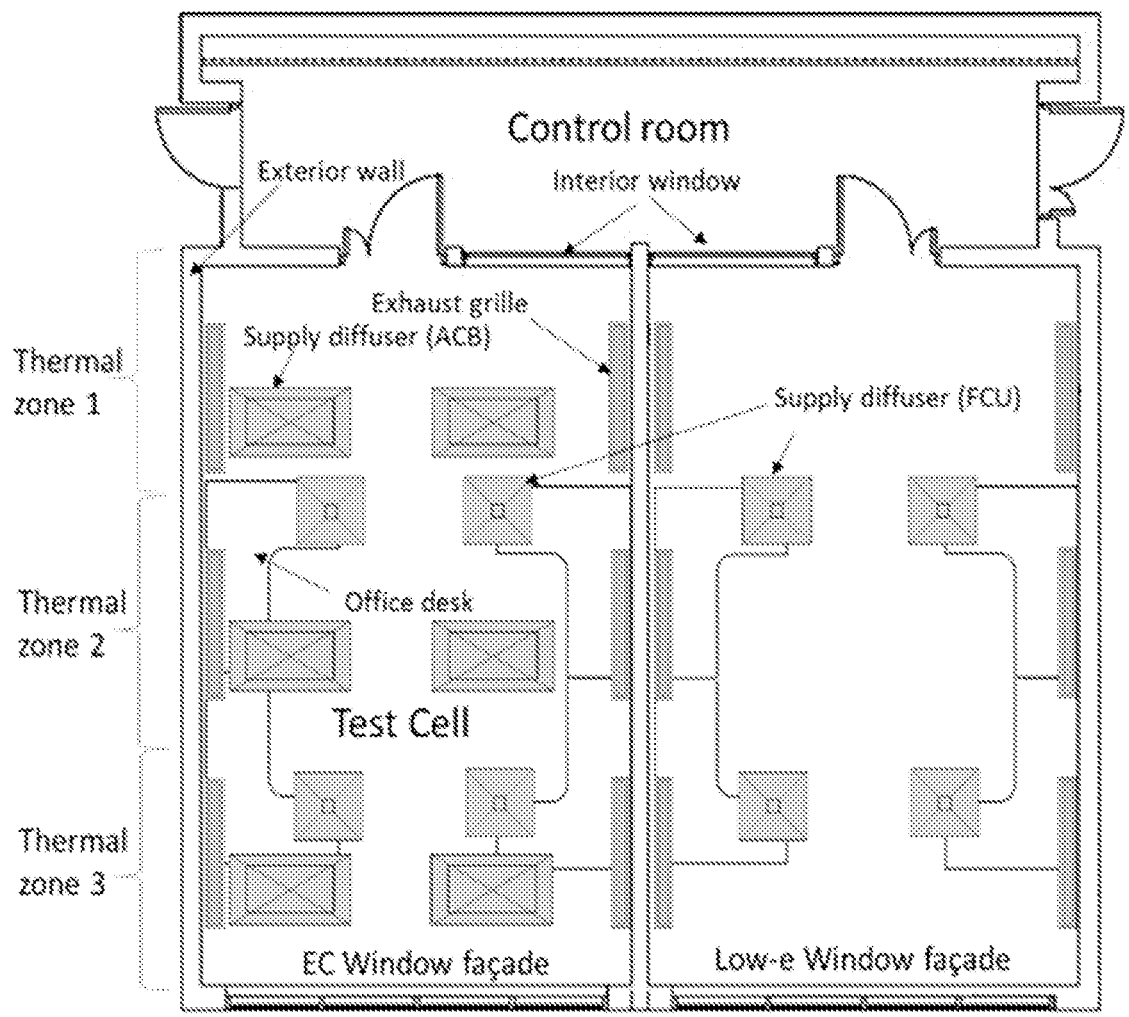
FIGS. 12A and 12B show a top view of a test room (SkyLab) according to various example embodiments of the present invention, whereby
Figure 12B:
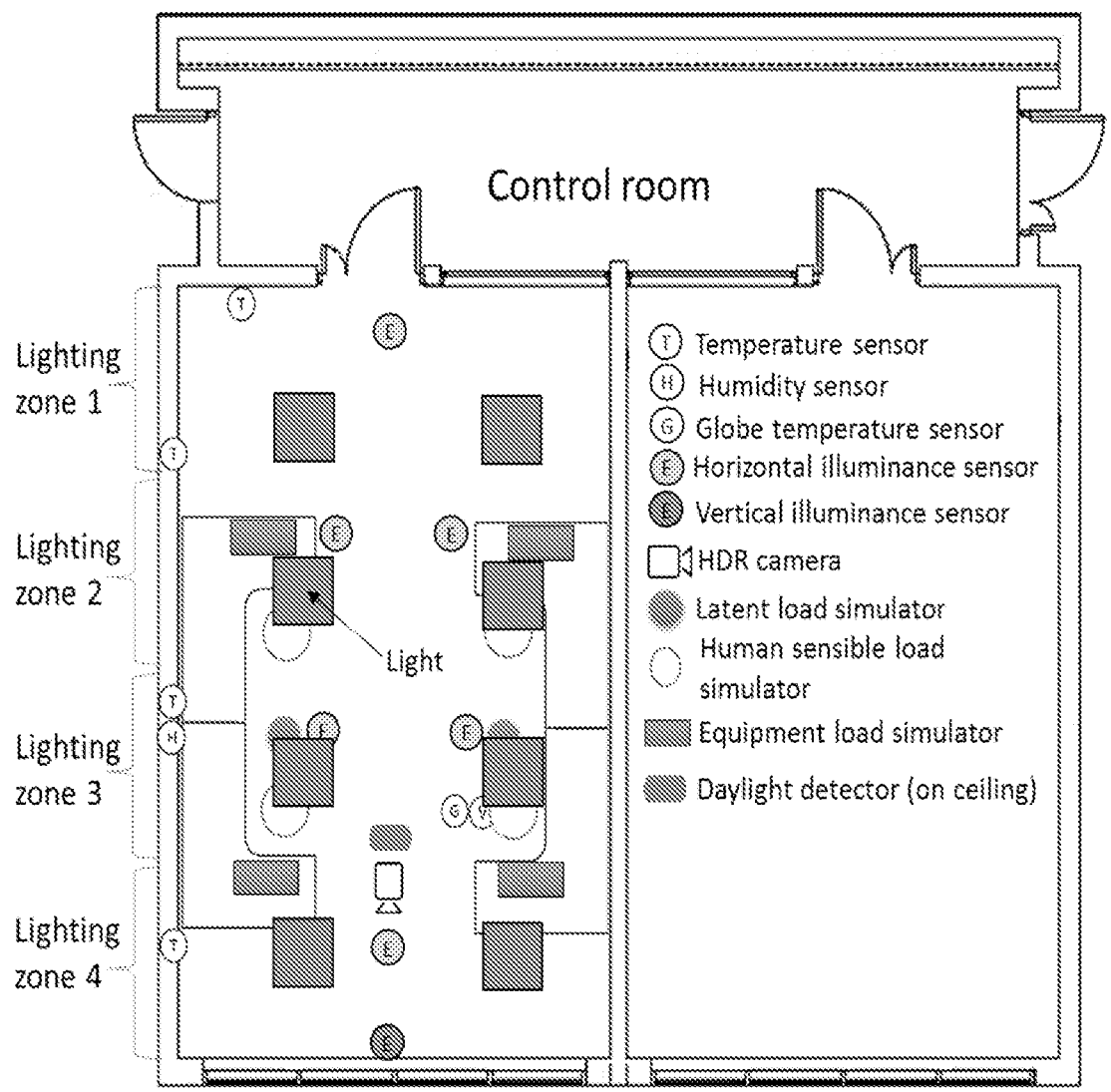

In this disclosure, BCA SkyLab located in BCA Academy in Singapore, was selected as the test building for evaluating the MPC system 600 according to various example embodiments. FIGS. 12A and 12B show a top view of SkyLab, whereby FIG. 12A shows the location of supply diffuser and exhaust grille and FIG. 12B shows the location of lights, sensors and internal load simulators. The BCA SkyLab, as shown in FIGS. 12A and 12B, has two side-by-side comparative experimental cells, each having 43.5 m² floor area and 3.5 m floor-to-ceiling height, with same dimensions and construction. The two cells are divided by a high-insulation partition wall. Therefore, the two cells are considered to have no thermal interaction based on the assumption that there is no temperature difference between the two cells. The Test Cell is selected to implement the MPC system 600 and the Reference Cell (Ref. Cell) is controlled by SkyLab BMS with conventional PID control strategy as the benchmark.

Figure 13:
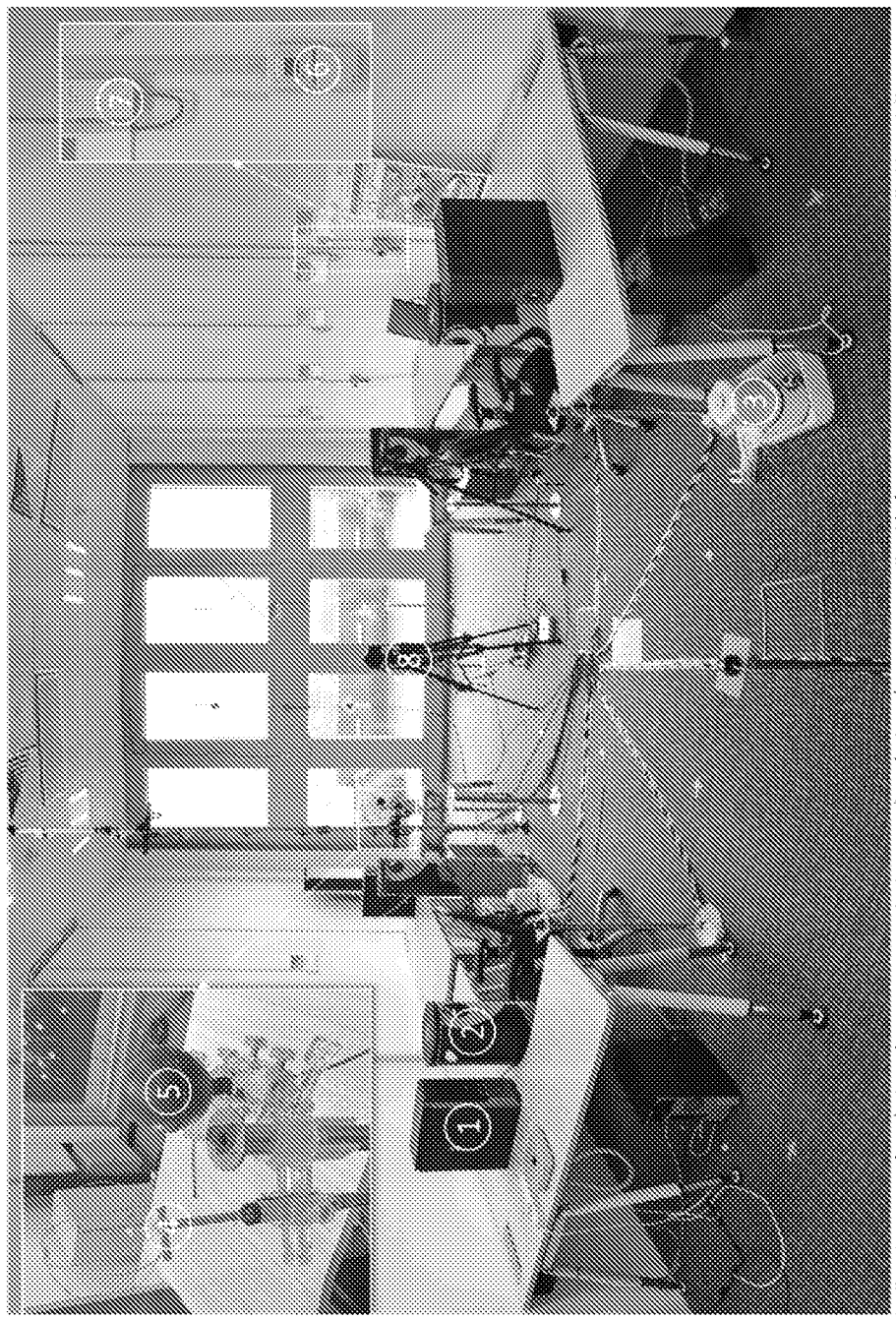
FIG. 13 shows an internal setup in the SkyLab Test Cell, according to various example embodiments of the present invention.

The internal heat load in the SkyLab Test Cell was physically simulated by heating dummies and humidifying devices, as shown in FIG. 13. In particular, FIG. 13 shows the internal setup in Test Cell of SkyLab. There were four typical office workstations in the cell. Four heating dummies, each of them housed a light bulb of 75 W, were fabricated according to EN 14240 (2004) to represent sensible heat load from human occupants. This follows the data in ASHRAE Handbook: Fundamentals. Refrigerating and Air Conditioning Engineers, Atlanta USA, 2009 for a person with moderately active office work. A heating dummy was put at the seating position of each workstation. The sensible heat from plug load was set at 180 W per workstation, following the recommended load factor for an office space of medium/heavy load density in the above-mentioned ASHRAE handbook. Out of the 180 W, 60 W was coming from under the desk, representing a computer unit placed under the desk. The remaining 120 W of sensible heat were placed on top of the desks, representing other office equipment such as monitors and printers. The plug loads were simulated in SkyLab by putting light bulbs with corresponding wattage in empty desktop computer casings. Moisture, equivalent to a total of 220 W latent heat, was generated by the two humidifying devices to simulate the latent load of four occupants.

Figure 14A:
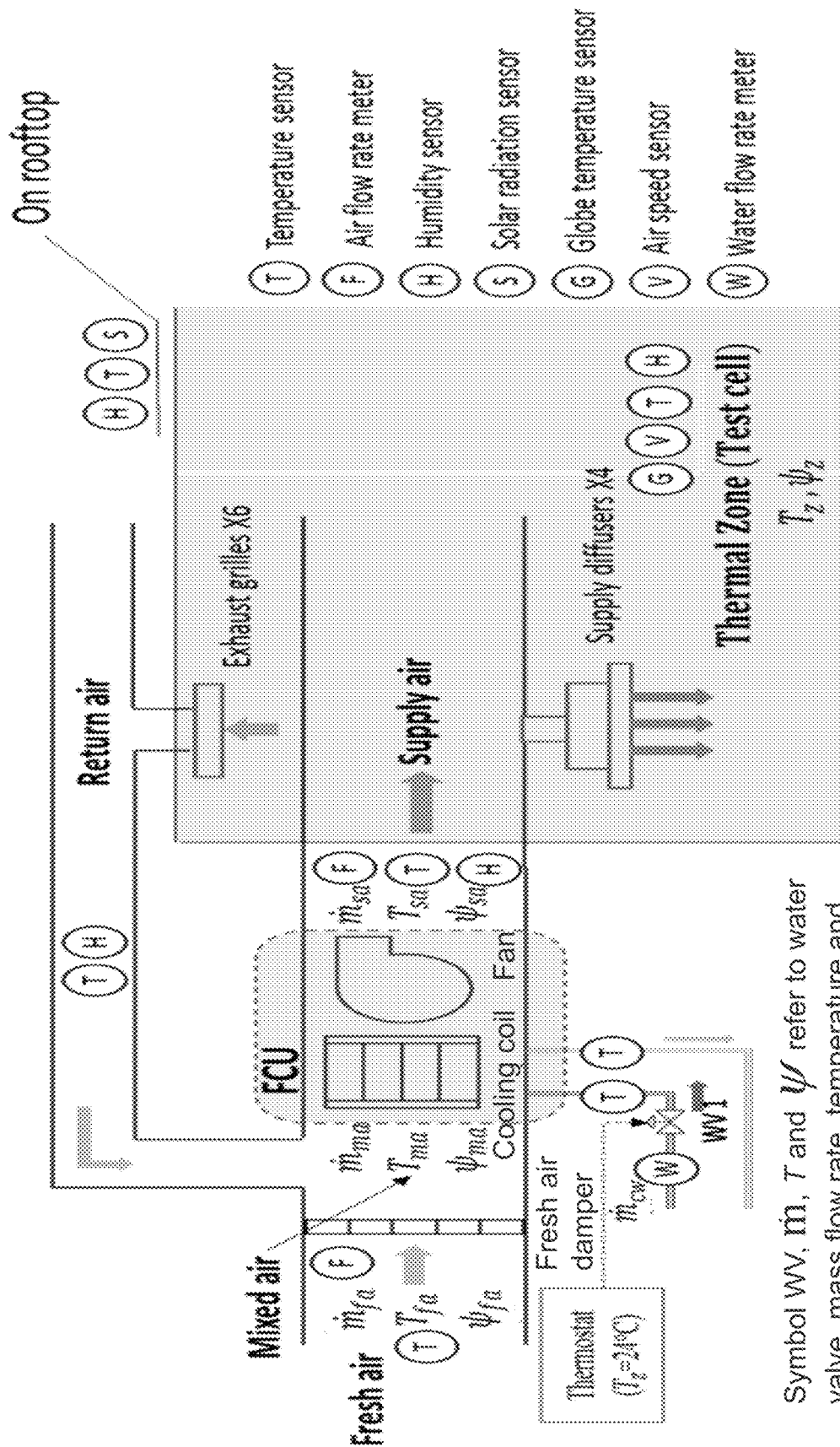
FIG. 14A illustrates an ACMV system based on a fan coil unit (FCU), which may be referred to as a FCU-ACMV system.
Figure 14B:
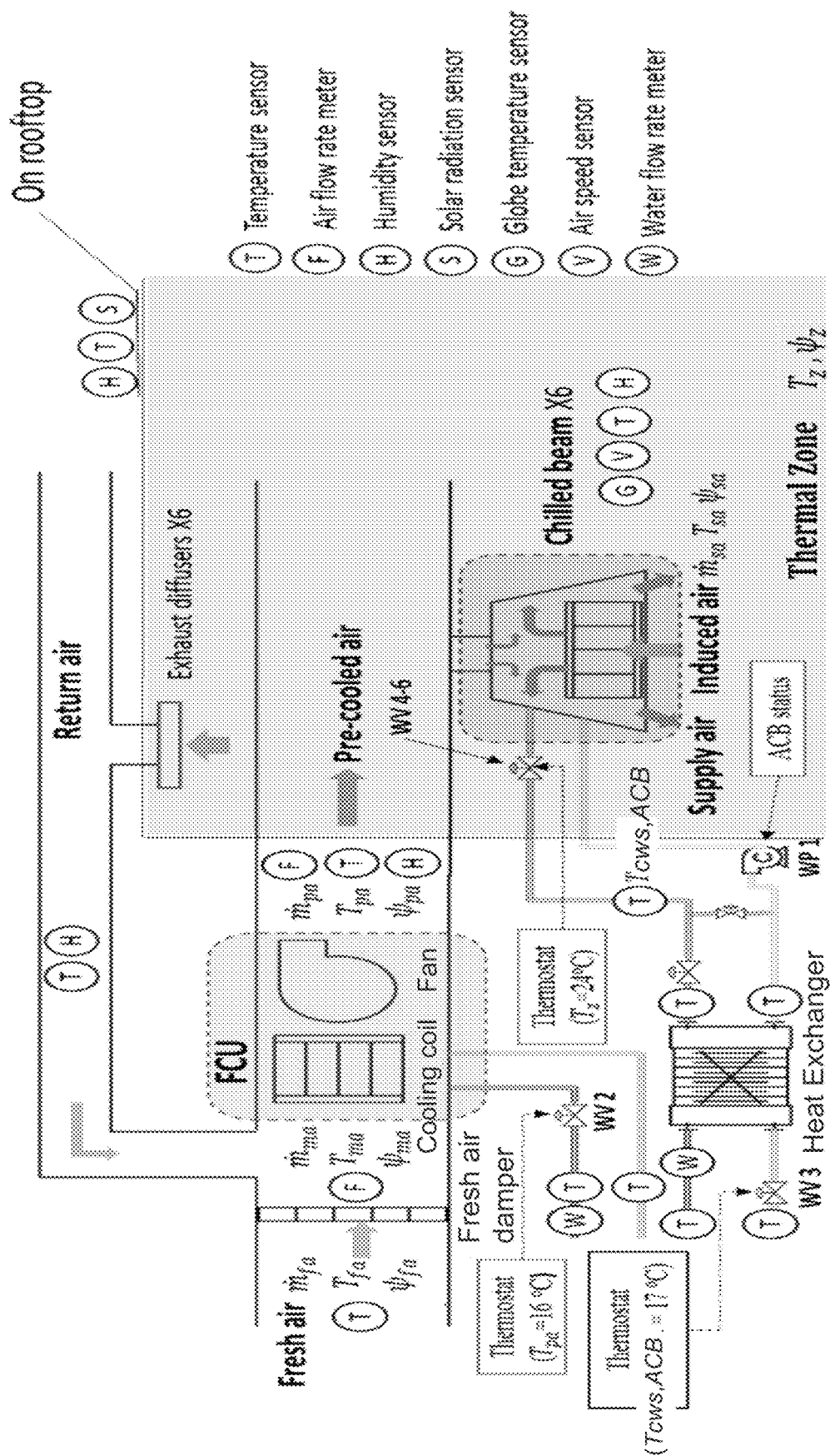
FIG. 14B illustrates an ACMV system based on an active chilled beam (ACB), which may be referred to as a ACB-ACMV system.

Two ACMV systems were installed in the Test Cell of SkyLab as shown in FIG. 14A and FIG. 14B. In particular, FIG. 14A illustrates an ACMV system based on a fan coil unit (FCU), which may be referred to as a FCU-ACMV system, and FIG. 14B illustrates an ACMV system based on an active chilled beam (ACB), which may be referred to as a ACB-ACMV system. For experimental purposes, the FCU-ACMV system, as shown in FIG. 14A, includes one FCU that is composed of one cooling coil unit and one constant air volume (CAV) fan unit. The ACB-ACMV system, as shown in FIG. 14B, includes one FCU and six chilled beam units. The FCU in the ACB-ACMV system is composed of one cooling coil unit and one variable air volume (VAV) fan unit and each chilled beam unit has one cooling coil. The six chilled beam units are divided into three groups and each group is dedicated to serve one virtual thermal zone, as shown in FIGS. 12A and 12B. The two chilled beam units in one group are controlled by one modulating water valve. The two ACMV systems run alternatively. The Reference Cell in SkyLab was only equipped with the conventional FCU-ACMV system.

When the conventional FCU-ACMV system was in operation, the FCU was controlled by a thermostat, as shown in FIG. 14A, which was linked to the actuator that regulated the chilled water flow rate through the cooling coil in FCU. The thermostat controlled the chilled water flow rate according to the room temperature set point by PID. Conditioned air was supplied to the cell through four 4-way spread type ceiling air diffusers. Room air was returned through six slot type diffusers on the ceiling.

When the ACB-ACMV system was in operation, the chilled water valve (WV 2) in FCU was regulated by another thermostat according to pre-cooled air temperature set point. The fan in FCU operated at lowest speed to provide pre-cooled air. The pre-cooled air from FCU was supplied into the chilled beam units, meanwhile, induced room air into the chilled beam units. The sensible load in the induced air was removed by the cooling coils in the chilled beam units. The conditioned induced air mixed with pre-cooled air, then, was distributed into the room space through extra six diffusers. In Test Cell, each virtual thermal zone was equipped with one air temperature sensor on the exterior sidewall. The chilled water valves (WV 4-6) were controlled by thermostats to regulate the temperature in thermal zone 1-3, respectively. The water pump (WP 1) was regulated according to the status of the chilled beam.

A heat exchanger was installed in the ACB-ACMV system, as shown in FIG. 14B, to regulate the supplied chilled water temperature according to a set point to avoid condensation in the chilled beam units. Therefore, the cooling coil of FCU deals with the entire latent load and partial sensible load and the rest sensible load is removed by the chilled beam units.

Test Cell and Ref. Cell in SkyLab operate at a design condition during office hours (e.g., 9 am-6 pm in weekday). The design occupancy density, internal plug load and internal lighting load are 0.092 person/m$^2$, 16 W/m$^2$ and 8.22 W/m$^2$ floor area, respectively. When the conventional FCU-ACMV system is in operation, the ACMV system supplies 33 l/s fresh air and 540 l/s supply air into the room space. When the ACB-ACMV system is in operation, the ACMV system supplies constant 33 l/s fresh air and 147 l/s pre-cooled air into the room space.

Electrochromic (EC) dynamic glazing was installed in the window façade of Test Cell, which is able to modulate the heat gain and daylight penetration through windows by changing its colour. The EC façade consists of eight EC panels and the properties. As a comparison room, Ref. Cell was installed with a low emissivity (Low-e) double-glazing façade with 0.27 solar heat gain coefficient (SHGC), 0.59 visible light transmittance and 1.54 W/m$^2$K U-value. The window wall ratios (WWRs) of Test Cell and Ref. Cell are both 0.49.

Figure 15:
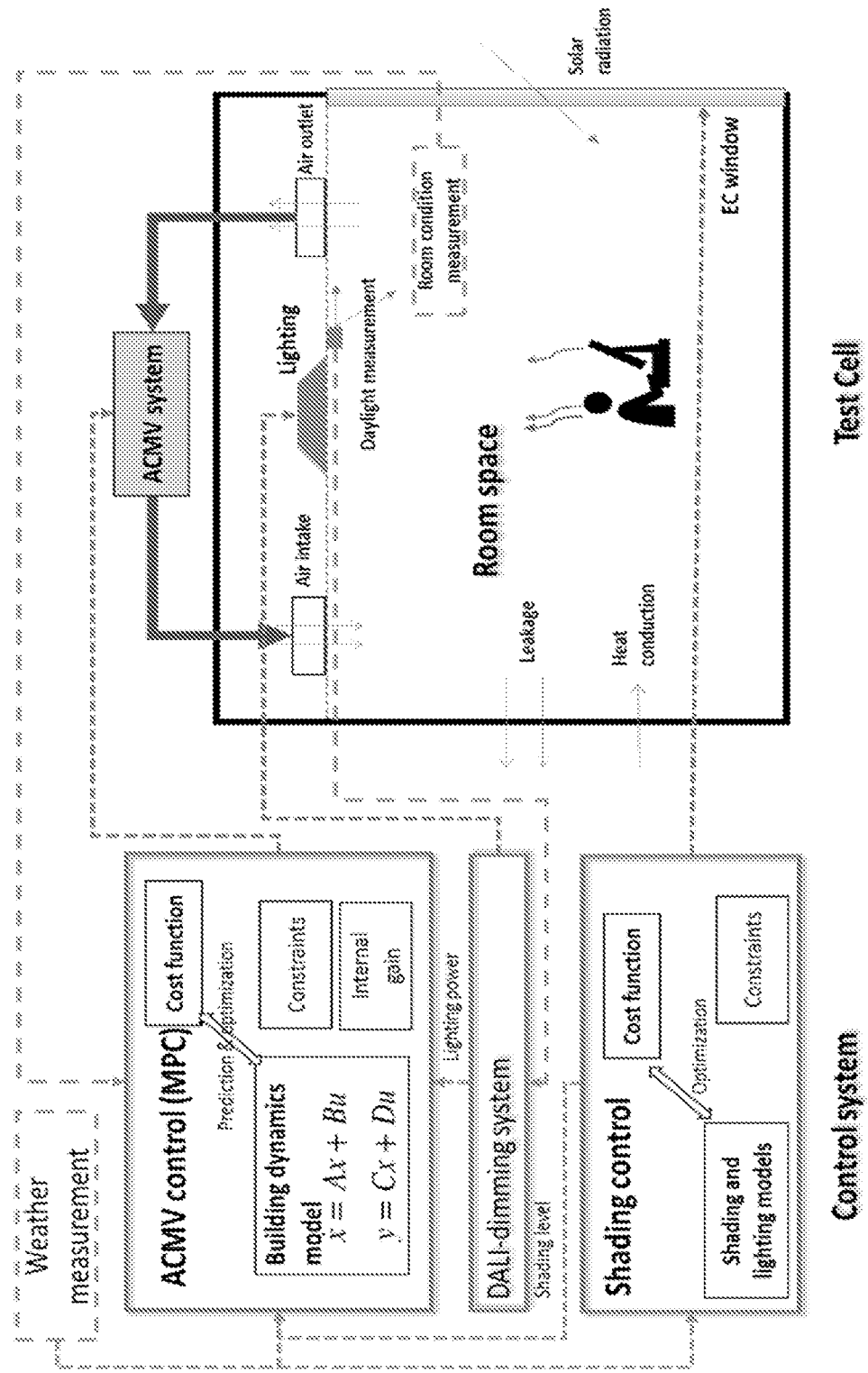
FIG. 15 depicts a schematic of control strategies for the test room, according to various example embodiments of the present invention.

Both Test Cell and Ref. Cell were fitted with eight lighting fixtures, T5 fluorescent lamp, at the false ceiling as shown in FIG. 12. Each fixture has a face dimension of 0.60 m (L) and 0.60 m (W). Two modes, constant and automated dimming based on daylight, are available for both two cells. When the lighting system is under automated dimming mode, a Digital Addressable Lighting Interface (DALI) automated dimming system regulates the lighting power according to the illuminance measured by a DALI sensor that is facing the exterior window, as shown in FIG. 15. In particular, FIG. 15 depicts a schematic of control strategies for SkyLab, according to various example embodiments of the present invention.

Based on the physical systems in SkyLab, the MPC system 600 may be designed as shown in FIG. 15, according to various example embodiments. The ACMV and EC façade systems may be controlled by the developed method described hereinbefore according to various example embodiments. The lighting system is under DALI dimming control method, which is a black box to MPC. However, the control logic (correlation between the illuminance sensed by the DALI dimming and lighting power) in DALI dimming control method may be modelled with experimental data. With the knowledge of the lighting dimming, the lighting power may be modulated by regulating the daylight penetration with the EC façade control.

4.2—Model Calibration

Figure 16A:
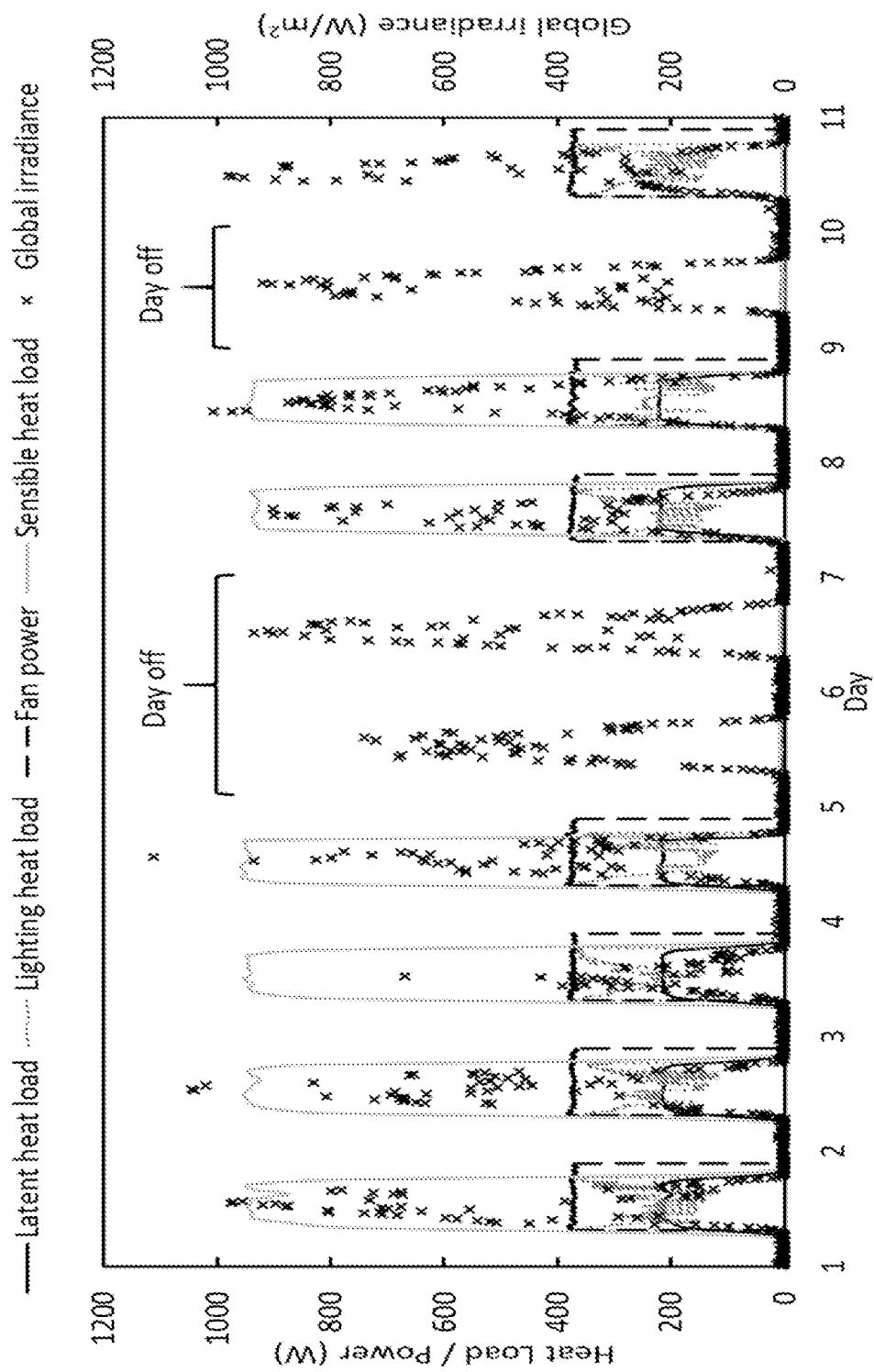
FIGS. 16A and 16B show the test condition for model calibration and validation, according to various example embodiments of the present invention.
Figure 16B:
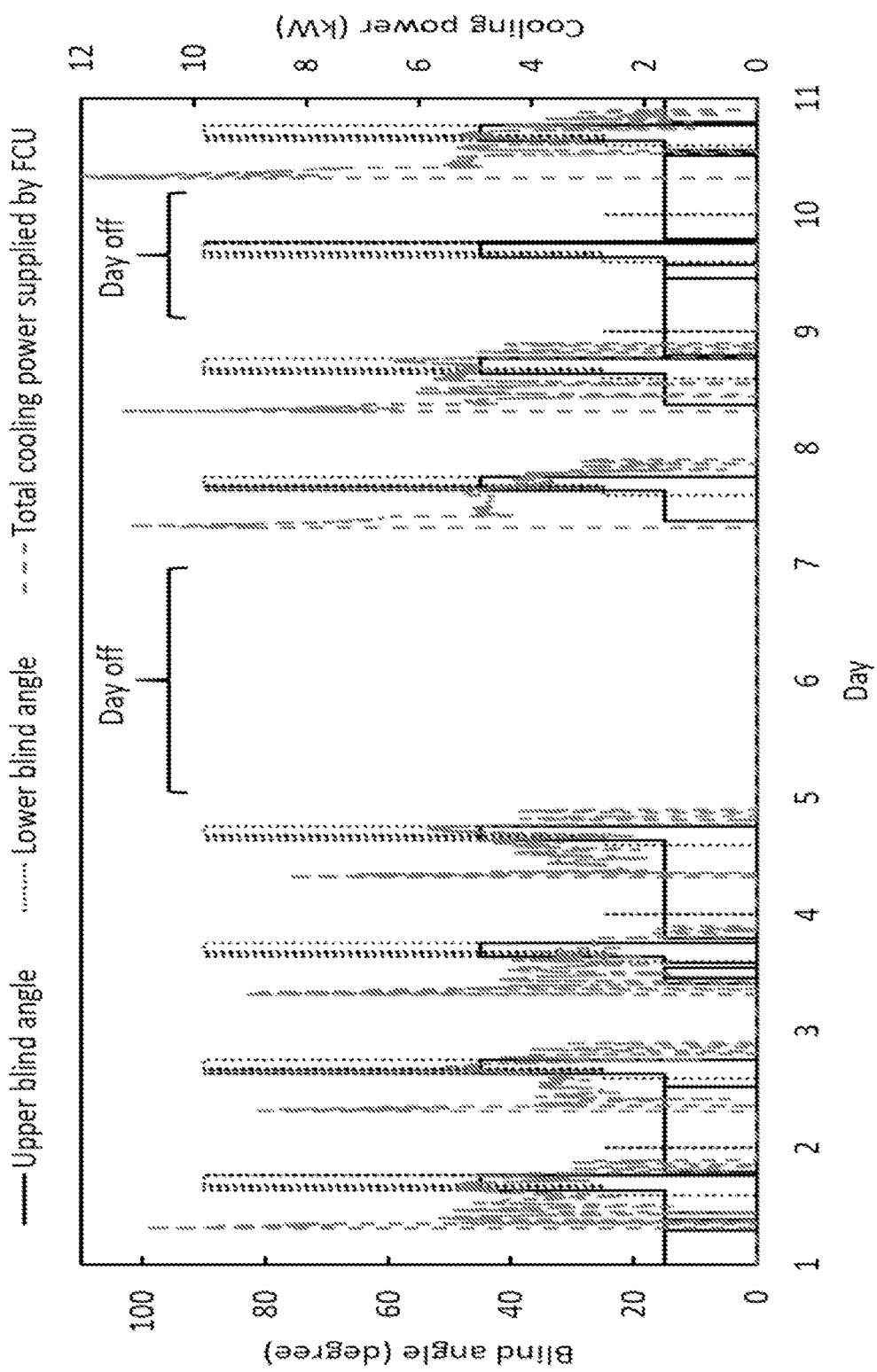
Figure 17A:
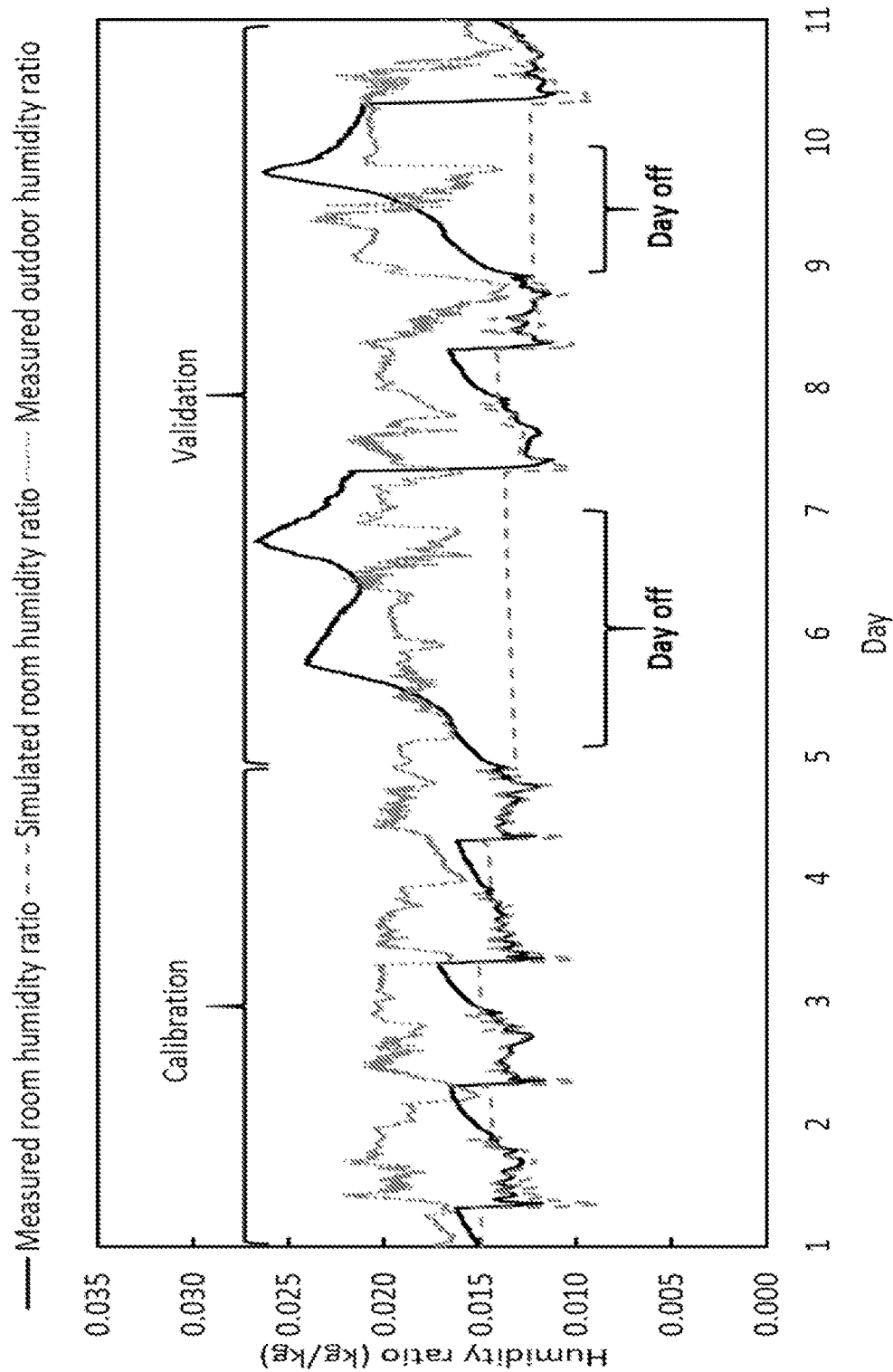
FIGS. 17A and 17B show comparison of simulated (a) room air temperature (FIG. 17A) and (b) humidity ratio (FIG. 17B) with measured data, according to various example embodiments of the present invention.
Figure 17B:
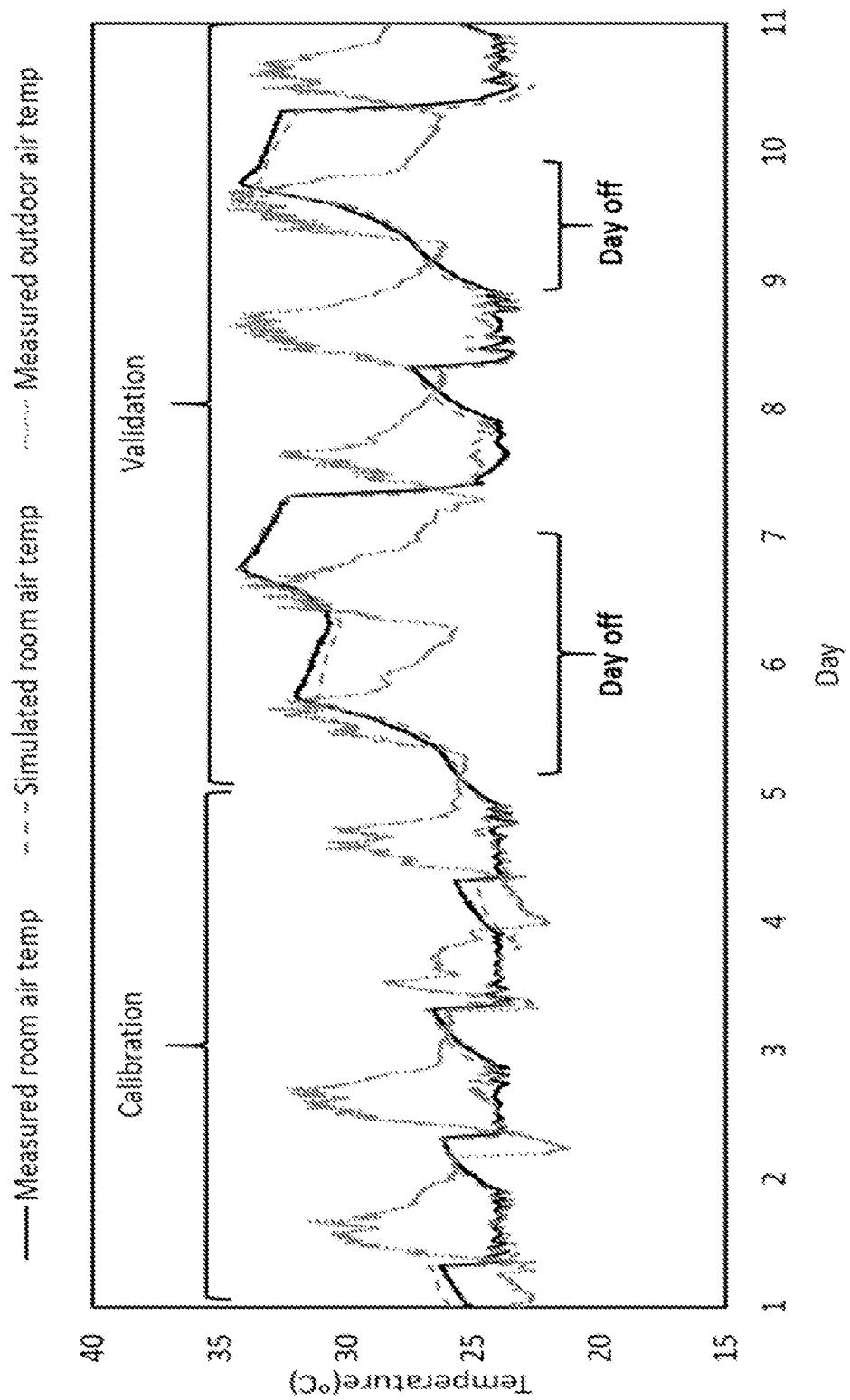

In various example embodiments, the RC model (as described hereinbefore according to various example embodiments) was calibrated and refined using measurement data obtained in SkyLab. Ten days of experiment was conducted to measure the room temperature and humidity responses to different conditions, as shown in FIGS. 16A and 16B and FIGS. 17A and 17B. In particular, FIGS. 16A and 16B show the test condition for model calibration and validation and FIGS. 17A and 17B show comparison of simulated (a) room air temperature (FIG. 17A) and (b) humidity ratio (FIG. 17B) with measured data. Then the accuracy of the calibrated model was validated against the experimental data.

Weather, room conditions, and ACMV system parameters were measured in SkyLab. Sensor readings were recorded by the data acquisition system in SkyLab at one-minute intervals. For the ACMV system, parameters of the air loop (dry bulb temperature, humidity and flow rates) and the chilled water loop (temperature, flow rate) were measured for calculating cooling power supply as the input for the simplified RC building model. The weather conditions were also measured by sensors installed on the rooftop, as inputs for the RC model. The responses of the room conditions including air temperature and humidity were measured as the benchmark for subsequent model calibration and validation.

In RC building models, the parameters R and C of building components are the key factors that affect the simulation performance. Thus, the R and C parameters are tuned in this calibration procedure. For building envelope, the R and C may be calculated by thermal properties of its material as the initial values. Other indoor components like furniture, ducts, and so on is represented by a 1R1C node which is only connected to room air temperature node. The R and C are assigned an estimated value. All the R and C parameters bounded between 0 and positive infinity. The objective is to minimize the sum squared error of room temperature, such as expressed in Equation (61)

$$J = \text{Minimize}(\Sigma_{k=0}^{N}(T_{z,est} - T_{z,exp})^2), \quad (61)$$

where $T_{z,est}$ and $T_{z,exp}$ refer to simulated room temperature (K) and measured room temperature (K), respectively.

The air temperature response of the RC model was calibrated using the room temperature measured during the first four days. The calibrated RC model response was then compared to the room temperature measured in the rest of six days. Good agreement between the simulated room temperature (using the calibrated RC model) and the measured room temperature was found, as shown in FIG. 17A. The mean absolute percentage error (MAPE) of room temperature was 1.55% in the validation days.

The air humidity ratio response of the calibrated RC model was also validated. FIG. 17B shows the good agreement between the simulated and measured humidity ratios during office hours and the MAPE was 4.93%. Since the RC model does not consider the moisture penetration from the ambient through building cracks, the simulated humidity ratio result during the non-office hours (ACMV off) is constant, which deviates from the measurement data. However, the mismatch in non-off hours does not affect the MPC performance in office hours since the MPC is a closed loop control.

4.3—Experimental Setup

A comparative experimental study was conducted in BCA SkyLab to explore the performance of the developed integrated control system, according to various example embodiments of the present invention. The developed integrated control system is implemented in Test Cell, while Reference Cell is controlled by the existing BMS. Before the test of the developed integrated control system, baseline tests were conducted to identify the performance difference between the two cells, which was caused by the uncertainties in tests such as sensor errors, air leakage, window façade difference and ACMV structure difference.

Figure 18:
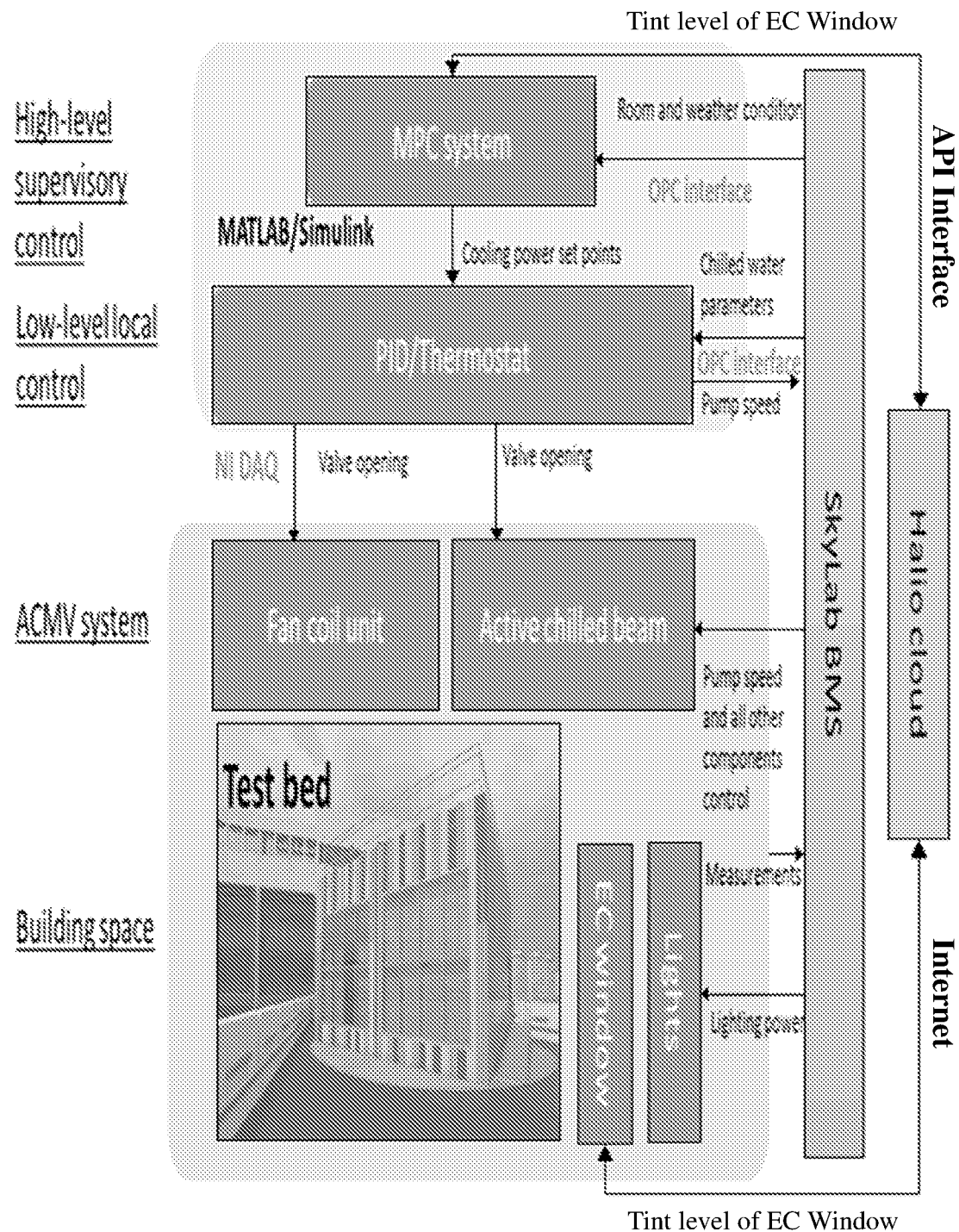
FIG. 18 shows an integration of the MPC system with hardware system, according to various example embodiments of the present invention.

The control system is integrated with SkyLab as shown in FIG. 18. In particular, FIG. 18 shows an integration of the MPC system 600 with hardware system in SkyLab, according to various example embodiments. The control system developed in MATLAB/Simulink environment comprises two level controllers, integrated high-level supervisory controller and low-level local controllers. The integrated controller may fetch measured room and weather conditions from the BMS of SkyLab through one leading communication protocol (Open Platform Communications Data Access (OPC DA)). Based on the measurements, the integrated controller generates the optimal cooling power set points for the ACMV system and tint level for the EC window. Then, the integrated controller sends the set points of the ACMV system and the EC window to the low-level local controllers and a cloud server for executing, respectively.

For the ACMV system, the integrated controller may generate two cooling power set points for FCU and ACB respectively. A PID controller conducts the cooling power set point for FCU by controlling the water valve (WV1), as shown in FIG. 11A. Another PID controller was employed to conduct the cooling power set point for ACB by regulating the water pump (WP 1) speed. The three water valves (WV 3-5) were controlled to maintain the three zones of Test Cell at the thermal level.

The control signals for all the water valves (WV 1-5) were delivered by National Instruments data acquisition device directly. The control signal for the water pump (WP 1) was sent to SkyLab BMS first and then the BMS may regulate the pump speed according to the control signal.

4.4—Baseline Test

To eliminate or mitigate uncertainties, such as sensor errors, air leakage and ACMV structure difference between Test Cell and Ref. Cell, two baseline tests, as shown in Table 2 below, were conducted in SkyLab to identify the difference between the two cells caused by uncertainties. In Baseline test 1, which is the baseline for MPC Test 1, the two cells in SkyLab are both operating with conventional FCU-ACMV system and both under BMS control. In Baseline test 2, which is the baseline for MPC Test 2-4, the two cells in SkyLab are both under BMS control but Test Cell is switched to be under the ACB-ACMV system. For both two baseline tests, the EC window in Test Cell is at 38% tint level to achieve the same SHGC as the Low-e double glazing in Ref. Cell.

TABLE 2

Setup and Schedule of Baseline Tests

| Baseline | Cell | ACMV system | Control Strategy | Test period (days) |
|---|---|---|---|---|
| 1 | Test Cell | Conventional FCU | BMS | 3 |
|   | Ref. Cell | Conventional FCU | BMS |   |
| 2 | Test Cell | ACB | BMS | 2 |
|   | Ref. Cell | Conventional FCU | BMS |   |

Figure 19A:
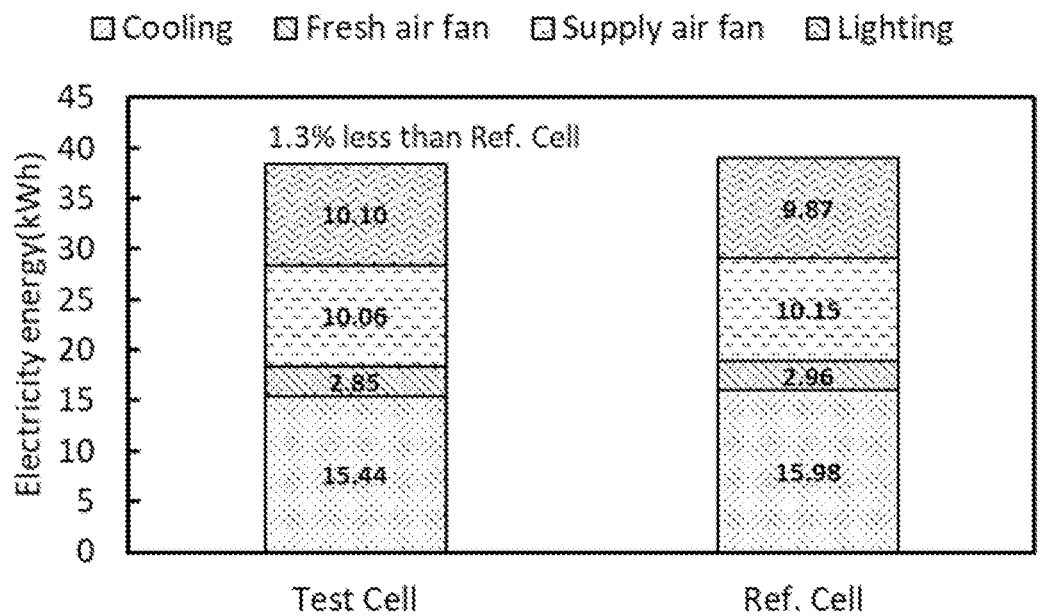
FIGS. 19A and 19B depict energy performance comparison of two cells in SkyLab with respect to Baseline Test 1 (FIG. 19A) and Baseline Test 2 (FIG. 19B), according to various example embodiments of the present invention.
Figure 19B:
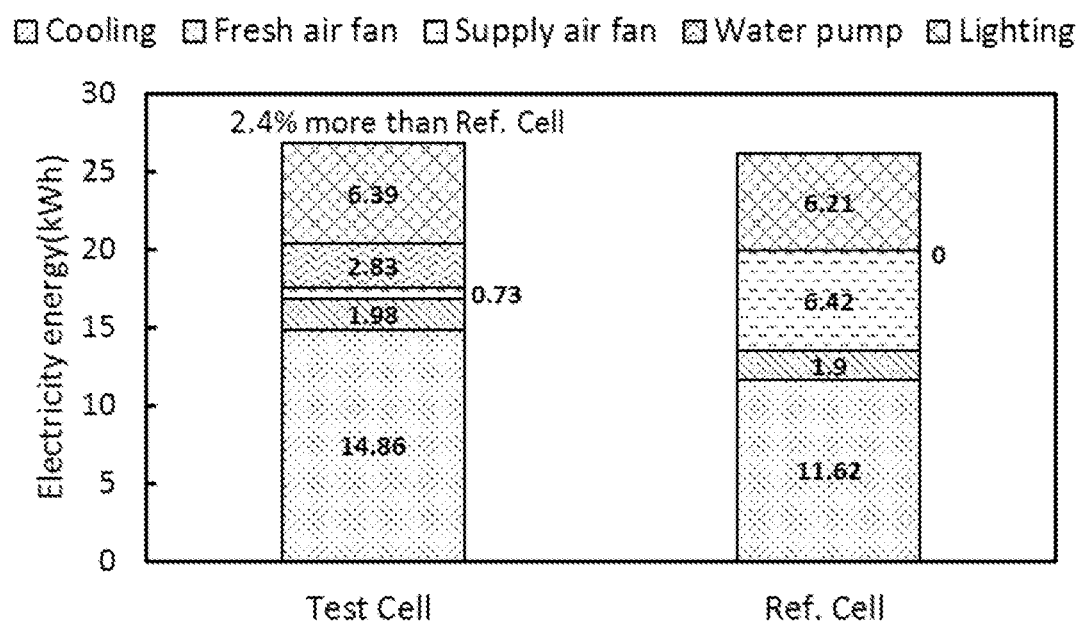

FIGS. 19A and 19B shows energy performance comparison of two cells in SkyLab when two cells both are under the conventional BMS control. In particular, FIGS. 19A and 19B depict energy performance comparison of two cells in SkyLab with respect to Baseline Test 1 (FIG. 19A) and Baseline Test 2 (FIG. 19B). For conventional FCU-ACMV system, the electricity energy may be consumed by cooling, fresh air fan and supply air fan. For ACB-ACMV system, the electricity energy may be consumed by cooling, fresh air fan, supply air fan and water pump. When the two cells were under the same ACMV system (conventional FCU) and same BMS control, Test Cell consumed 1.3% less electricity energy (ACMV system+lighting) than Ref. Cell. When Test Cell was switched to ACB-ACMV system and two cells were both under BMS control, Test Cell consumed 2.4% more electricity energy (ACMV system and lighting) than Ref. Cell.

4.5—Real-Time Test of the Developed MPC System

According to various example embodiments, four tests for the MPC system 600 were conducted in BCA SkyLab as shown in FIG. 20. In particular, FIG. 20 depicts a table (which may herein be referred to as Table 3) showing an example setup and schedule of tests for the MPC system 600. For Test 1, the MPC system 600 was employed to control the conventional FCU-ACMV system in SkyLab Test Cell. In Test 2, the MPC system 600 controlled the ACB-ACMV system in SkyLab Test Cell. In Test 3 and Test 4, the MPC system 600 controlled both ACMV, lighting and EC glazing window.

In all the four tests, the conventional FCU-ACMV system in SkyLab Ref. Cell was controlled by SkyLab BMS with the PID control strategy to represent current building control practice.

Figure 21A:
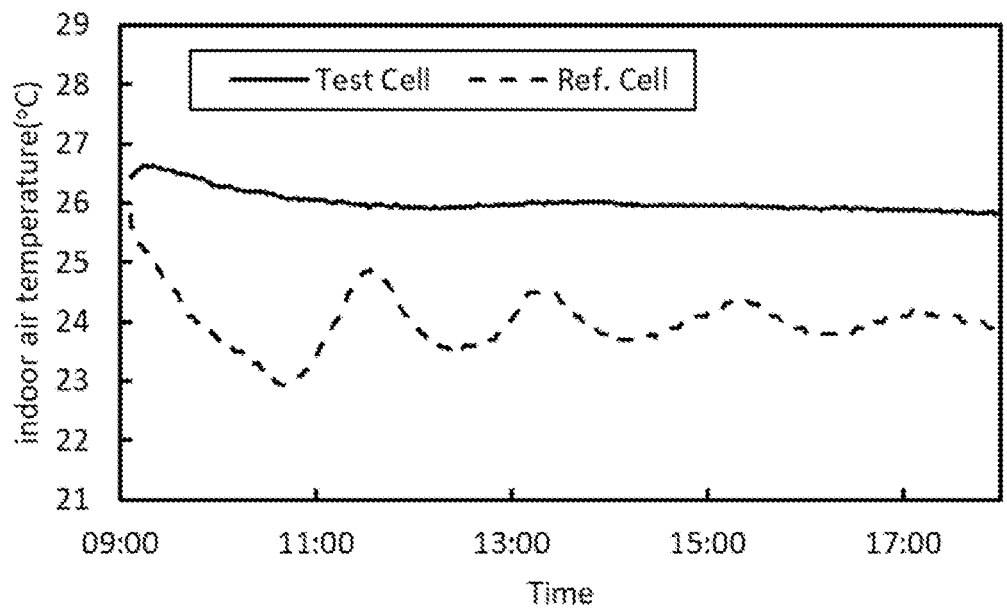
FIGS. 21A and 21B shows the room air temperature and indoor PMV results, respectively, of both MPC system and SkyLab BMS control on a typical day intermediate sky condition, according to various example embodiments of the present invention.
Figure 21B:
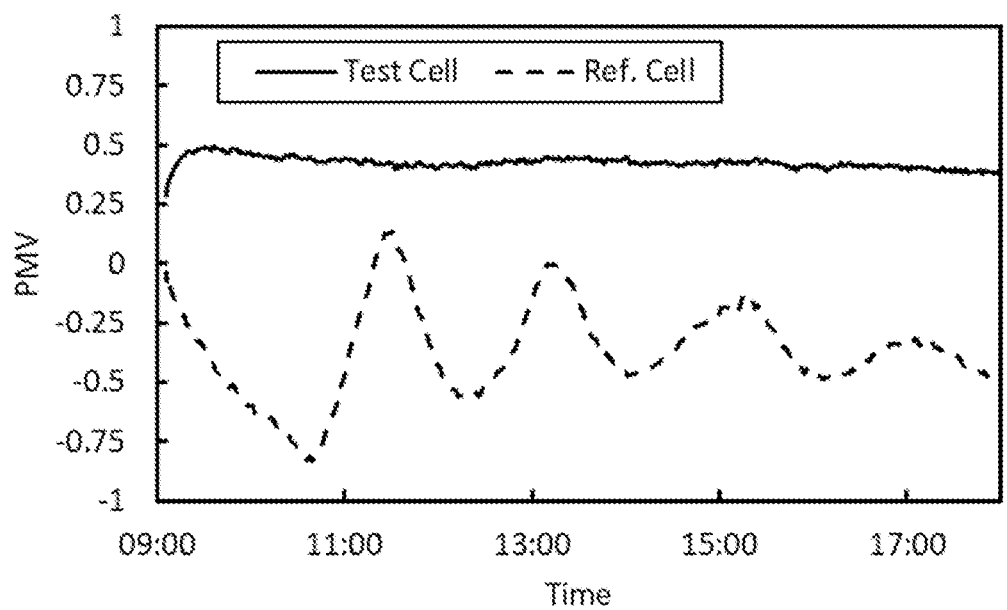

FIGS. 21A and 21B show the room air temperature and indoor PMV results, respectively, of both MPC system and SkyLab BMS control on a typical day intermediate sky condition. The results exhibit that the room temperature and PMV of MPC have much less variations than SkyLab BMS control, which indicates MPC has the capacity to build stable indoor environment by eliminating possible indoor and outdoor disturbances with the prediction ability. The indoor PMV result of MPC is close to but still below upper limit (0.5) of thermal comfort requirement. Because of the multiple-objectives in MPC, the MPC system 600 may be configured to seek the optimal trade-off between energy consumption and indoor thermal comfort by minimizing the cooling power and indoor PMV, subjecting to thermal comfort requirement (−0.5, 0.5). The indoor temperature and PMV of SkyLab BMS control exhibit fluctuating patterns due to the reactive control logic. At some time, such as during 10 am to 11 am, the indoor PMV of SkyLab BMS control is lower than the lower limit (−0.5) of thermal comfort requirement, which indicates the over-cooling problem of PID control.

Figure 22A:
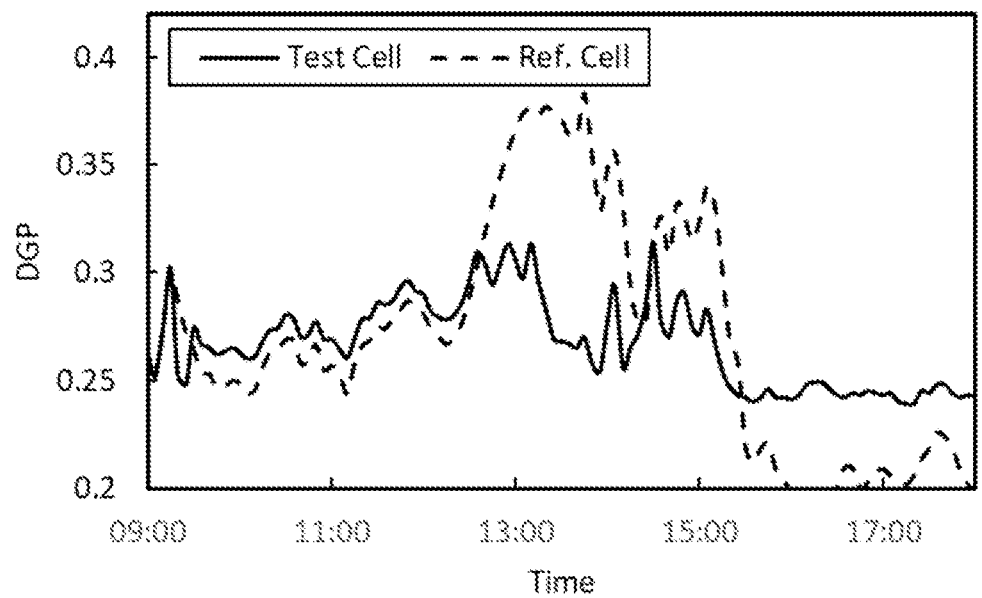
FIGS. 22A and 22B depict plots illustrating the indoor DGP and illuminance results on a typical day intermediate sky condition, according to various example embodiments of the present invention.
Figure 22B:
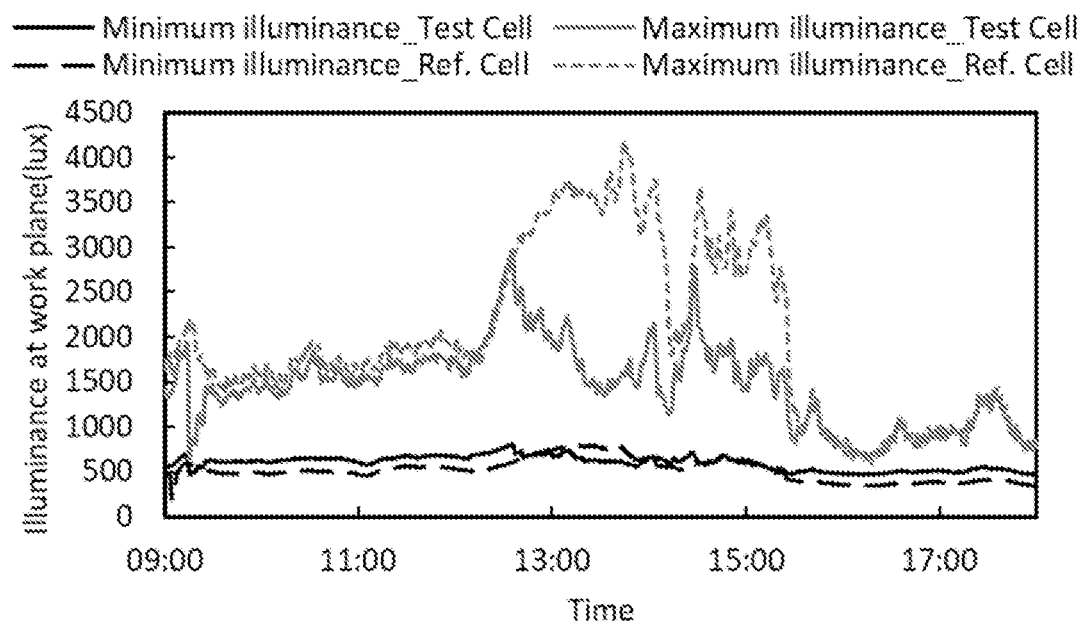

FIGS. 22A and 22B depict plots illustrating the indoor DGP and illuminance results on a typical day intermediate sky condition. In Ref. Cell with Low-e window, the DGP during 12:50 to 13:50 is beyond 0.35, which causes discomfort according to the Wienold reference mentioned hereinbefore. In contrast, DGP in Test Cell with EC window, which is under MPC, is 100% under comfort zone. FIG. 22B presents the minimum and maximum work plane illuminance in both Test Cell and Ref. Cell. The test results show that the maximum illuminance at work plane in Ref. Cell with Low-e window exceeds the upper limit (2000 lux) during 12:20-15:30 hour. In Test Cell, the MPC system regulated the EC window to tint at 12:30 hour to reduce the daylight penetration. FIG. 22B exhibits that the maximum illuminance in Test Cell is within 500-2000 lux at the most of time.

Figure 23A:
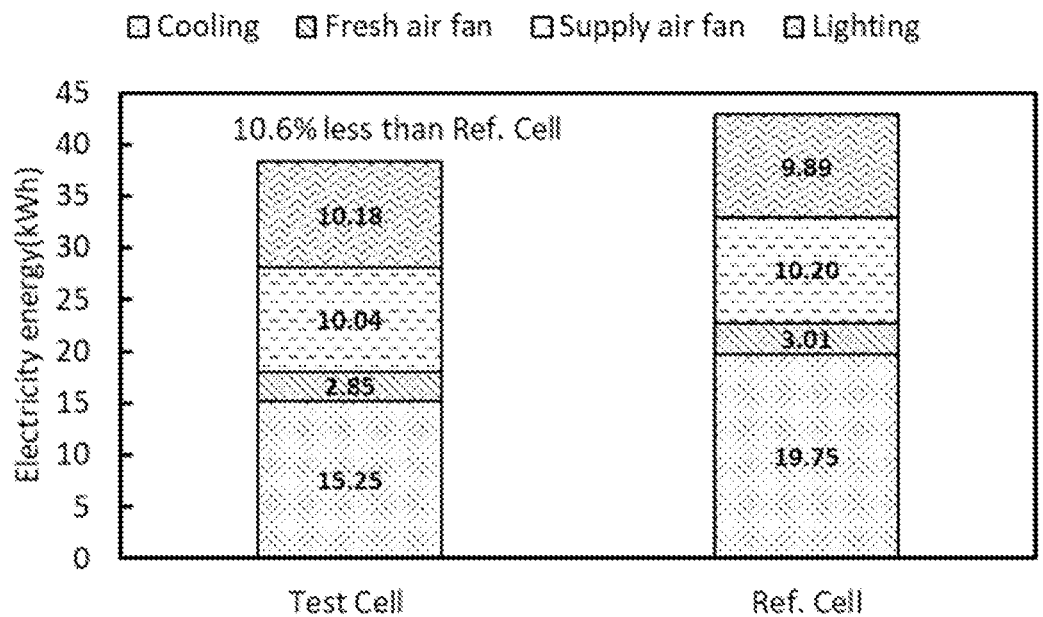
FIGS. 23A, 23B, 23C and 23D show the energy performance comparison of four tests of the MPC system, according to various example embodiments of the present invention.
Figure 23B:
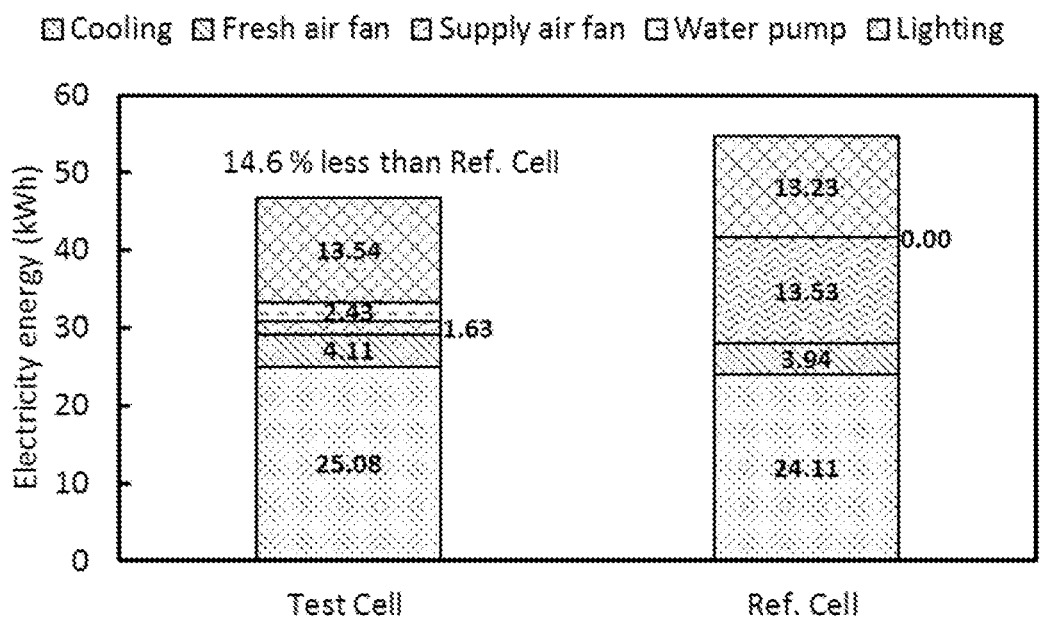
Figure 23C:
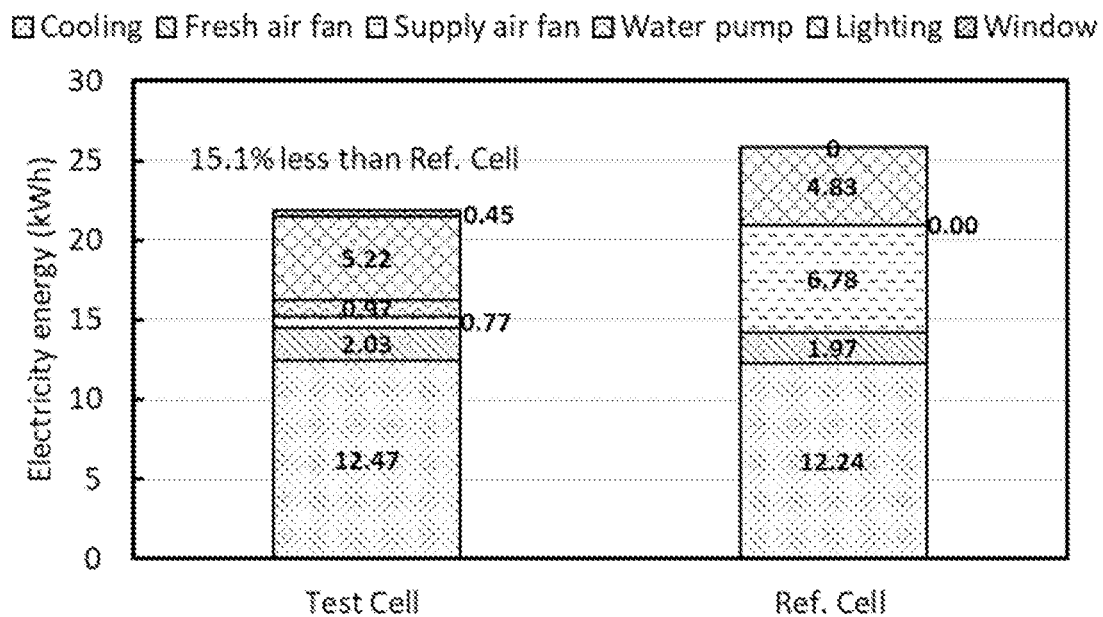
Figure 23D:
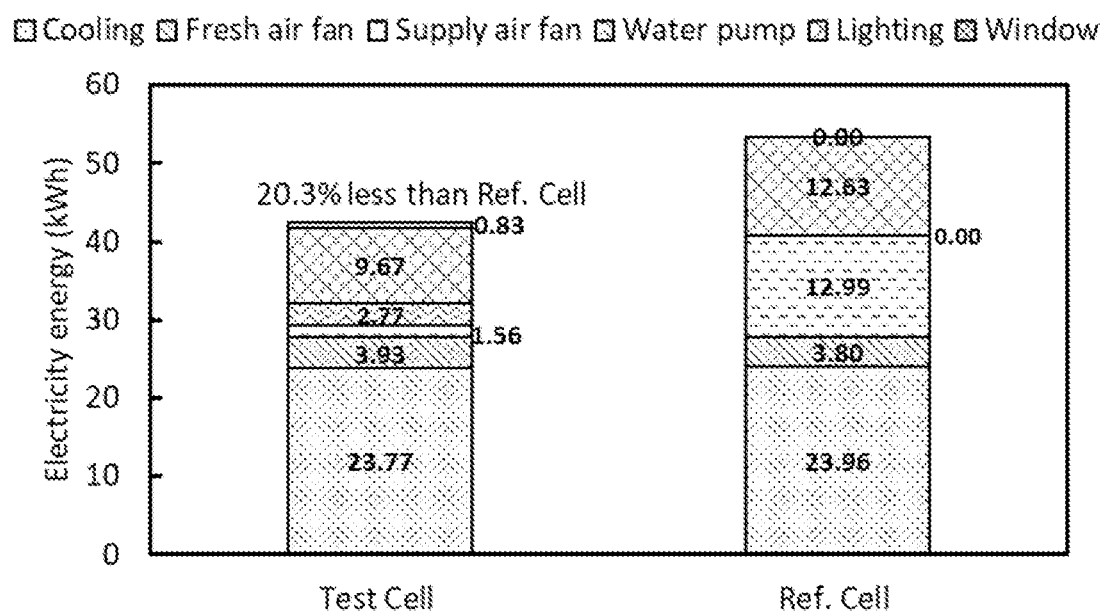

According to various example embodiments, the electricity energy consumed by different systems of MPC and SkyLab BMS control of all the four tests are presented in FIGS. 23A, 23B, 23C and 23D. In particular, FIGS. 23A, 23B, 23C and 23D show the energy performance comparison of four Tests of the MPC system with respect to (a) Test 1, (b) Test 2, (c) Test 3, (d) Test 4, respectively. The electricity consumption by cooling was calculated using an assumed chiller COP (coefficient of performance) of the chiller used in BCA SkyLab. Compared to Ref. Cell with BMS control, Test Cell with MPC in Test 1 consumes 10.6% less building electricity energy. After eliminating the energy performance difference between the two cells in SkyLab identified by Baseline Test 1, MPC is able to reduce 9.3% electricity energy for the conventional FCU-ACMV system. In Test 2, Test Cell consumed 14.6% less electricity energy than Ref. Cell, which means MPC is able to save 17% building electricity energy for ACB-ACMV system based on the results of Baseline Test 2. FIG. 23C shows MPC was able to save 17.5% building electricity energy for both ACB-ACMV system and EC glazing window. Although, MPC for EC glazing does not save much energy further, better indoor visual condition is achieved as shown in Table 5 to Table 7 later below. FIG. 23D shows that MPC controlled ACB-ACMV, EC glazing window and lighting systems were able to save 22.7% building electricity energy.

Table 4 to Table 7 shown below summarize the comparison of indoor thermal comfort results of the MPC system and SkyLab BMS, comparison of indoor visual condition results of EC glazing window controlled by MPC and Low-e double glazing window. The compliance ratio (percentage of time when indoor PMV is within acceptable range) of indoor PMV of MPC is 99.9%, while the value of conventional BMS control is 95.5%.

Table 5 to Table 7 also exhibit improvement of indoor visual condition in terms of DGP and illuminance at work plane by EC glazing window with MPC, compared to Low-e double glazing window. For indoor DGP, MPC achieve 100% compliance ratio while Low-e double glazing window has 95.5% compliance ratio. For illuminance at work plane, both maximum and minimum illuminance (with 94% and 91.6% compliance ratio, respectively) are improved by MPC for EC window, compared to Low-e double glazing window (with 73.2% and 79.2% compliance ratio, respectively).

TABLE 4

Thermal comfort (PMV) results of Test 1-4

| Rating | Acceptable | Warm/cool |
|---|---|---|
| Range | −0.5-0.5 | >0.5 or <−0.5 |
| Test Cell (MPC) | 99.9% | 0.1% |
| Ref. Cell (BMS) | 95.5% | 4.5% |

TABLE 5

Visual comfort (DGP) results of Test 3-4

| Rating | Imperceptible | Perceptible or worse |
|---|---|---|
| Range | <0.35 | >0.35 |
| Test Cell (MPC) | 100.0% | 0.0% |
| Ref. Cell (BMS) | 93.6% | 6.4% |

TABLE 6

Visual comfort (Maximum illuminance at work plane) results of Test 3-4

| Rating | Within requirement | Exceed requirement |
|---|---|---|
| Range | <2000 lux | >2000 lux |
| Test Cell (MPC) | 94.0% | 6.0% |
| Ref. Cell (BMS) | 73.2% | 26.8% |

TABLE 7

Visual comfort (Minimum illuminance at work plane) results of Test 3-4

| Rating | Within requirement | Exceed requirement |
|---|---|---|
| Range | >500 lux | <500 lux |
| Test Cell (MPC) | 91.6% | 8.4% |
| Ref. Cell (BMS) | 79.2% | 20.8% |

5—Experimental Evaluation 5.1—Introduction

The control performance of the MPC system was further evaluated by implementation in a lecture theatre (LT3) on the campus of Nanyang Technological University (NTU) to control two types of air conditioning systems including: (1) a conventional single-coil air-handling unit (AHU) air conditioning system and (2) a separate sensible and latent cooling (SSLC) air conditioning system assisted by a dedicated outdoor air system (DOAS). The filed test demonstrated that the MPC system was able to achieve 18% and 20% electricity savings for the AHU and SSLC as compared to the original building management system (BMS) controlled AHU. Furthermore, indoor thermal comfort was significantly improved by the MPC system according to various example embodiments, compared to the original BMS.

5.2—Test Building

Figure 24:
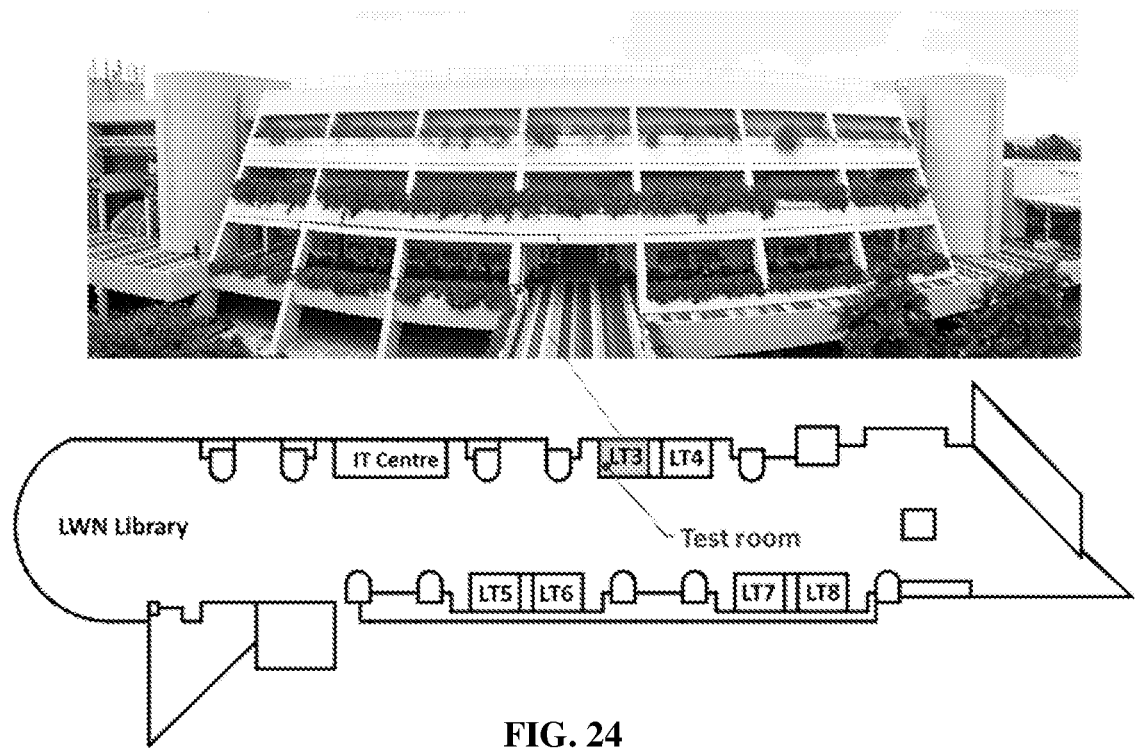
FIG. 24 shows a view of a building and the location of a test room in the building for evaluating the control performance of the MPC system for air conditioning and mechanical ventilation (ACMV) systems, according to various example embodiments of the present invention.

FIG. 24 shows a view of a building and the location of the LT3 in the building (north academic complex on the campus of NTU in Singapore). LT3 was selected as another test bed for evaluating the control performance proposed MPC system for air conditioning and mechanical ventilation (ACMV) systems. The ACMV system of LT3 is an AHU of conventional single-coil setup, which is later modified to a SSLC setup for by adding a DOAS. The walls of LT3 are of 0.2-m-thick reinforced concrete. The wall surface area is 204 m². The roof and floor of the test room are composed of 0.4-m-thick reinforced concrete. The total floor area of LT3 is 255 m².

Figure 25:
FIG. 25 depicts an internal view of the test room and pictures of sensors installed in the room space, according to various example embodiments of the present invention

The test room was fitted with 240 seats, divided into 3 columns (left, middle and right) as shown in FIG. 25. In particular, FIG. 25 depicts an internal view of the test room and pictures of sensors installed in the room space. A total of 151 lamps were fitted on the ceiling, each rated at 30 W, providing a lighting power density of 17.8 W/m² of floor area. The heat gain from occupants and lighting forms the bulk of the internal load. Different sensors as shown in FIG. 25 were installed in the room space for monitoring room conditions.

Figure 26:
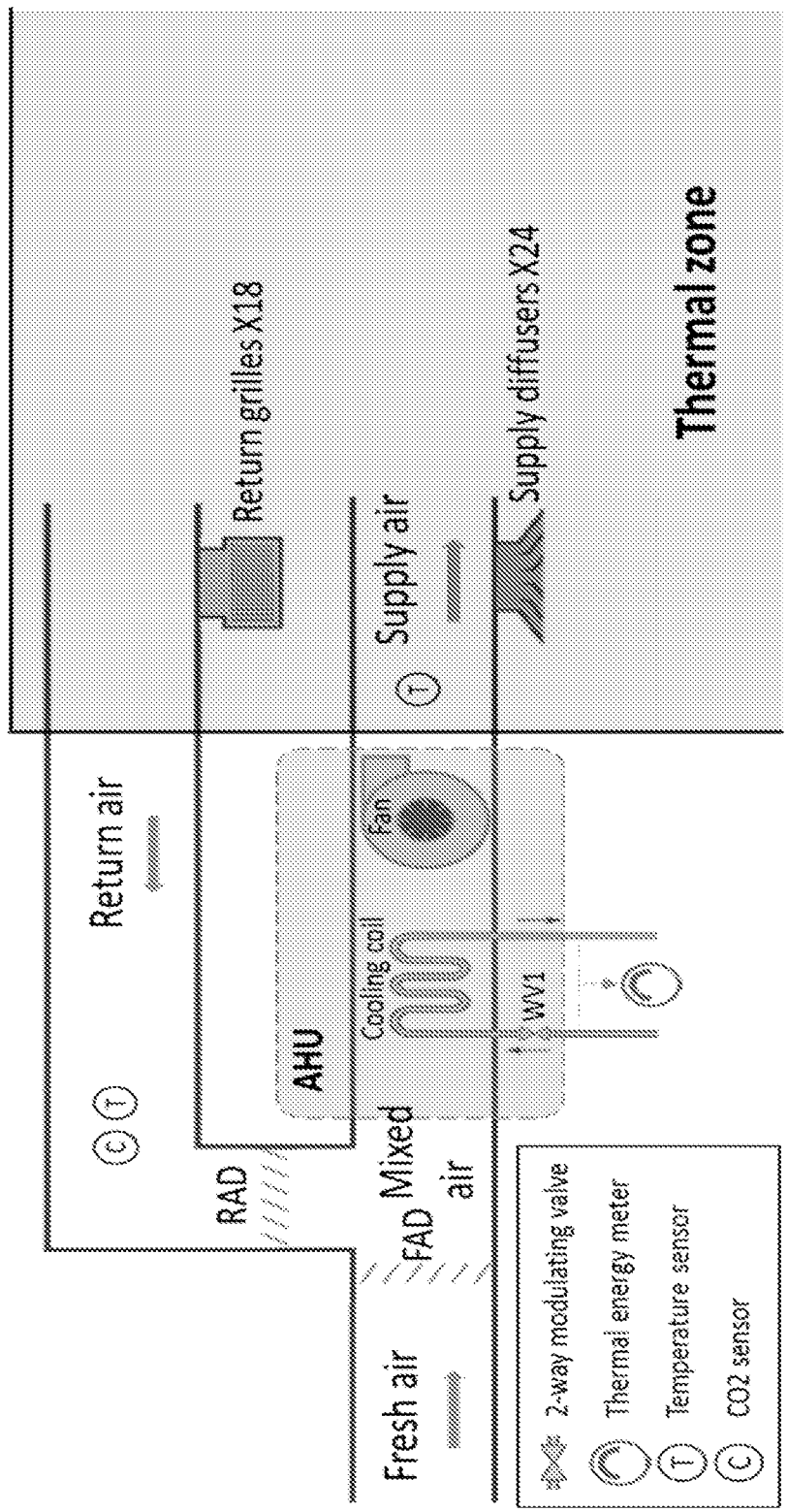
FIG. 26 depicts a schematic of an original ACMV system in the test room.

LT3 is originally air-conditioned by a single-coil variable air volume (VAV) AHU, as shown in FIG. 26, that was controlled by a conventional existing BMS of the test building. FIG. 26 depicts a schematic of the original ACMV system in the test room. The maximum airflow volume of the AHU is 14,882 m³/h. Airflow volume was regulated by a variable speed drive (VSD) fan according to a temperature set-point of 24° C. in the return air. Fresh air flowrate was regulated by a motorized fresh air damper (FAD) according to a $CO_2$ concentration set-point of 900 ppm in the return air. The return air damper (RAD) was kept 100% open when the $CO_2$ concentration in return air is below 1000 ppm and was regulated to 50% open when the $CO_2$ concentration goes beyond 1000 ppm. Chilled water flowrate through the cooling coil was regulated by a two-way motorized water valve (WV1) according to the temperature a set-point of supply air. The chilled water was provided by a central chiller plant in the test building, which has an average COP of 5.388. The average chilled water supply temperature is 8.5° C.

Figure 27:
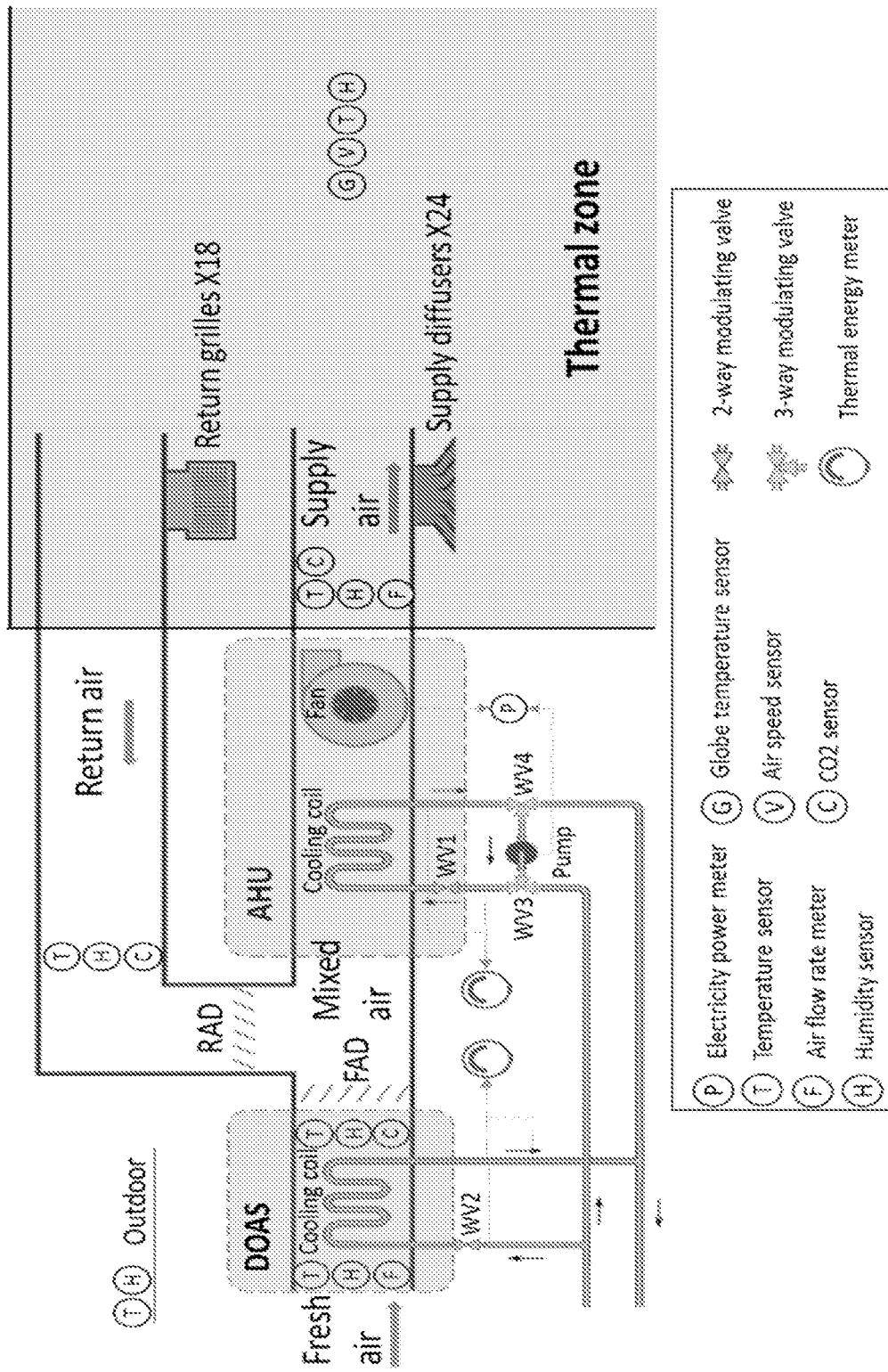
FIG. 27 depicts a schematic of a modified separate sensible and latent cooling (SSLC) ACMV system in the test room.

The ACMV system was later modified by adding a DOAS between the FAD and fresh air inlet, as shown in FIG. 27. In particular, FIG. 27 depicts a schematic of the modified SSLC ACMV system in the test room. The original cooling coil in AHU became a secondary cooling coil for dealing with the remaining sensible load. Chilled water flowrate through the water loop of the DOAS was regulated by a two-way motorized valve (WV2). One major advantage of SSLC is that the secondary coil may use higher-temperature chilled water temperature to increase chiller efficiency. However, there is no extra higher-temperature chiller in the test building. Thus, the water loop of the secondary cooling coil was modified such that the chilled water supply temperature may be raised. A constant-speed water pump and two three-way motorized valves (WV3 and WV4) were installed, which regulated the mixing of chilled water from the chiller plant and recirculated chilled water from the secondary cooling coil. The mixed chilled water with higher-temperature of 11° C. was supplied into the secondary cooling coil.

5.3—Real-Time Test of the MPC System

Figure 28:
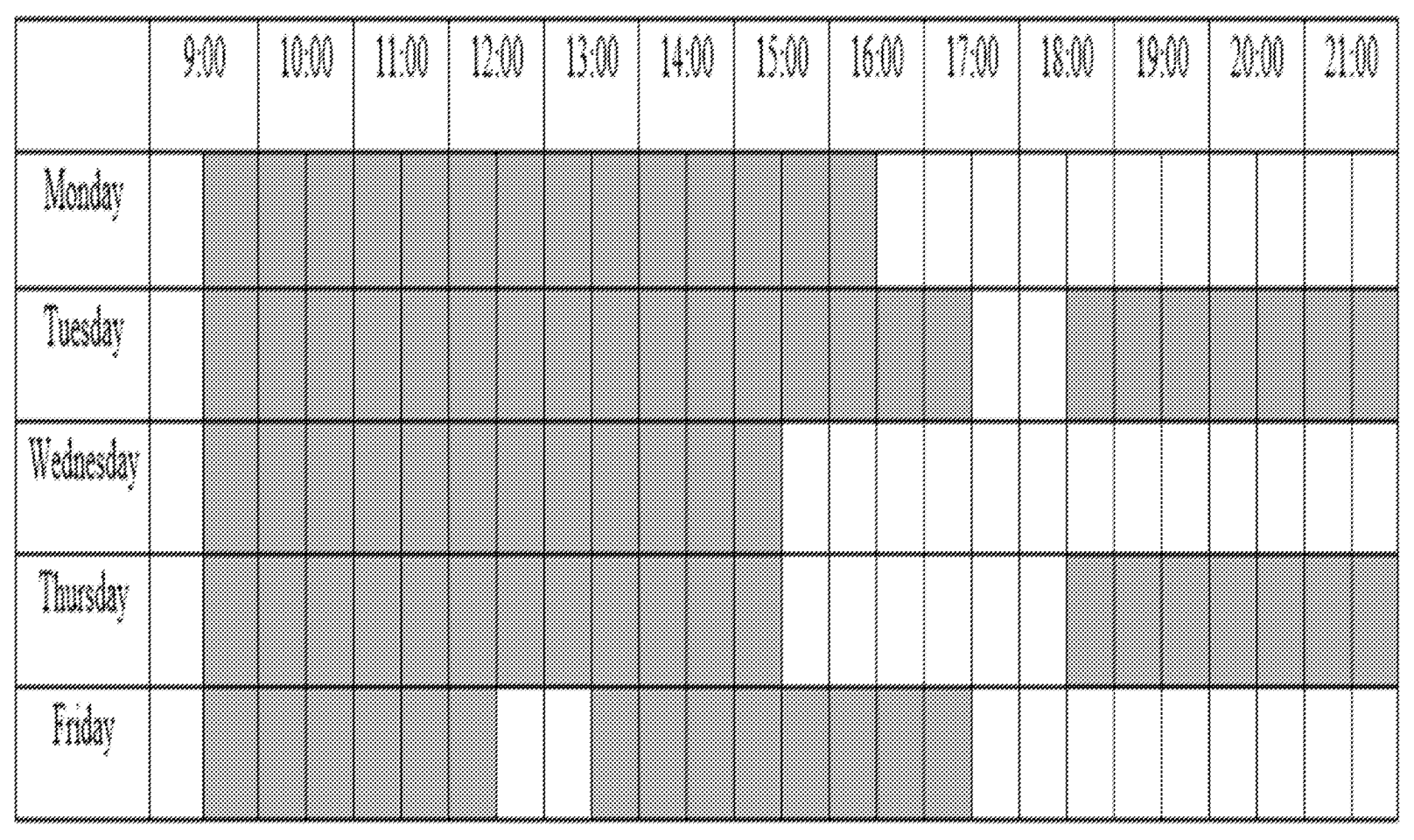

According to various example embodiments, an example weekly class schedule in the test room during the test period is listed in FIG. 28. There are 40 hours of classes per week and the schedule repeats weekly for the test period. The internal loads (occupancy and lighting load) during class time are assumed to be the same for every week. Three settings: 1) BMS controlled AHU (BMS-AHU); 2) MPC system controlled AHU (MPC-AHU); and 3) MPC system controlled SSLC (MPC-SSLC) were conducted. The test for each setting ran for two weeks.

Figure 29:
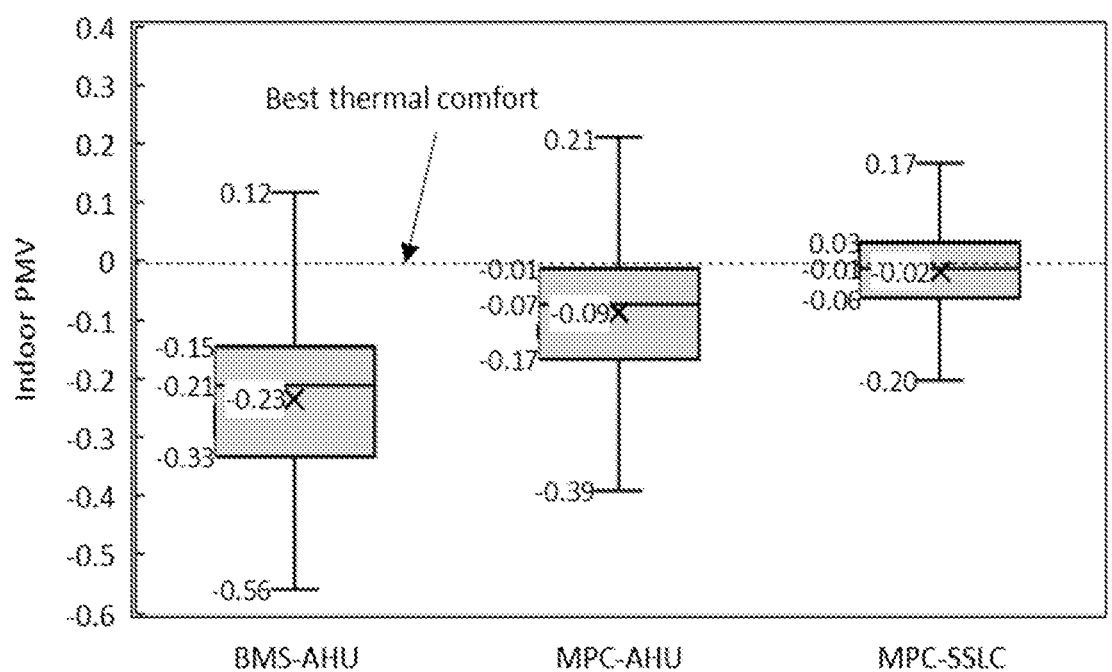
FIG. 29 shows the statistical distributions of the measured indoor predicted mean vote (PMV) during class time for the three settings in the test room in the test period, according to various example embodiments of the present invention.

The statistical distributions of the measured indoor predicted mean vote (PMV), which is an index of thermal comfort, during class time for the three settings in the test room in the test period are shown in FIG. 29 as box plots. It is observed that the median indoor PMV for BMS-AHU, MPC-AHU and MPC-SSLC are −0.23, −0.09 and −0.02, respectively. This suggests that MPC-SSLC maintains the best indoor thermal comfort among the three settings, whereas BMS-AHU is the worst. Both MPC settings kept indoor PMV within the comfortable zone ($-0.5 \leq PMV \leq 0.5$) during all the class time, whereas indoor PMV went below −0.5 (overcooling) occasionally in BMS-AHU setting.

Figure 30:
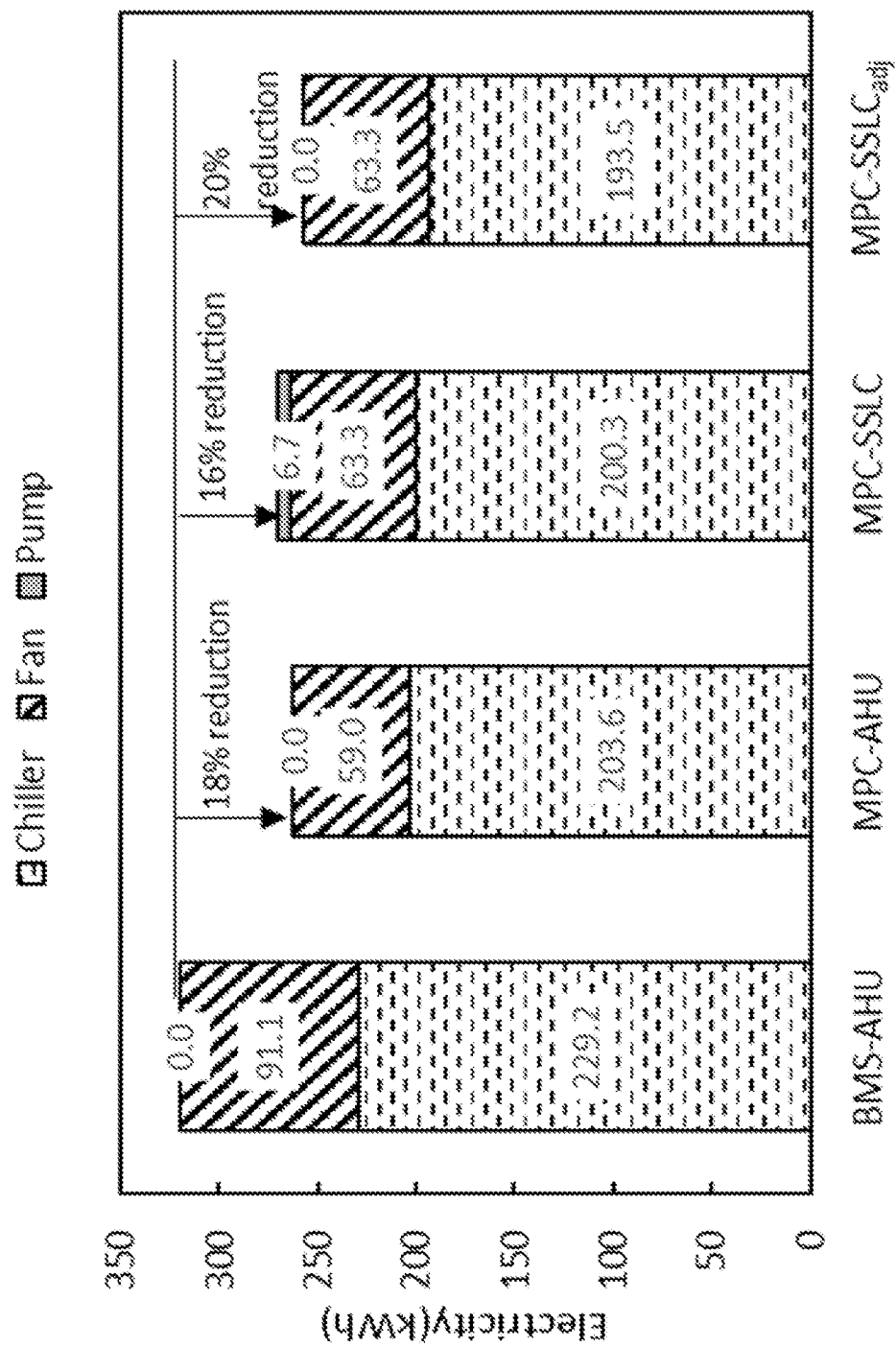
FIG. 30 shows the average weekly ACMV electricity consumption for each of four settings, according to various example embodiments of the present invention.

FIG. 30 shows the average weekly ACMV electricity consumption for each setting. In particular, FIG. 30 shows the average weekly ACMV electricity consumption for different cases (BMS-AHU, MPC-AHU and MPC-SSLC) as well as adjusted average weekly ACMV electricity consumption of MPC-SSLC case (MPC-$SSLC_{adj}$). The values shown in FIG. 30 were averaged over the two-week test period in each setting. ACMV electricity consumption consists of the consumption by chiller, fan and pump (in the case of MPC-SSLC). The chiller electricity consumption is estimated based on the measured cooling energy and a COP value of 5.388 for the central chiller plant serving the test building. The MPC settings produced 16-18% energy saving as compared to BMS-AHU. Among the two MPC settings, MPC-SSLC was found to consume slightly less chiller energy than MPC-AHU but MPC-SSLC was found to consume extra fan and pump energy. The extra fan energy in SSLC may mainly be due to the higher airflow volume needed to compensate for the raised supply air temperature to avoid condensation in the secondary cooling coil. The extra pump energy in SSLC is because of the need to recirculate chilled water in the secondary coil loop to achieve raised chilled water supply temperature, due to the lack of a separate higher temperature chiller in the test building. These extra consumptions lead to less energy saving by MPC-SSLC than MPC-AHU.

If the SSLC system is implemented in a building with separate chillers for the DOAS and secondary coil, the thermal efficiency of the higher-temperature chiller that provides chilled water for the secondary cooling coil may be higher and the extra pump energy consumption may be eliminated. An adjusted average weekly ACMV electricity consumption of MPC-SSLC based on this fictitious scenario was estimated as shown in FIG. 30 (MPC-SSLCadj). Assuming that chiller efficiency increases by 2%/° C. rise in chilled water supply temperature, the COP of the higher-temperature chiller producing chilled water of 11° C. for the secondary coil was estimated to be 5.658. Applying this estimated COP value to the secondary coil and removing the pump energy consumption, MPC-SSLC$_{adj}$ was estimated to have 20% energy saving as compared to BMS-AHU.

6—Example Commercial Applications

Currently, more than 90% large commercial buildings (>500,000 square feet) are installed with large BMS/BAC systems. In Singapore, around 82% commercial buildings are equipped with BMS/BAC systems. To improve building performance with BMS/BAC system further, integrated control and optimization technologies are highly in demand. Thus, the MPC system 600 according to various example embodiments may be applicable to any commercial buildings.

The experimental studies described herein demonstrated that the MPC system 600 according to various example embodiments is able to work with other commercial products such as DALI dimming system, Quantum Automation BMS and NI DAQ. Using industry standards including BACnet®, Niagara™, OPC®, LonWorks® and Modbus™ the MPC system 600 may work as a plug-in module, which communicates with the existing BMS/BAC in buildings, to drive the current BMS/BAC systems in buildings smarter, more energy efficient and human friendly.

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A method of controlling building service systems associated with a building for optimizing a plurality of building performance parameters in providing an environment with respect to a region of the building, using at least one processor, the building service systems comprising an air-conditioning and/or heating system, a lighting system and a shading system, the method comprising:

predicting, based on a shading and lighting prediction model, a visual comfort condition and a lighting condition with respect to the region of the building;

optimizing, based on a first multi-component cost function including a plurality of components relating to a plurality of lighting or thermal performance parameters with respect to the region of the building, one or more first control parameters for controlling the lighting system and the shading system based on the predicted visual comfort condition and the predicted lighting condition;

predicting, based on a building dynamics model, a plurality of building response parameters based on the predicted visual comfort condition and the predicted lighting condition associated with the region of the building, wherein the plurality of building response parameters comprises an index of thermal comfort; and optimizing, based on a second multi-component cost function including a plurality of components relating to the plurality of building performance parameters, one or more second control parameters for controlling the air-conditioning and/or heating system based on the predicted plurality of building response parameters, wherein the shading and lighting prediction model comprises:

a daylight penetration model configured to estimate a transmitted daylight illuminance associated with the shading system with respect to the region of the building;

a visual comfort model configured to predict the visual comfort condition based on the estimated transmitted daylight illuminance; and a lighting power model configured to predict the lighting condition based on the estimated transmitted daylight illuminance, wherein the plurality of building performance parameters include a building energy efficiency parameter, a human thermal comfort parameter, and a human visual comfort parameter.

2. The method according to claim 1, wherein the visual comfort model and the lighting power model are each based on a data-driven model, and the daylight penetration model is based on a non-data-driven model.

3. The method according to claim 1, wherein the daylight penetration model is configured to estimate the transmitted daylight based on an incident solar irradiance on one or more windows associated with the shading system.

4. The method according to claim 1, wherein the visual comfort condition comprises a maximum illuminance at a work plane in the region of the building, and the visual comfort model is trained based on measured data for predicting the maximum illuminance at the work plane based on the estimated transmitted daylight illuminance.

5. The method according to claim 1, wherein the lighting condition comprises a lighting power in the region of the building, and the lighting power model is trained based on measured data for predicting the lighting power based on the estimated transmitted daylight illuminance.

6. The method according to claim 1, wherein the plurality of components of the second multi-component cost function comprises a first component relating to a cooling energy, a second component relating to a thermal comfort, a third component relating to a cooling power change rate, and a fourth component relating to soft constraints.

7. The method according to claim 6, wherein said optimizing, based on the second multi-component cost function, is based on a minimization function with respect to a consumption of the cooling energy, a predicted mean vote (PMV) variation from thermo-neutral, the cooling power change rate, and constraints violation.

8. The method according to claim 1, wherein the plurality of components of the first multi-component cost function comprises a first component relating to a lighting power, a second component relating to a cooling power associated with heat flux gain from lighting associated with the lighting system, and a third component relating to a cool power associated with heat flux gain from one or more windows associated with the shading system.

9. The method according to claim 8, wherein said optimizing, based on the first multi-component cost function, is based on minimizing electricity power of the lighting associated with the lighting system and the cooling power due to the heat flux gain from the lighting associated with the lighting system and the heat flux gain from the one or more windows associated with the shading system.

10. A control system for controlling building service systems associated with a building for optimizing a plurality of building performance parameters in providing an environment with respect to a region of the building, the building service systems comprising an air-conditioning and/or heating system, a lighting system and a shading system, the control system comprising:
   a memory; and
   at least one processor communicatively coupled to the memory and configured to:
      predict, based on a shading and lighting prediction model, a visual comfort condition and a lighting condition with respect to the region of the building;
      optimize, based on a first multi-component cost function including a plurality of components relating to a plurality of lighting or thermal performance parameters with respect to the region of the building, one or more first control parameters for controlling the lighting system and the shading system based on the predicted visual comfort condition and the predicted lighting condition;
      predict, based on a building dynamics model, a plurality of building response parameters based on the predicted visual comfort condition and the predicted lighting condition associated with the region of the building, wherein the plurality of building response parameters comprises an index of thermal comfort; and
      optimize, based on a second multi-component cost function including a plurality of components relating to the plurality of building performance parameters, one or more second control parameters for controlling the air-conditioning and/or heating system based on the predicted plurality of building response parameters,
   wherein the shading and lighting prediction model comprises:
      a daylight penetration model configured to estimate a transmitted daylight illuminance associated with the shading system with respect to the region of the building;
      a visual comfort model configured to predict the visual comfort condition based on the estimated transmitted daylight illuminance; and
      a lighting power model configured to predict the lighting condition based on the estimated transmitted daylight illuminance,
   wherein the plurality of building performance parameters include a building energy efficiency parameter, a human thermal comfort parameter, and a human visual comfort parameter.

11. The control system according to claim 10, wherein the visual comfort model and the lighting power model are each based on a data-driven model, and the daylight penetration model is based on a non-data-driven model.

12. The control system according to claim 10, wherein the daylight penetration model is configured to estimate the transmitted daylight based on an incident solar irradiance on one or more windows associated with the shading system.

13. The control system according to claim 10, wherein the visual comfort condition comprises a maximum illuminance at a work plane in the region of the building, and the visual comfort model is trained based on measured data for predicting the maximum illuminance at the work plane based on the estimated transmitted daylight illuminance.

14. The control system according to claim 10, wherein the lighting condition comprises a lighting power in the region of the building, and the lighting power model is trained based on measured data for predicting the lighting power based on the estimated transmitted daylight illuminance.

15. The control system according to claim 10, wherein the plurality of components of the second multi-component cost function comprises a first component relating to a cooling energy, a second component relating to a thermal comfort, a third component relating to a cooling power change rate, and a fourth component relating to soft constraints.

16. The control system according to claim 15, wherein said optimize, based on the second multi-component cost function, is based on a minimization function with respect to a consumption of the cooling energy, a predicted mean vote (PMV) variation from thermo-neutral, the cooling power change rate, and constraints violation.

17. The control system according to claim 10, wherein the plurality of components of the first multi-component cost function comprises a first component relating to a lighting power, a second component relating to a cooling power associated with heat flux gain from lighting associated with the lighting system, and a third component relating to a cool power associated with heat flux gain from one or more windows associated with the shading system.

18. A computer program product, embodied in one or more non-transitory computer-readable storage mediums, comprising instructions executable by at least one processor to perform a method of controlling building service systems associated with a building for optimizing a plurality of building performance parameters in providing an environment with respect to a region of the building, using at least one processor, the building service systems comprising an air-conditioning and/or heating system, a lighting system and a shading system, the method comprising:
   predicting, based on a shading and lighting prediction model, a visual comfort condition and a lighting condition with respect to the region of the building;
   optimizing, based on a first multi-component cost function including a plurality of components relating to a plurality of lighting or thermal performance parameters with respect to the region of the building, one or more first control parameters for controlling the lighting system and the shading system based on the predicted visual comfort condition and the predicted lighting condition;
   predicting, based on a building dynamics model, a plurality of building response parameters based on the predicted visual comfort condition and the predicted lighting condition associated with the region of the building, wherein the plurality of building response parameters comprises an index of thermal comfort; and optimizing, based on a second multi-component cost function including a plurality of components relating to the plurality of building performance parameters, one or more second control parameters for controlling the air-conditioning and/or heating system based on the predicted plurality of building response parameters, wherein the shading and lighting prediction model comprises:
- a daylight penetration model configured to estimate a transmitted daylight illuminance associated with the shading system with respect to the region of the building;
- a visual comfort model configured to predict the visual comfort condition based on the estimated transmitted daylight illuminance; and
- a lighting power model configured to predict the lighting condition based on the estimated transmitted daylight illuminance,
- wherein the plurality of building performance parameters include a building energy efficiency parameter, a human thermal comfort parameter, and a human visual comfort parameter.

* * * * *